US009686037B2

(12) United States Patent
Sano et al.

(10) Patent No.: US 9,686,037 B2
(45) Date of Patent: *Jun. 20, 2017

(54) USER APPARATUS, BASE STATION, INTERFERENCE REDUCING METHOD AND INTERFERENCE REDUCING CONTROL INFORMATION NOTIFICATION METHOD

(71) Applicant: NTT DOCOMO, INC., Tokyo (JP)

(72) Inventors: Yousuke Sano, Tokyo (JP); Yusuke Ohwatari, Tokyo (JP); Kazuaki Takeda, Tokyo (JP); Satoshi Nagata, Tokyo (JP)

(73) Assignee: NTT DOCOMO, INC., Toyko (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/909,416

(22) PCT Filed: Jun. 25, 2014

(86) PCT No.: PCT/JP2014/066785
§ 371 (c)(1),
(2) Date: Feb. 1, 2016

(87) PCT Pub. No.: WO2015/015958
PCT Pub. Date: Feb. 5, 2015

(65) Prior Publication Data
US 2016/0173217 A1    Jun. 16, 2016

(30) Foreign Application Priority Data

Aug. 2, 2013  (JP) ................................. 2013-161873
Feb. 7, 2014  (JP) ................................. 2014-022834

(51) Int. Cl.
*H04J 11/00*   (2006.01)
*H04W 72/08*  (2009.01)
(Continued)

(52) U.S. Cl.
CPC ........ *H04J 11/0053* (2013.01); *H04L 5/0051* (2013.01); *H04L 5/0073* (2013.01);
(Continued)

(58) Field of Classification Search
CPC . H04W 72/082; H04W 72/042; H04J 11/005; H04L 5/0053; H04L 5/0073
See application file for complete search history.

(56) References Cited

U.S. PATENT DOCUMENTS

2012/0190391 A1* 7/2012 Yoo ........................ H04J 11/005
                                                      455/501
2013/0089040 A1* 4/2013 Tabet .................... H04L 5/0073
                                                      370/329
(Continued)

OTHER PUBLICATIONS

Extended European Search Report in counterpart European Application No. 14 83 3081.4 issued Jul. 8, 2016 (7 pages).
(Continued)

*Primary Examiner* — Jung Park
(74) *Attorney, Agent, or Firm* — Osha Liang LLP

(57) ABSTRACT

A user apparatus in a radio communication system including a plurality of base stations, including: a reception unit configured to receive, from a connecting base station, control information to be used for reducing an interference signal sent from an interference base station for the user apparatus; and an interference reducing unit configured to reduce the interference signal by using the control information to obtain a desired signal sent from the connecting base station, wherein the reception unit receives a part of the control information as a part of downlink control information that is transmitted by a downlink physical layer signaling channel from the connecting base station, and receives the other part of the control information by RRC signaling.

10 Claims, 51 Drawing Sheets

(51) Int. Cl.
*H04W 76/04* (2009.01)
*H04W 72/04* (2009.01)
*H04L 5/00* (2006.01)

(52) U.S. Cl.
CPC ......... *H04L 5/0094* (2013.01); *H04W 72/042* (2013.01); *H04W 72/082* (2013.01); *H04W 76/04* (2013.01); *H04L 5/0044* (2013.01)

(56) References Cited

U.S. PATENT DOCUMENTS

| | | | |
|---|---|---|---|
| 2013/0114496 A1 | 5/2013 | Mazzarese et al. | |
| 2013/0196701 A1* | 8/2013 | Tiirola | H04J 11/0026 455/501 |
| 2013/0242885 A1* | 9/2013 | Zhu | H04W 52/243 370/329 |

OTHER PUBLICATIONS

International Search Report issued in PCT/JP2014/066785 mailed on Sep. 16, 2014 (2 pages).
Written Opinion of the International Searching Authority issued in PCT/JP2014/066785 mailed on Sep. 16, 2014 ,3 pages).
Ericsson; "Inclusion of Rel-11 features"; 3GPP TSG-RAN WG1 Meeting #70, R1-124010; Section 6.10.5.1; Qingdao, China; Aug. 13-17, 2012 (99 pages).
DL CoMP Rapporteur (Samsung); "RRC Parameters for Downlink CoMP"; 3GPP TSG RAN WG1 #70bis, R1-124669; San Diego, USA; Oct. 8-12, 2012 (5 pages).
RAN WG1; "LS on Additional Agreements on RRC Signaling for CoMP"; 3GPP TSG RAN WG1 Meeting #71, R1-125353; New Orleans, USA; Nov. 12-16, 2012 (2 pages).
3GPP TS 36.212 V11.2.0; "3rd Generation Partnership Project; Technical Specification Group Radio Access Network; Evolved Universal Terrestrial Radio Access (E-UTRA); Multiplexing and channel coding (Release 11)"; Feb. 2013 (82 pages).
3GPP TS 36.213 V11.2.0; "3rd Generation Partnership Project; Technical Specification Group Radio Access Network; Evolved Universal Terrestrial Radio Access (E-UTRA); Physical layer procedures (Release 11)"; Section 7.1.7.2 Feb. 2013 (173 pages).
3GPP TS 36.212 V12.0.0; "3rd Generation Partnership Project; Technical Specification Group Radio Access Network; Evolved Universal Terrestrial Radio Access (E-UTRA); Multiplexing and channel coding (Release 12)"; Section 5.3; Dec. 2013 (88 pages).
3GPP TS 36.211 V12.1.0; "3rd Generation Partnership Project; Technical Specification Group Radio Access Network; Evolved Universal Terrestrial Radio Access (E-UTRA); Physical channels and modulation (Release 12)"; Section 6; Mar. 2014 (120 pages).
3GPP TS 36.213 V12.1.0; "3rd Generation Partnership Project; Technical Specification Group Radio Access Network; Evolved Universal Terrestrial Radio Access (E-UTRA); Physical layer procedures (Release 12)"; Sections 5, 7, 9; Mar. 2014 (186 pages).
3GPP TR 36.866 V12.0.1; "3rd Generation Partnership Project; Technical Specification Group Radio Access Network; Study on Network-Assisted Interference Cancellation and Suppression (NAIC) for LTE (Release 12)"; Mar. 2014 (64 pages).
Media Tek Inc.; "New work item proposal for network assistance interference cancellation and suppression for LTE"; 3GPP TSG RAN Meeting #63, RP-140519; Fukuoka, Japan; Mar. 3-6, 2014 (7 pages).
Hoeher, P. et al.; "Two-Dimensional Pilot-Symbol-Aided Channel Estimation by Wiener Filtering"; Proc. ICASSP'97, 1997 (4 pages).
Axnäs, J. et al.; "Successive Interference Cancellation Techniques for LTE Downlink"; IEEE 22nd International Symposium on Personal, Indoor and Mobile Radio Communications, 2011, pp. 1793-1797 (5 pages).

* cited by examiner

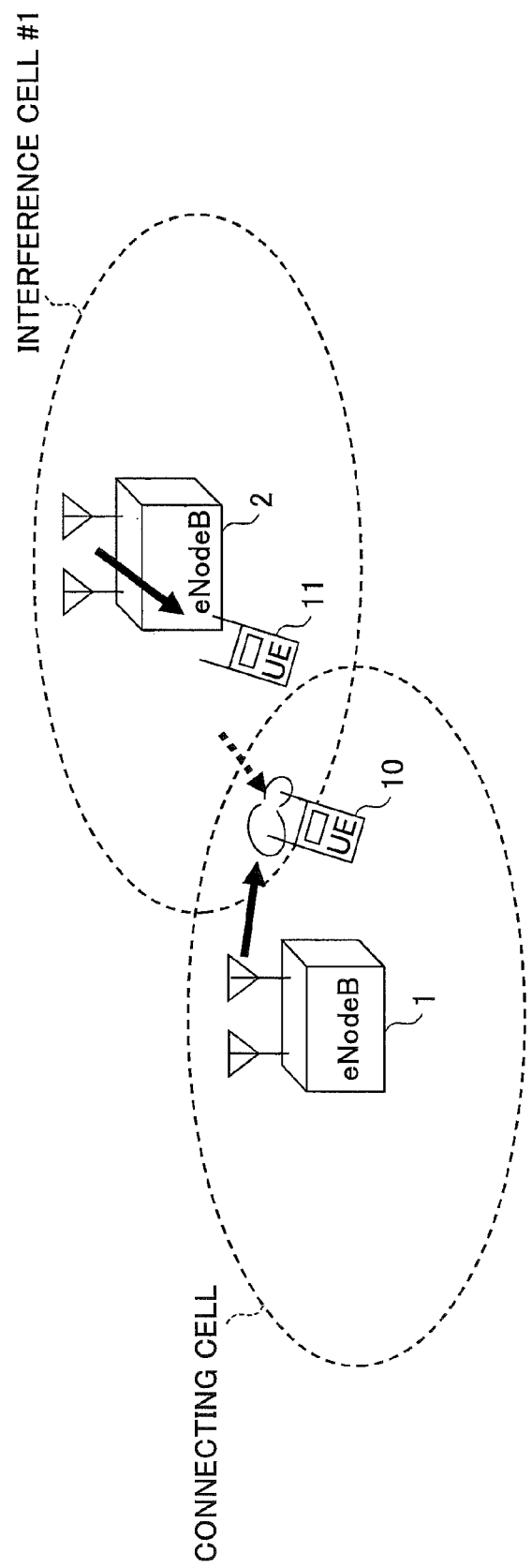

- TYPE 1: IN A CASE WHERE CHANNEL OF INTERFERENCE SIGNAL CAN BE ESTIMATED $$W_{IRC} = \frac{P_{00}}{N_{Stream,00}} \hat{G}_{00}^H(k,l) \left( \sum_{i=0}^{N_{cell}-1} \sum_{j=0}^{N_{user}-1} \frac{P_{ij}}{N_{Stream,ij}} \hat{G}_{ij}(k,l) \hat{G}_{ij}^H(k,l) + \sigma_N^2 I \right)^{-1}$$

→ COVARIANCE MATRIX FORMED BY CHANNEL MATRIX OF INTERFERENCE CELL

- TYPE 2: IN A CASE WHERE CHANNEL OF INTERFERENCE SIGNAL CANNOT BE ESTIMATED $$W_{IRC} = \frac{P_{00}}{N_{Stream,00}} \hat{G}_{00}^H(k,l) \left( \hat{G}_{00}(k,l) \hat{G}_{00}^H(k,l) + \hat{R}_{I+N} \right)^{-1}$$

→ COVARIANCE MATRIX (STATISTICAL VALUE) OF NOISE INTERFERENCE COMPONENT ESTIMATED FROM REFERENCE SIGNAL FROM CONNECTING CELL

INTERFERENCE SUPPRESSION ABILITY IS HIGHER IN TYPE 1

$G_{ij}$ : CHANNEL MATRIX AFTER MULTIPLICATION OF TRANSMISSION WEIGHT MATRIX OF $j$-TH UE ON THE SAME RESOURCE IN $i$-TH CELL (THE NUMBER OF ANTENNAs × THE NUMBER OF TRANSMISSION STREAMs)

$\hat{G}_{ij}$ : THE CHANNEL MATRIX ESTIMATION VALUE BY REFERENCE SIGNAL $P_{ij}$ : TRANSMISSION POWER OF $j$-TH UE IN $i$-TH CELL $N_{Stream,ij}$ : THE NUMBER OF TRANSMISSION STREAMs OF $j$-TH UE IN $i$-TH CELL $\sigma_N^2$ : NOISE POWER $k$ : SUBCARRIER INDEX $l$ : OFDM SYMBOL INDEX

FIG.2

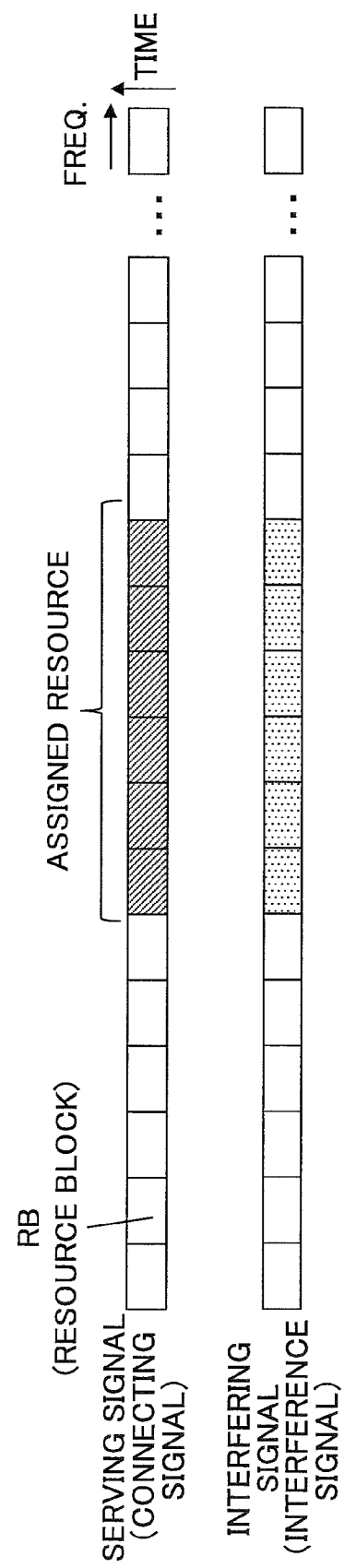

CRS

FIG.6

KNOWN INFORMATION IN THE CURRENT
CONTROL SIGNAL CONFIGURATION
(CAN BE ESTIMATED BY PSS/SSS)
→ OTHER INFORMATION IS DIFFICULT TO ESTIMATE

- CALCULATION OF CRS
  SEQUENCE INITIAL VALUE → PCID(Physical Cell ID), SLOT NUMBER, $N_{CP}$ (NORMAL or EXTENDED CP→1 or 0)
- CALCULATION OF CRS
  MAPPING POSITION → SYSTEM BANDWIDTH, NUMBER OF ANTENNA PORTs
- CRS POWER BOOSTING INFORMATION (e.g. POWER RATIO BETWEEN REFERENCE SIGNAL AND DATA SIGNAL)
- MBSFN CONFIG.
- RI, PMI (ONLY FOR PRECODING TRANSMISSION)/RB or SUBBAND

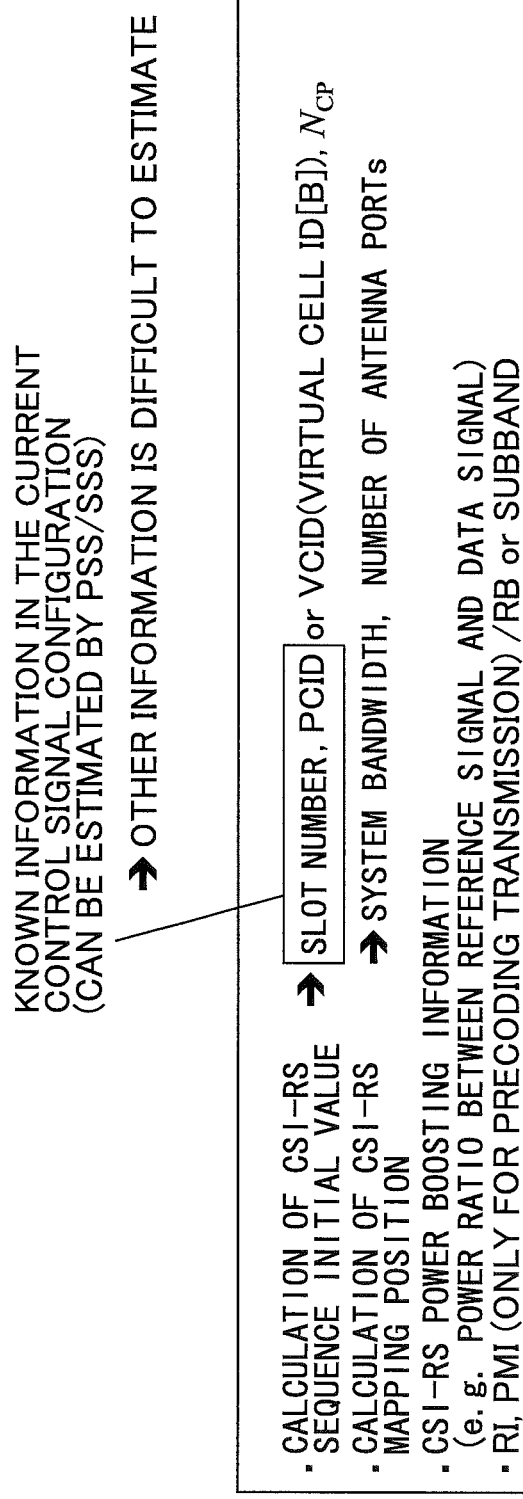

FIG.8

KNOWN INFORMATION IN THE CURRENT
CONTROL SIGNAL CONFIGURATION
(CAN BE ESTIMATED BY PSS/SSS)
➔ OTHER INFORMATION IS DIFFICULT TO ESTIMATE

- CALCULATION OF DM-RS
  SEQUENCE INITIAL VALUE ➔ SLOT NUMBER, PCID or VCID, $n_{SCID}$ (UE IDENTIFICATION NUMBER ➔ 0 or 1)
  PDSCH TRANSMISSION BANDWIDTH              IN MU-MIMO

- CALCULATION OF DM-RS
  MAPPING POSITION          ➔ $N_{CP}$, NUMBER OF ANTENNA PORTs/RB or SUBBAND

- DM-RS POWER BOOSTING INFORMATION /RB or SUBBAND
  (e.g. POWER RATIO BETWEEN REFERENCE SIGNAL AND DATA SIGNAL)

- RI /RB or SUBBAND

※ DM-RS IS TRANSMITTED BY BEING PRECODED ONLY
  IN RESOURCE WHERE USER IS ASSIGNED
  ➔ PMI AND USER ASSIGNMENT INFORMATION ARE UNNECESSARY

FIG.11

- PDSCH MODULATION SCHEME INFORMATION /RB or SUBBAND
- CRS/CSI-RS/DM-RS CONFIG. ⎫ FOR CALCULATION OF RESOURCE ON
- MBSFN CONFIG. ⎭ WHICH REFERENCE SIGNAL IS MAPPED
- PDSCH START SYMBOL → FOR CALCULATION OF RESOURCE ON WHICH PDSCH IS MAPPED

+

- FOR TURBO EQUALIZATION, CODING RATE INFORMATION/ RB or SUBBAND IS FURTHER NECESSARY

| DCI FORMAT | CONTENT |
|---|---|
| FORMAT 0 | UL SCHEDULING GRANT FOR PUSCH TRANSMISSION |
| FORMAT 1 | DL SCHEDULING INFORMATION FOR PDSCH TRANSMISSION (SIMO) |
| FORMAT 1A | • DL SCHEDULING INFORMATION FOR PDSCH TRANSMISSION (COMPACT VERSION OF FORMAT 1)<br>• FOR SYNC REQUEST<br>(INFORMATION FOR INSTRUCTING RANDOM ACCESS PROCEDURE BY eNB TRIGGER)<br>• ACTIVATION/RELEASE CONTROL WHEN SEMI-PERSISTENT SCHEDULING (SPS) |
| FORMAT 1B | DL SCHEDULING INFORMATION FOR PDSCH TRANSMISSION (RANK 1 PRECODING) |
| FORMAT 1C | DL SCHEDULING INFORMATION FOR PDSCH TRANSMISSION + NOTIFICATION OF MCCH CHANGE |
| FORMAT 1D | DL SCHEDULING INFORMATION FOR PDSCH TRANSMISSION (MULTI-USER MIMO) |
| FORMAT 2 | DL SCHEDULING INFORMATION FOR PDSCH (MAINLY USER DATA CHANNEL) TRANSMISSION (CLOSED-LOOP SPATIAL MULTIPLEXING, TM4) |
| FORMAT 2A | DL SCHEDULING INFORMATION FOR PDSCH (MAINLY USER DATA CHANNEL) TRANSMISSION (OPEN-LOOP SPATIAL MULTIPLEXING, TM3) |
| FORMAT 2B | DL SCHEDULING INFORMATION FOR PDSCH (MAINLY USER DATA CHANNEL) TRANSMISSION (SPATIAL MULTIPLEXING, TM8) |
| FORMAT 2C | DL SCHEDULING INFORMATION FOR PDSCH (MAINLY USER DATA CHANNEL) TRANSMISSION (SPATIAL MULTIPLEXING, TM9) |
| FORMAT 2D | DL SCHEDULING INFORMATION FOR PDSCH (MAINLY USER DATA CHANNEL) TRANSMISSION (SPATIAL MULTIPLEXING, TM10) |
| FORMAT 3 / 3A | USED FOR NOTIFICATION OF TPC BIT OF PUCCH/PUSCH IN TPC-PDCCH |
| FORMAT 4 | USED FOR SCHEDULING OF PUSCH WHEN MULTI-ANTENNA PORT TRANSMISSION |

FIG.14   DCI FORMAT USED WHEN PERFORMING SPATIAL MULTIPLEXING

FIG.15

- TRANSMISSION MODE
- INFORMATION NECESSARY FOR ESTIMATING INTERFERENCE CELL CHANNEL

| CRS BASED | CSI-RS BASED | DM-RS BASED |
|---|---|---|
| • PCID (PHYSICAL CELL ID)<br>• SLOT NUMBER<br>• Ncp<br>(NORMAL or EXTENDED CP)<br>• SYSTEM BANDWIDTH<br>• CRS ANTENNA PORT NUMBER | • PCID or VCID<br>(VIRTUAL CELL ID)<br>• SLOT NUMBER<br>• Ncp<br>(NORMAL or EXTENDED CP)<br>• SYSTEM BANDWIDTH<br>• CSI-RS ANTENNA PORT NUMBER<br>• CSI-RS CONFIGURATION | • PCID or VCID<br>• SLOT NUMBER<br>• $n^{SCID}$<br>• PDSCH<br>TRANSMISSION BANDWIDTH<br>• Ncp (NORMAL or EXTENDED CP)<br>• DM-RS ANTENNA PORT NUMBER |

NECESSARY FOR TM9, 10

- POWER BOOSTING INFORMATION (e.g. POWER RATIO BETWEEN REFERENCE SIGNAL AND DATA SIGNAL)
- MBSFN CONFIGURATION
- TRANSMISSION RANK INFORMATION (RI)
- TRANSMISSION PRECODING INFORMATION (PMI)
  → ONLY FOR PRECODING TRANSMISSION AND CRS or CSI-RS BASED (NOTIFY UNDERLINED INFORMATION BY DCI)

FIG.16

- INFORMATION NECESSARY FOR OPERATION OF IRC RECEIVER
- CONFIGURATION INFORMATION OF TRANSMITTED REFERENCE
  SIGNAL SEQUENCE (CRS/CSI-RS/DM-RS)
- MODULATION SCHEME OF PDSCH
- START SYMBOL OF PDSCH
- CODING RATE INFORMATION (ONLY FOR TURBO SIC)

(NOTIFY UNDERLINED INFORMATION BY DCI)

| | INFORMATION ELEMENT | ESSENTIAL or ARBITRARY |
|---|---|---|
| COMMON PART | TM | ARBITRARY (EXAMPLE: UNNECESSARY WHEN UNIFIED IN THE WHOLE SYSTEM) |
| | PCID or VCID | ESSENTIAL |
| | SLOT NUMBER | ARBITRARY (CAN BE ESTIMATED BY CURRENT PSS/SSS) |
| | $N_{CP}$ | ARBITRARY (EXAMPLE: UNNECESSARY WHEN UNIFIED IN THE WHOLE SYSTEM) |
| | RI | ARBITRARY (ALTHOUGH CHARACTERISTICs DETERIORATE IF NOT SEND, INFORMATION AMOUNT CAN BE DECREASED) |
| | USER ASSIGNMENT INFORMATION | ESSENTIAL |
| CRS BASED | NUMBER OF CRS ANTENNA PORTs | ESSENTIAL |
| | MBSFN CONFIG. | ESSENTIAL |
| | SYSTEM BANDWIDTH | ESSENTIAL |
| | CRS POWER BOOSTING INFORMATION | ESSENTIAL |
| | PMI | ARBITRARY (ALTHOUGH CHARACTERISTICs DETERIORATE IF NOT SEND, INFORMATION AMOUNT CAN BE DECREASED) |
| CSI-RS BASED | NUMBER OF CSI-RS ANTENNA PORTs | ESSENTIAL |
| | SYSTEM BANDWIDTH | ESSENTIAL |
| | CSI-RS POWER BOOSTING INFORMATION | ESSENTIAL |
| | PMI | ARBITRARY (ALTHOUGH CHARACTERISTICs DETERIORATE IF NOT SEND, INFORMATION AMOUNT CAN BE DECREASED) |
| DM-RS BASED | $n_{SCID}$ | ARBITRARY (EXAMPLE: ALTHOUGH OPERATION IS POSSIBLE EVEN WHEN ALWAYS 0, CHARACTERISTICs DETERIORATE) |
| | NUMBER OF DM-RS ANTENNA PORTs | ESSENTIAL |
| | DM-RS POWER BOOSTING INFORMATION | ESSENTIAL |
| | PDSCH TRANSMISSION BANDWIDTH | ESSENTIAL |

FIG.17

| INFORMATION ELEMENT | NUMBER OF BITs | CONTENT |
|---|---|---|
| CARRIER INDICATOR | 0 or 3 | USED WHEN CROSS-CARRIER SCHEDULING IS CONFIGURED IN CA |
| RESOURCE ALLOCATION HEADER | 1 | HEADER INDICATING WHICH TO USE RESOURCE ALLOCATION TYPE 0 or 1 |
| RESOURCE BLOCK ASSIGNMENT | $\lceil N_{RB}^{DL}/P \rceil$ | INDICATING THE ASSIGNMENT NUMBER OF RB AND ASSIGNMENT POSITION (P IS RBG SIZE, VARIABLE ACCORDING TO SYSTEM BANDWIDTH, THE NUMBER OF BITs IN THE LEFT SIDE IS FOR TYPE 0) |
| TPC COMMAND FOR PUCCH | 2 | TPC BIT APPLIED FOR PUCCH TRANSMISSION |
| DOWNLINK ASSIGNMENT INDEX | 2 | TDD UPLINK-DOWNLINK CONFIGURATION (ONLY FOR TDD) |
| HARQ PROCESS NUMBER | 3 or 4 | HARQ PROCESS (3 BITs FOR FDD, 4 BITs FOR TDD) |
| NEW DATA INDICATOR FOR TB1 | 1 | FLAG INDICATING NEW or RETRANSMISSION (FOR TRANSPORT BLOCK 1) |
| REDUNDANCY VERSION FOR TB1 | 2 | INDICATING TRANSMITTED REDUNDANCY BIT PATTERN (FOR TRANSPORT BLOCK 1) |
| MODULATION AND CODING SCHEME FOR TB1 | 5 | MODULATION SCHEME AND CODING RATE, THAT IS, TBS (FOR TRANSPORT BLOCK 1) |
| NEW DATA INDICATOR FOR TB2 | 1 | FLAG INDICATING NEW or RETRANSMISSION (FOR TRANSPORT BLOCK 2) |
| REDUNDANCY VERSION FOR TB2 | 2 | INDICATING TRANSMITTED REDUNDANCY BIT PATTERN (FOR TRANSPORT BLOCK 2) |
| MODULATION AND CODING SCHEME FOR TB2 | 5 | MODULATION SCHEME AND CODING RATE, THAT IS, TBS (FOR TRANSPORT BLOCK 2) |
| TRANSPORT BLOCK TO CODEWORD SWAP FLAG | 1 | FLAG INDICATING WHETHER TO SWAP MAPPING OF TRANSPORT BLOCK AND CODEWORD |
| PRECODING INFORMATION | 3 or 6 | PRECODING INFORMATION (2 ANTENNA PORTs: 3 BIT, 4 ANTENNA PORTs: 6 BIT) |
| HARQ-ACK RESOURCE OFFSET | 2 | INDICATING WHICH PUCCH TO USE, ONLY WHEN TRANSMITTED BY EPDCCH |

FIG.19     REPLACEMENT IS AVAILABLE WHEN CONNECTING CELL IS RANK-1 (9 BITs IN TOTAL)

| INFORMATION ELEMENT | NUMBER OF BITs | CONTENT |
|---|---|---|
| CARRIER INDICATOR | 0 or 3 | USED WHEN CROSS-CARRIER SCHEDULING IS CONFIGURED IN CA |
| RESOURCE ALLOCATION HEADER | 1 | HEADER INDICATING WHICH TO USE RESOURCE ALLOCATION TYPE 0 or 1 |
| RESOURCE BLOCK ASSIGNMENT | $\lceil N_{RB}^{DL}/P \rceil$ | INDICATING THE ASSIGNMENT NUMBER OF RB AND ASSIGNMENT POSITION (P IS RBG SIZE, VARIABLE ACCORDING TO SYSTEM BANDWIDTH, THE NUMBER OF BITs IN THE LEFT SIDE IS FOR TYPE 0) |
| TPC COMMAND FOR PUCCH | 2 | TPC BIT APPLIED FOR PUCCH TRANSMISSION |
| DOWNLINK ASSIGNMENT INDEX | 2 | TDD UPLINK-DOWNLINK CONFIGURATION (ONLY FOR TDD) |
| HARQ PROCESS NUMBER | 3 or 4 | HARQ PROCESS (3 BITs FOR FDD, 4 BITs FOR TDD) |
| NEW DATA INDICATOR FOR TB1 | 1 | FLAG INDICATING NEW or RETRANSMISSION (FOR TRANSPORT BLOCK 1) |
| REDUNDANCY VERSION FOR TB1 | 2 | INDICATING TRANSMITTED REDUNDANCY BIT PATTERN (FOR TRANSPORT BLOCK 1) |
| MODULATION AND CODING SCHEME FOR TB1 | 5 | MODULATION SCHEME AND CODING RATE, THAT IS, TBS (FOR TRANSPORT BLOCK 1) |
| NEW DATA INDICATOR FOR TB2 | 1 | FLAG INDICATING NEW or RETRANSMISSION (FOR TRANSPORT BLOCK 2) |
| REDUNDANCY VERSION FOR TB2 | 2 | INDICATING TRANSMITTED REDUNDANCY BIT PATTERN (FOR TRANSPORT BLOCK 2) |
| MODULATION AND CODING SCHEME FOR TB2 | 5 | MODULATION SCHEME AND CODING RATE, THAT IS, TBS (FOR TRANSPORT BLOCK 2) |
| TRANSPORT BLOCK TO CODEWORD SWAP FLAG | 1 | FLAG INDICATING WHETHER TO SWAP MAPPING OF TRANSPORT BLOCK AND CODEWORD |
| PRECODING INFORMATION | 0 or 2 | PRECODING INFORMATION (2 ANTENNA PORTs: 0 BIT, 4 ANTENNA PORTs: 2 BIT) |
| HARQ-ACK RESOURCE OFFSET | 2 | INDICATING WHICH PUCCH TO USE, ONLY WHEN TRANSMITTED BY EPDCCH |

REPLACEMENT IS AVAILABLE WHEN CONNECTING CELL IS RANK-1 (9 BITs IN TOTAL)

FIG.20

| INFORMATION ELEMENT | NUMBER OF BITs | CONTENT |
|---|---|---|
| CARRIER INDICATOR | 0 or 3 | USED WHEN CROSS-CARRIER SCHEDULING IS CONFIGURED IN CA |
| RESOURCE ALLOCATION HEADER | 1 | HEADER INDICATING WHICH TO USE RESOURCE ALLOCATION TYPE 0 or 1 |
| RESOURCE BLOCK ASSIGNMENT | $\lceil N_{RB}^{DL}/P \rceil$ | INDICATING THE ASSIGNMENT NUMBER OF RB AND ASSIGNMENT POSITION (P IS RBG SIZE, VARIABLE ACCORDING TO SYSTEM BANDWIDTH, THE NUMBER OF BITs IN THE LEFT SIDE IS FOR TYPE 0) |
| TPC COMMAND FOR PUCCH | 2 | TPC BIT APPLIED FOR PUCCH TRANSMISSION |
| DOWNLINK ASSIGNMENT INDEX | 2 | TDD UPLINK-DOWNLINK CONFIGURATION (ONLY FOR TDD) |
| HARQ PROCESS NUMBER | 3 or 4 | HARQ PROCESS (3 BITs FOR FDD, 4 BITs FOR TDD) |
| SCRAMBLING IDENTITY | 1 | SCRAMBLING SEQUENCE INFORMATION |
| SRS REQUEST | 0 or 1 | ONLY FOR TDD |
| NEW DATA INDICATOR FOR TB1 | 1 | FLAG INDICATING NEW or RETRANSMISSION (FOR TRANSPORT BLOCK 1) |
| REDUNDANCY VERSION FOR TB1 | 2 | INDICATING TRANSMITTED REDUNDANCY BIT PATTERN (FOR TRANSPORT BLOCK 1) |
| MODULATION AND CODING SCHEME FOR TB1 | 5 | MODULATION SCHEME AND CODING RATE, THAT IS, TBS (FOR TRANSPORT BLOCK 1) |
| NEW DATA INDICATOR FOR TB2 | 1 | FLAG INDICATING NEW or RETRANSMISSION (FOR TRANSPORT BLOCK 2) |
| REDUNDANCY VERSION FOR TB2 | 2 | INDICATING TRANSMITTED REDUNDANCY BIT PATTERN (FOR TRANSPORT BLOCK 2) |
| MODULATION AND CODING SCHEME FOR TB2 | 5 | MODULATION SCHEME AND CODING RATE, THAT IS, TBS (FOR TRANSPORT BLOCK 2) |
| HARQ-ACK RESOURCE OFFSET | 2 | INDICATING WHICH PUCCH TO USE, ONLY WHEN TRANSMITTED BY EPDCCH |

REPLACEMENT IS AVAILABLE WHEN CONNECTING CELL IS RANK-1 (8 BITs IN TOTAL)

FIG.21

| INFORMATION ELEMENT | NUMBER OF BITs | CONTENT |
|---|---|---|
| CARRIER INDICATOR | 0 or 3 | USED WHEN CROSS-CARRIER SCHEDULING IS CONFIGURED IN CA |
| RESOURCE ALLOCATION HEADER | 1 | HEADER INDICATING WHICH TO USE RESOURCE ALLOCATION TYPE 0 or 1 |
| RESOURCE BLOCK ASSIGNMENT | $\lceil N_{RB}^{DL}/P \rceil$ | INDICATING THE ASSIGNMENT NUMBER OF RB AND ASSIGNMENT POSITION (P IS RBG SIZE, VARIABLE ACCORDING TO SYSTEM BANDWIDTH, THE NUMBER OF BITs IN THE LEFT SIDE IS FOR TYPE 0) |
| TPC COMMAND FOR PUCCH | 2 | TPC BIT APPLIED FOR PUCCH TRANSMISSION |
| DOWNLINK ASSIGNMENT INDEX | 2 | TDD UPLINK-DOWNLINK CONFIGURATION (ONLY FOR TDD) |
| HARQ PROCESS NUMBER | 3 or 4 | HARQ PROCESS (3 BITs FOR FDD, 4 BITs FOR TDD) |
| ANTENNA PORT(s), SCRAMBLING IDENTITY, NUMBER OF LAYER | 3 | $n^{SCID}$, RI, DM-RS PORT INDEX ARE JOINTLY ENCODED |
| SRS REQUEST | 0 or 1 | ONLY FOR TDD |
| NEW DATA INDICATOR FOR TB1 | 1 | FLAG INDICATING NEW or RETRANSMISSION (FOR TRANSPORT BLOCK 1) |
| REDUNDANCY VERSION FOR TB1 | 2 | INDICATING TRANSMITTED REDUNDANCY BIT PATTERN (FOR TRANSPORT BLOCK 1) |
| MODULATION AND CODING SCHEME FOR TB1 | 5 | MODULATION SCHEME AND CODING RATE, THAT IS, TBS (FOR TRANSPORT BLOCK 1) |
| NEW DATA INDICATOR FOR TB2 | 1 | FLAG INDICATING NEW or RETRANSMISSION (FOR TRANSPORT BLOCK 2) |
| REDUNDANCY VERSION FOR TB2 | 2 | INDICATING TRANSMITTED REDUNDANCY BIT PATTERN (FOR TRANSPORT BLOCK 2) |
| MODULATION AND CODING SCHEME FOR TB2 | 5 | MODULATION SCHEME AND CODING RATE, THAT IS, TBS (FOR TRANSPORT BLOCK 2) |
| HARQ-ACK RESOURCE OFFSET | 2 | INDICATING WHICH PUCCH TO USE, ONLY WHEN TRANSMITTED BY EPDCCH |

REPLACEMENT IS AVAILABLE WHEN CONNECTING CELL IS RANK-1 (8 BITs IN TOTAL)

| INFORMATION ELEMENT | NUMBER OF BITs | CONTENT |
|---|---|---|
| CARRIER INDICATOR | 0 or 3 | USED WHEN CROSS-CARRIER SCHEDULING IS CONFIGURED IN CA |
| RESOURCE ALLOCATION HEADER | 1 | HEADER INDICATING WHICH TO USE RESOURCE ALLOCATION TYPE 0 or 1 |
| RESOURCE BLOCK ASSIGNMENT | $\lceil N_{RB}^{DL}/P \rceil$ | INDICATING THE ASSIGNMENT NUMBER OF RB AND ASSIGNMENT POSITION (P IS RBG SIZE, VARIABLE ACCORDING TO SYSTEM BANDWIDTH, THE NUMBER OF BITs IN THE LEFT SIDE IS FOR TYPE 0) |
| TPC COMMAND FOR PUCCH | 2 | TPC BIT APPLIED FOR PUCCH TRANSMISSION |
| DOWNLINK ASSIGNMENT INDEX | 2 | TDD UPLINK-DOWNLINK CONFIGURATION (ONLY FOR TDD) |
| HARQ PROCESS NUMBER | 3 or 4 | HARQ PROCESS (3 BITs FOR FDD, 4 BITs FOR TDD) |
| ANTENNA PORT(s), SCRAMBLING IDENTITY, NUMBER OF LAYER | 3 | $n^{SCID}$, RI, DM-RS PORT INDEX ARE JOINTLY ENCODED |
| SRS REQUEST | 0 or 1 | ONLY FOR TDD |
| NEW DATA INDICATOR FOR TB1 | 1 | FLAG INDICATING NEW or RETRANSMISSION (FOR TRANSPORT BLOCK 1) |
| REDUNDANCY VERSION FOR TB1 | 2 | INDICATING TRANSMITTED REDUNDANCY BIT PATTERN (FOR TRANSPORT BLOCK 1) |
| MODULATION AND CODING SCHEME FOR TB1 | 5 | MODULATION SCHEME AND CODING RATE, THAT IS, TBS (FOR TRANSPORT BLOCK 1) |
| NEW DATA INDICATOR FOR TB2 | 1 | FLAG INDICATING NEW or RETRANSMISSION (FOR TRANSPORT BLOCK 2) |
| REDUNDANCY VERSION FOR TB2 | 2 | INDICATING TRANSMITTED REDUNDANCY BIT PATTERN (FOR TRANSPORT BLOCK 2) |
| MODULATION AND CODING SCHEME FOR TB2 | 5 | MODULATION SCHEME AND CODING RATE, THAT IS, TBS (FOR TRANSPORT BLOCK 2) |
| HARQ-ACK RESOURCE OFFSET | 2 | INDICATING WHICH PUCCH TO USE, ONLY WHEN TRANSMITTED BY EPDCCH |
| PDSCH RE MAPPING AND QUASI- CO-LOCATION INDICATOR | 2 | TP CONFIGURATION IN QCL |

REPLACEMENT IS AVAILABLE WHEN CONNECTING CELL IS RANK-1 (8 BITs IN TOTAL)

| INFORMATION ELEMENT | NUMBER OF BITs | CONTENT |
|---|---|---|
| CARRIER INDICATOR | 0 or 3 | USED WHEN CROSS-CARRIER SCHEDULING IS CONFIGURED IN CA |
| RESOURCE ALLOCATION HEADER | 1 | HEADER INDICATING WHICH TO USE RESOURCE ALLOCATION TYPE 0 or 1 |
| RESOURCE BLOCK ASSIGNMENT | $\lceil N_{RB}^{DL}/P \rceil$ | INDICATING THE ASSIGNMENT NUMBER OF RB AND ASSIGNMENT POSITION (P IS RBG SIZE, VARIABLE ACCORDING TO SYSTEM BANDWIDTH, THE NUMBER OF BITs IN THE LEFT SIDE IS FOR TYPE 0) |
| TPC COMMAND FOR PUCCH | 2 | TPC BIT APPLIED FOR PUCCH TRANSMISSION |
| DOWNLINK ASSIGNMENT INDEX | 2 | TDD UPLINK-DOWNLINK CONFIGURATION (ONLY FOR TDD) |
| HARQ PROCESS NUMBER | 3 or 4 | HARQ PROCESS (3 BITs FOR FDD, 4 BITs FOR TDD) |
| NEW DATA INDICATOR FOR TB1 | 1 | FLAG INDICATING NEW or RETRANSMISSION (FOR TRANSPORT BLOCK 1) |
| REDUNDANCY VERSION FOR TB1 | 2 | INDICATING TRANSMITTED REDUNDANCY BIT PATTERN (FOR TRANSPORT BLOCK 1) |
| MODULATION AND CODING SCHEME FOR TB1 | 5 | MODULATION SCHEME AND CODING RATE, THAT IS, TBS (FOR TRANSPORT BLOCK 1) |
| RI, PMI OF 1ST DOMINANT INTERFERING CELL | 3 | RI 1 BIT + PMI 2 BIT (GRANULARITY IS REDUCED WHEN THE NUMBER OF TRANSMISSION ANTENNAs IS 4) |
| RI, PMI OF 2ND DOMINANT INTERFERING CELL | 3 | RI 1 BIT + PMI 2 BIT (GRANULARITY IS REDUCED WHEN THE NUMBER OF TRANSMISSION ANTENNAs IS 4) |
| RI, PMI OF 3RD DOMINANT INTERFERING CELL | 3 | RI 1 BIT + PMI 2 BIT (GRANULARITY IS REDUCED WHEN THE NUMBER OF TRANSMISSION ANTENNAs IS 4) |
| PRECODING INFORMATION | 3 or 6 | PRECODING INFORMATION (2 ANTENNA PORTs: 3 BIT, 4 ANTENNA PORTs: 6 BIT) |
| HARQ-ACK RESOURCE OFFSET | 2 | INDICATING WHICH PUCCH TO USE, ONLY WHEN TRANSMITTED BY EPDCCH |

FIG.24

| INFORMATION ELEMENT | NUMBER OF BITs | CONTENT |
|---|---|---|
| CARRIER INDICATOR | 0 or 3 | USED WHEN CROSS-CARRIER SCHEDULING IS CONFIGURED IN CA |
| RESOURCE ALLOCATION HEADER | 1 | HEADER INDICATING WHICH TO USE RESOURCE ALLOCATION TYPE 0 or 1 |
| RESOURCE BLOCK ASSIGNMENT | $\lceil N_{RB}^{DL}/P \rceil$ | INDICATING THE ASSIGNMENT NUMBER OF RB AND ASSIGNMENT POSITION (P IS RBG SIZE, VARIABLE ACCORDING TO SYSTEM BANDWIDTH, THE NUMBER OF BITs IN THE LEFT SIDE IS FOR TYPE 0) |
| TPC COMMAND FOR PUCCH | 2 | TPC BIT APPLIED FOR PUCCH TRANSMISSION |
| DOWNLINK ASSIGNMENT INDEX | 2 | TDD UPLINK-DOWNLINK CONFIGURATION (ONLY FOR TDD) |
| HARQ PROCESS NUMBER | 3 or 4 | HARQ PROCESS (3 BITs FOR FDD, 4 BITs FOR TDD) |
| NEW DATA INDICATOR FOR TB1 | 1 | FLAG INDICATING NEW or RETRANSMISSION (FOR TRANSPORT BLOCK 1) |
| REDUNDANCY VERSION FOR TB1 | 2 | INDICATING TRANSMITTED REDUNDANCY BIT PATTERN (FOR TRANSPORT BLOCK 1) |
| MODULATION AND CODING SCHEME FOR TB1 | 5 | MODULATION SCHEME AND CODING RATE, THAT IS, TBS (FOR TRANSPORT BLOCK 1) |
| RI OF 1ST DOMINANT INTERFERENCE CELL | 1 | RANK INFORMATION OF THE MOST DOMINANT INTERFERENCE CELL |
| MODULATION OF 1ST DOMINANT INTERFERING CELL | 2 or 4 | RANK-1: 2 BIT, RANK-2: 4 BIT |
| RI OF 2ND DOMINANT INTERFERENCE CELL | 0 or 1 | RANK INFORMATION OF THE SECOND DOMINANT INTERFERENCE CELL (ONLY WHEN 1ST IS RANK-1) |
| MODULATION OF 1ST DOMINANT INTERFERING CELL | 0 or 2 or 4 | RANK-1: 2 BIT, RANK-2: 4 BIT (ONLY WHEN 1ST IS RANK-1) |
| PRECODING INFORMATION | 0 or 2 | PRECODING INFORMATION (2 ANTENNA PORTs: 0 BIT, 4 ANTENNA PORTs: 2 BIT) |
| HARQ-ACK RESOURCE OFFSET | 2 | INDICATING WHICH PUCCH TO USE, ONLY WHEN TRANSMITTED BY EPDCCH |

0 IS PADDED FOR EXCESS BITs

FIG.25

| INFORMATION ELEMENT | NUMBER OF BITs | CONTENT |
|---|---|---|
| CARRIER INDICATOR | 0 or 3 | USED WHEN CROSS-CARRIER SCHEDULING IS CONFIGURED IN CA |
| RESOURCE ALLOCATION HEADER | 1 | HEADER INDICATING WHICH TO USE RESOURCE ALLOCATION TYPE 0 or 1 |
| RESOURCE BLOCK ASSIGNMENT | $\lceil N_{RB}^{DL}/P \rceil$ | INDICATING THE ASSIGNMENT NUMBER OF RB AND ASSIGNMENT POSITION (P IS RBG SIZE, VARIABLE ACCORDING TO SYSTEM BANDWIDTH, THE NUMBER OF BITs IN THE LEFT SIDE IS FOR TYPE 0) |
| TPC COMMAND FOR PUCCH | 2 | TPC BIT APPLIED FOR PUCCH TRANSMISSION |
| DOWNLINK ASSIGNMENT INDEX | 2 | TDD UPLINK-DOWNLINK CONFIGURATION (ONLY FOR TDD) |
| HARQ PROCESS NUMBER | 3 or 4 | HARQ PROCESS (3 BITs FOR FDD, 4 BITs FOR TDD) |
| ANTENNA PORT(s), SCRAMBLING IDENTITY, NUMBER OF LAYER | 3 | $n^{SCID}$, RI, DM-RS PORT INDEX ARE JOINTLY ENCODED |
| SRS REQUEST | 0 or 1 | ONLY FOR TDD |
| NEW DATA INDICATOR FOR TB1 | 1 | FLAG INDICATING NEW or RETRANSMISSION (FOR TRANSPORT BLOCK 1) |
| REDUNDANCY VERSION FOR TB1 | 2 | INDICATING TRANSMITTED REDUNDANCY BIT PATTERN (FOR TRANSPORT BLOCK 1) |
| MODULATION AND CODING SCHEME FOR TB1 | 5 | MODULATION SCHEME AND CODING RATE, THAT IS, TBS (FOR TRANSPORT BLOCK 1) |
| ANTENNA PORT(s), SCRAMBLING IDENTITY, NUMBER OF LAYER FOR 1ST DOMINANT INTERFERING CELL | 3 | $n^{SCID}$, RI, DM-RS PORT INDEX ARE JOINTLY ENCODED (FOR INTERFERENCE CELL) |
| ANTENNA PORT(s), SCRAMBLING IDENTITY, NUMBER OF LAYER FOR 2ND DOMINANT INTERFERING CELL | 3 | $n^{SCID}$, RI, DM-RS PORT INDEX ARE JOINTLY ENCODED (FOR INTERFERENCE CELL) |
| RESERVE | 2 | |
| HARQ-ACK RESOURCE OFFSET | 2 | INDICATING WHICH PUCCH TO USE, ONLY WHEN TRANSMITTED BY EPDCCH |

EXCESS 2 BITs ARE RESERVED

FIG.26

| INFORMATION ELEMENT | NUMBER OF BITs | CONTENT |
|---|---|---|
| CARRIER INDICATOR | 0 or 3 | USED WHEN CROSS-CARRIER SCHEDULING IS CONFIGURED IN CA |
| RESOURCE ALLOCATION HEADER | 1 | HEADER INDICATING WHICH TO USE RESOURCE ALLOCATION TYPE 0 or 1 |
| RESOURCE BLOCK ASSIGNMENT | $\lceil N_{RB}^{DL}/P \rceil$ | INDICATING THE ASSIGNMENT NUMBER OF RB AND ASSIGNMENT POSITION (P IS RBG SIZE, VARIABLE ACCORDING TO SYSTEM BANDWIDTH, THE NUMBER OF BITs IN THE LEFT SIDE IS FOR TYPE 0) |
| TPC COMMAND FOR PUCCH | 2 | TPC BIT APPLIED FOR PUCCH TRANSMISSION |
| DOWNLINK ASSIGNMENT INDEX | 2 | TDD UPLINK-DOWNLINK CONFIGURATION (ONLY FOR TDD) |
| HARQ PROCESS NUMBER | 3 or 4 | HARQ PROCESS (3 BITs FOR FDD, 4 BITs FOR TDD) |
| ANTENNA PORT(s), SCRAMBLING IDENTITY, NUMBER OF LAYER | 3 | $n^{SCID}$, RI, DM-RS PORT INDEX ARE JOINTLY ENCODED |
| SRS REQUEST | 0 or 1 | ONLY FOR TDD |
| NEW DATA INDICATOR FOR TB1 | 1 | FLAG INDICATING NEW or RETRANSMISSION (FOR TRANSPORT BLOCK 1) |
| REDUNDANCY VERSION FOR TB1 | 2 | INDICATING TRANSMITTED REDUNDANCY BIT PATTERN (FOR TRANSPORT BLOCK 1) |
| MODULATION AND CODING SCHEME FOR TB1 | 5 | MODULATION SCHEME AND CODING RATE, THAT IS, TBS (FOR TRANSPORT BLOCK 1) |
| ANTENNA PORT(s), SCRAMBLING IDENTITY, NUMBER OF LAYER FOR 1ST DOMINANT INTERFERING CELL | 3 | $n^{SCID}$, RI, DM-RS PORT INDEX ARE JOINTLY ENCODED (FOR INTERFERENCE CELL) |
| MODULATION AND CODING SCHEME FOR 1ST DOMINANT INTERFERING CELL | 5 | MODULATION SCHEME AND CODING RATE OF INTERFERENCE CELL |
| HARQ-ACK RESOURCE OFFSET | 2 | INDICATING WHICH PUCCH TO USE ONLY WHEN TRANSMITTED BY EPDCCH |
| PDSCH RE MAPPING AND QUASI-CO-LOCATION INDICATOR | 2 | TP CONFIGURATION IN QCL |

FIG.27

| INFORMATION ELEMENT | NUMBER OF BITs | CONTENT |
|---|---|---|
| CARRIER INDICATOR | 0 or 3 | USED WHEN CROSS-CARRIER SCHEDULING IS CONFIGURED IN CA |
| RESOURCE ALLOCATION HEADER | 1 | HEADER INDICATING WHICH TO USE RESOURCE ALLOCATION TYPE 0 or 1 |
| RESOURCE BLOCK ASSIGNMENT | $\lceil N_{RB}^{DL}/P \rceil$ | INDICATING THE ASSIGNMENT NUMBER OF RB AND ASSIGNMENT POSITION (P IS RBG SIZE, VARIABLE ACCORDING TO SYSTEM BANDWIDTH, THE NUMBER OF BITs IN THE LEFT SIDE IS FOR TYPE 0) |
| TPC COMMAND FOR PUCCH | 2 | TPC BIT APPLIED FOR PUCCH TRANSMISSION |
| DOWNLINK ASSIGNMENT INDEX | 2 | TDD UPLINK-DOWNLINK CONFIGURATION (ONLY FOR TDD) |
| HARQ PROCESS NUMBER | 3 or 4 | HARQ PROCESS (3 BITs FOR FDD, 4 BITs FOR TDD) |
| ANTENNA PORT(s), SCRAMBLING IDENTITY, NUMBER OF LAYER | 3 | $n^{SCID}$, RI, DM-RS PORT INDEX ARE JOINTLY ENCODED |
| SRS REQUEST | 0 or 1 | ONLY FOR TDD |
| NEW DATA INDICATOR FOR TB1 | 1 | FLAG INDICATING NEW or RETRANSMISSION (FOR TRANSPORT BLOCK 1) |
| REDUNDANCY VERSION FOR TB1 | 2 | INDICATING TRANSMITTED REDUNDANCY BIT PATTERN (FOR TRANSPORT BLOCK 1) |
| MODULATION AND CODING SCHEME FOR TB1 | 5 | MODULATION SCHEME AND CODING RATE, THAT IS, TBS (FOR TRANSPORT BLOCK 1) |
| NEW DATA INDICATOR FOR TB2 | 1 | FLAG INDICATING NEW or RETRANSMISSION (FOR TRANSPORT BLOCK 2) |
| REDUNDANCY VERSION FOR TB2 | 2 | INDICATING TRANSMITTED REDUNDANCY BIT PATTERN (FOR TRANSPORT BLOCK 2) |
| MODULATION AND CODING SCHEME FOR TB2 | 5 | MODULATION SCHEME AND CODING RATE, THAT IS, TBS (FOR TRANSPORT BLOCK 2) |
| HARQ-ACK RESOURCE OFFSET | 2 | INDICATING WHICH PUCCH TO USE, ONLY WHEN TRANSMITTED BY EPDCCH |
| PDSCH RE MAPPING AND QUASI-CO-LOCATION INDICATOR | 2 | TP CONFIGURATION IN QCL<br>→ BITs ADDED FROM DCI FORMAT 2C FOR CoMP |

CAN BE REPLACED IN PRECONDITION THAT CoMP IS NOT PERFORMED (2 BITs)

FIG.28

| INFORMATION ELEMENT | NUMBER OF BITs | CONTENT |
|---|---|---|
| CARRIER INDICATOR | 0 or 3 | USED WHEN CROSS-CARRIER SCHEDULING IS CONFIGURED IN CA |
| RESOURCE ALLOCATION HEADER | 1 | HEADER INDICATING WHICH TO USE RESOURCE ALLOCATION TYPE 0 or 1 |
| RESOURCE BLOCK ASSIGNMENT | $\lceil N_{RB}^{DL}/P \rceil$ | INDICATING THE ASSIGNMENT NUMBER OF RB AND ASSIGNMENT POSITION (P IS RBG SIZE, VARIABLE ACCORDING TO SYSTEM BANDWIDTH, THE NUMBER OF BITs IN THE LEFT SIDE IS FOR TYPE 0) |
| TPC COMMAND FOR PUCCH | 2 | TPC BIT APPLIED FOR PUCCH TRANSMISSION |
| DOWNLINK ASSIGNMENT INDEX | 2 | TDD UPLINK-DOWNLINK CONFIGURATION (ONLY FOR TDD) |
| HARQ PROCESS NUMBER | 3 or 4 | HARQ PROCESS (3 BITs FOR FDD, 4 BITs FOR TDD) |
| ANTENNA PORT(s), SCRAMBLING IDENTITY, NUMBER OF LAYER | 3 | $n^{SCID}$, RI, DM-RS PORT INDEX ARE JOINTLY ENCODED |
| SRS REQUEST | 0 or 1 | ONLY FOR TDD |
| NEW DATA INDICATOR FOR TB1 | 1 | FLAG INDICATING NEW or RETRANSMISSION (FOR TRANSPORT BLOCK 1) |
| REDUNDANCY VERSION FOR TB1 | 2 | INDICATING TRANSMITTED REDUNDANCY BIT PATTERN (FOR TRANSPORT BLOCK 1) |
| MODULATION AND CODING SCHEME FOR TB1 | 5 | MODULATION SCHEME AND CODING RATE, THAT IS, TBS (FOR TRANSPORT BLOCK 1) |
| NEW DATA INDICATOR FOR TB2 | 1 | FLAG INDICATING NEW or RETRANSMISSION (FOR TRANSPORT BLOCK 2) |
| REDUNDANCY VERSION FOR TB2 | 2 | INDICATING TRANSMITTED REDUNDANCY BIT PATTERN (FOR TRANSPORT BLOCK 2) |
| MODULATION AND CODING SCHEME FOR TB2 | 5 | MODULATION SCHEME AND CODING RATE, THAT IS, TBS (FOR TRANSPORT BLOCK 2) |
| HARQ-ACK RESOURCE OFFSET | 2 | INDICATING WHICH PUCCH TO USE, ONLY WHEN TRANSMITTED BY EPDCCH |
| MODULATION SCHEME FOR 1ST DOMINANT INTERFERING CELL | 2 | MODULATION SCHEME OF THE MOST DOMINANT INTERFERENCE CELL |

FIG.29

| INFORMATION ELEMENT | NUMBER OF BITs | CONTENT |
|---|---|---|
| CARRIER INDICATOR | 0 or 3 | USED WHEN CROSS-CARRIER SCHEDULING IS CONFIGURED IN CA |
| RESOURCE ALLOCATION HEADER | 1 | HEADER INDICATING WHICH TO USE RESOURCE ALLOCATION TYPE 0 or 1 |
| RESOURCE BLOCK ASSIGNMENT | $\lceil N_{RB}^{DL}/P \rceil$ | INDICATING THE ASSIGNMENT NUMBER OF RB AND ASSIGNMENT POSITION (P IS RBG SIZE, VARIABLE ACCORDING TO SYSTEM BANDWIDTH, THE NUMBER OF BITs IN THE LEFT SIDE IS FOR TYPE 0) |
| TPC COMMAND FOR PUCCH | 2 | TPC BIT APPLIED FOR PUCCH TRANSMISSION |
| DOWNLINK ASSIGNMENT INDEX | 2 | TDD UPLINK-DOWNLINK CONFIGURATION (ONLY FOR TDD) |
| HARQ PROCESS NUMBER | 3 or 4 | HARQ PROCESS (3 BITs FOR FDD, 4 BITs FOR TDD) |
| NEW DATA INDICATOR FOR TB1 | 1 | FLAG INDICATING NEW or RETRANSMISSION (FOR TRANSPORT BLOCK 1) |
| REDUNDANCY VERSION FOR TB1 | 2 | INDICATING TRANSMITTED REDUNDANCY BIT PATTERN (FOR TRANSPORT BLOCK 1) |
| MODULATION AND CODING SCHEME FOR TB1 | 5 | MODULATION SCHEME AND CODING RATE, THAT IS, TBS (FOR TRANSPORT BLOCK 1) |
| NEW DATA INDICATOR FOR TB2 | 1 | FLAG INDICATING NEW or RETRANSMISSION (FOR TRANSPORT BLOCK 2) |
| REDUNDANCY VERSION FOR TB2 | 2 | INDICATING TRANSMITTED REDUNDANCY BIT PATTERN (FOR TRANSPORT BLOCK 2) |
| MODULATION AND CODING SCHEME FOR TB2 | 5 | MODULATION SCHEME AND CODING RATE, THAT IS, TBS (FOR TRANSPORT BLOCK 2) |
| TRANSPORT BLOCK TO CODEWORD SWAP FLAG | 1 | FLAG INDICATING WHETHER TO SWAP MAPPING OF TRANSPORT BLOCK AND CODEWORD |
| PRECODING INFORMATION | 3 or 6 | PRECODING INFORMATION (2 ANTENNA PORTs: 3 BIT, 4 ANTENNA PORTs: 6 BIT) |
| HARQ-ACK RESOURCE OFFSET | 2 | INDICATING WHICH PUCCH TO USE, ONLY WHEN TRANSMITTED BY EPDCCH |
| INTERFERENCE INFORMATION FLAG | 1 | 1 WHEN REPLACEMENT IS PERFORMED |

FIG.30

| INFORMATION ELEMENT | NUMBER OF BITs | CONTENT |
|---|---|---|
| CARRIER INDICATOR | 0 or 3 | USED WHEN CROSS-CARRIER SCHEDULING IS CONFIGURED IN CA |
| RESOURCE ALLOCATION HEADER | 1 | HEADER INDICATING WHICH TO USE RESOURCE ALLOCATION TYPE 0 or 1 |
| RESOURCE BLOCK ASSIGNMENT | $\lceil N_{RB}^{DL}/P \rceil$ | INDICATING THE ASSIGNMENT NUMBER OF RB AND ASSIGNMENT POSITION (P IS RBG SIZE, VARIABLE ACCORDING TO SYSTEM BANDWIDTH, THE NUMBER OF BITs IN THE LEFT SIDE IS FOR TYPE 0) |
| TPC COMMAND FOR PUCCH | 2 | TPC BIT APPLIED FOR PUCCH TRANSMISSION |
| DOWNLINK ASSIGNMENT INDEX | 2 | TDD UPLINK-DOWNLINK CONFIGURATION (ONLY FOR TDD) |
| HARQ PROCESS NUMBER | 3 or 4 | HARQ PROCESS (3 BITs FOR FDD, 4 BITs FOR TDD) |
| NEW DATA INDICATOR FOR TB1 | 1 | FLAG INDICATING NEW or RETRANSMISSION (FOR TRANSPORT BLOCK 1) |
| REDUNDANCY VERSION FOR TB1 | 2 | INDICATING TRANSMITTED REDUNDANCY BIT PATTERN (FOR TRANSPORT BLOCK 1) |
| MODULATION AND CODING SCHEME FOR TB1 | 5 | MODULATION SCHEME AND CODING RATE, THAT IS, TBS (FOR TRANSPORT BLOCK 1) |
| NEW DATA INDICATOR FOR TB2 | 1 | FLAG INDICATING NEW or RETRANSMISSION (FOR TRANSPORT BLOCK 2) |
| REDUNDANCY VERSION FOR TB2 | 2 | INDICATING TRANSMITTED REDUNDANCY BIT PATTERN (FOR TRANSPORT BLOCK 2) |
| MODULATION AND CODING SCHEME FOR TB2 | 5 | MODULATION SCHEME AND CODING RATE, THAT IS, TBS (FOR TRANSPORT BLOCK 2) |
| TRANSPORT BLOCK TO CODEWORD SWAP FLAG | 1 | FLAG INDICATING WHETHER TO SWAP MAPPING OF TRANSPORT BLOCK AND CODEWORD |
| PRECODING INFORMATION | 3 or 6 | PRECODING INFORMATION (2 ANTENNA PORTs: 3 BIT, 4 ANTENNA PORTs: 6 BIT) |
| HARQ-ACK RESOURCE OFFSET | 2 | INDICATING WHICH PUCCH TO USE, ONLY WHEN TRANSMITTED BY EPDCCH |

REPLACEMENT AVAILABLE REGION (4 BITs)

29-30 OF 0-31 OF MCS ARE RESERVED
↑ 29 (=11101) IS USED AS REPLACEMENT NOTIFICATION FLAG, FOR EXAMPLE

FIG.33

| INFORMATION ELEMENT | NUMBER OF BITs | CONTENT |
|---|---|---|
| CARRIER INDICATOR | 0 or 3 | USED WHEN CROSS-CARRIER SCHEDULING IS CONFIGURED IN CA |
| RESOURCE ALLOCATION HEADER | 1 | HEADER INDICATING WHICH TO USE RESOURCE ALLOCATION TYPE 0 or 1 |
| RESOURCE BLOCK ASSIGNMENT | $\lceil N_{RB}^{DL}/P \rceil$ | INDICATING THE ASSIGNMENT NUMBER OF RB AND ASSIGNMENT POSITION (P IS RBG SIZE, VARIABLE ACCORDING TO SYSTEM BANDWIDTH, THE NUMBER OF BITs IN THE LEFT SIDE IS FOR TYPE 0) |
| TPC COMMAND FOR PUCCH | 2 | TPC BIT APPLIED FOR PUCCH TRANSMISSION |
| DOWNLINK ASSIGNMENT INDEX | 2 | TDD UPLINK-DOWNLINK CONFIGURATION (ONLY FOR TDD) |
| HARQ PROCESS NUMBER | 3 or 4 | HARQ PROCESS (3 BITs FOR FDD, 4 BITs FOR TDD) |
| NEW DATA INDICATOR FOR TB1 | 1 | FLAG INDICATING NEW or RETRANSMISSION (FOR TRANSPORT BLOCK 1) |
| REDUNDANCY VERSION FOR TB1 | 2 | INDICATING TRANSMITTED REDUNDANCY BIT PATTERN (FOR TRANSPORT BLOCK 1) |
| MODULATION AND CODING SCHEME FOR TB1 | 5 | MODULATION SCHEME AND CODING RATE, THAT IS, TBS (FOR TRANSPORT BLOCK 1) |
| NEW DATA INDICATOR FOR TB2 | 1 | FLAG INDICATING NEW or RETRANSMISSION (FOR TRANSPORT BLOCK 2) |
| REDUNDANCY VERSION FOR TB2 | 2 | INDICATING TRANSMITTED REDUNDANCY BIT PATTERN (FOR TRANSPORT BLOCK 2) |
| MODULATION AND CODING SCHEME FOR TB2 | 5 | MODULATION SCHEME AND CODING RATE, THAT IS, TBS (FOR TRANSPORT BLOCK 2) |
| TRANSPORT BLOCK TO CODEWORD SWAP FLAG | 1 | FLAG INDICATING WHETHER TO SWAP MAPPING OF TRANSPORT BLOCK AND CODEWORD |
| PRECODING INFORMATION | 3 or 6 | PRECODING INFORMATION (2 ANTENNA PORTs: 3 BIT, 4 ANTENNA PORTs: 6 BIT) |
| HARQ-ACK RESOURCE OFFSET | 2 | INDICATING WHICH PUCCH TO USE, ONLY WHEN TRANSMITTED BY EPDCCH |

| (WHEN THE NUMBER OF TBs = 1) | | (WHEN THE NUMBER OF TBs = 2) | |
|---|---|---|---|
| One codeword: Codeword 0 enabled, Codeword 1 disabled | | Two codewords: Codeword 0 enabled, Codeword 1 enabled | |
| Bit field mapped to index | Message | Bit field mapped to index | Message |
| 0 | 2 layers: Transmit diversity | 0 | 2 layers: Precoding corresponding to precoder matrix $\frac{1}{2}\begin{bmatrix}1 & 1\\1 & -1\end{bmatrix}$ |
| 1 | 1 layer: Precoding corresponding to precoding vector $[1\ 1]^T/\sqrt{2}$ | 1 | 2 layers: Precoding corresponding to precoder matrix $\frac{1}{2}\begin{bmatrix}1 & 1\\j & -j\end{bmatrix}$ |
| 2 | 1 layer: Precoding corresponding to precoder vector $[1\ -1]^T/\sqrt{2}$ | 2 | 2 layers: Precoding according to the latest PMI report on PUSCH, using the precoder(s) indicated by the reported PMI(s) |
| 3 | 1 layer: Precoding corresponding to precoder vector $[1\ j]^T/\sqrt{2}$ | 3 | reserved |
| 4 | 1 layer: Precoding corresponding to precoder vector $[1\ -j]^T/\sqrt{2}$ | 4 | reserved |
| 5 | 1 layer: Precoding according to the latest PMI report on PUSCH, using the precoder(s) indicated by the reported PMI(s), if RI=2 was reported, using 1st column multiplied by $\sqrt{2}$ of all precoders implied by the reported PMI(s) | 5 | reserved |
| 6 | 1 layer: Precoding according to the latest PMI report on PUSCH, using the precoder(s) indicated by the reported PMI(s), if RI=2 was reported, using 2nd column multiplied by $\sqrt{2}$ of all precoders implied by the reported PMI(s) | 6 | reserved |
| 7 | reserved | 7 | reserved |

| INFORMATION ELEMENT | NUMBER OF BITs | CONTENT |
|---|---|---|
| CARRIER INDICATOR | 0 or 3 | USED WHEN CROSS-CARRIER SCHEDULING IS CONFIGURED IN CA |
| RESOURCE ALLOCATION HEADER | 1 | HEADER INDICATING WHICH TO USE RESOURCE ALLOCATION TYPE 0 or 1 |
| RESOURCE BLOCK ASSIGNMENT |  | INDICATING THE ASSIGNMENT NUMBER OF RB AND ASSIGNMENT POSITION (P IS RBG SIZE, VARIABLE ACCORDING TO SYSTEM BANDWIDTH, THE NUMBER OF BITs IN THE LEFT SIDE IS FOR TYPE 0) |
| TPC COMMAND FOR PUCCH | 2 | TPC BIT APPLIED FOR PUCCH TRANSMISSION |
| DOWNLINK ASSIGNMENT INDEX | 2 | TDD UPLINK-DOWNLINK CONFIGURATION (ONLY FOR TDD) |
| HARQ PROCESS NUMBER | 3 or 4 | HARQ PROCESS (3 BITs FOR FDD, 4 BITs FOR TDD) |
| NEW DATA INDICATOR FOR TB1 | 1 | FLAG INDICATING NEW or RETRANSMISSION (FOR TRANSPORT BLOCK 1) |
| REDUNDANCY VERSION FOR TB1 | 2 | INDICATING TRANSMITTED REDUNDANCY BIT PATTERN (FOR TRANSPORT BLOCK 1) |
| MODULATION AND CODING SCHEME FOR TB1 | 5 | MODULATION SCHEME AND CODING RATE, THAT IS, TBS (FOR TRANSPORT BLOCK 1) |
| NEW DATA INDICATOR FOR TB2 | 1 | FLAG INDICATING NEW or RETRANSMISSION (FOR TRANSPORT BLOCK 2) |
| REDUNDANCY VERSION FOR TB2 | 2 | INDICATING TRANSMITTED REDUNDANCY BIT PATTERN (FOR TRANSPORT BLOCK 2) |
| MODULATION AND CODING SCHEME FOR TB2 | 5 | MODULATION SCHEME AND CODING RATE, THAT IS, TBS (FOR TRANSPORT BLOCK 2) |
| TRANSPORT BLOCK TO CODEWORD SWAP FLAG | 1 | FLAG INDICATING WHETHER TO SWAP MAPPING OF TRANSPORT BLOCK AND CODEWORD |
| PRECODING INFORMATION | 3 or 6 | PRECODING INFORMATION (2 ANTENNA PORTs: 3 BIT, 4 ANTENNA PORTs: 6 BIT) |
| HARQ-ACK RESOURCE OFFSET | 2 | INDICATING WHICH PUCCH TO USE, ONLY WHEN TRANSMITTED BY EPDCCH |

WHEN REDUNDANCY VERSION IS 1 AND MCS IS 0, IT IS DEFINED THAT THE TB IS DISABLED (ENABLED IN OTHER CASES)
→ REFER TO TABLE FOR 1 CODEWORD WHEN EITHER ONE TB IS DISABLED (THE NUMBER OF TB IS 1), REFER TO TABLE FOR 2 CODEWORD WHEN BOTH TBs ARE ENABLED (THE NUMBER OF TB IS 2)

PRECODING INFORMATION TABLE

| BIT | FOR 1TB | FOR 2TB |
|---|---|---|
| 0 | | |
| 1 | | |
| 2 | | |
| 3 | | 0 FOR 1TB |
| 4 | | 1 FOR 1TB |
| 5 | | 2 FOR 1TB |
| 6 | | 3 FOR 1TB |
| 7 | | 4 FOR 1TB |

RESERVE BIT (bits 3–7 for 2TB column)

| INFORMATION ELEMENT | NUMBER OF BITs | CONTENT |
|---|---|---|
| CARRIER INDICATOR | 0 or 3 | USED WHEN CROSS-CARRIER SCHEDULING IS CONFIGURED IN CA |
| RESOURCE ALLOCATION HEADER | 1 | HEADER INDICATING WHICH TO USE RESOURCE ALLOCATION TYPE 0 or 1 |
| RESOURCE BLOCK ASSIGNMENT | | INDICATING THE ASSIGNMENT NUMBER OF RB AND ASSIGNMENT POSITION (P IS RBG SIZE, VARIABLE ACCORDING TO SYSTEM BANDWIDTH, THE NUMBER OF BITs IN THE LEFT SIDE IS FOR TYPE 0) |
| TPC COMMAND FOR PUCCH | 2 | TPC BIT APPLIED FOR PUCCH TRANSMISSION |
| DOWNLINK ASSIGNMENT INDEX | 2 | TDD UPLINK-DOWNLINK CONFIGURATION (ONLY FOR TDD) |
| HARQ PROCESS NUMBER | 3 or 4 | HARQ PROCESS (3 BITs FOR FDD, 4 BITs FOR TDD) |
| ANTENNA PORT(s), SCRAMBLING IDENTITY, NUMBER OF LAYER | 3 | $n^{SCID}$, RI, DM-RS PORT INDEX ARE JOINTLY ENCODED |
| SRS REQUEST | 0 or 1 | ONLY FOR TDD |
| NEW DATA INDICATOR FOR TB1 | 1 | FLAG INDICATING NEW or RETRANSMISSION (FOR TRANSPORT BLOCK 1) |
| REDUNDANCY VERSION FOR TB1 | 2 | INDICATING TRANSMITTED REDUNDANCY BIT PATTERN (FOR TRANSPORT BLOCK 1) |
| MODULATION AND CODING SCHEME FOR TB1 | 5 | MODULATION SCHEME AND CODING RATE, THAT IS, TBS (FOR TRANSPORT BLOCK 1) |
| NEW DATA INDICATOR FOR TB2 | 1 | FLAG INDICATING NEW or RETRANSMISSION (FOR TRANSPORT BLOCK 2) |
| REDUNDANCY VERSION FOR TB2 | 2 | INDICATING TRANSMITTED REDUNDANCY BIT PATTERN (FOR TRANSPORT BLOCK 2) |
| MODULATION AND CODING SCHEME FOR TB2 | 5 | MODULATION SCHEME AND CODING RATE, THAT IS, TBS (FOR TRANSPORT BLOCK 2) |
| HARQ-ACK RESOURCE OFFSET | 2 | INDICATING WHICH PUCCH TO USE, ONLY WHEN TRANSMITTED BY EPDCCH |

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID}=0$ | 0 | 2 layers, ports 7-8, $n_{SCID}=0$ |
| 1 | 1 layer, port 7, $n_{SCID}=1$ | 1 | 2 layers, ports 7-8, $n_{SCID}=1$ |
| 2 | 1 layer, port 8, $n_{SCID}=0$ | 2 | 3 layers, ports 7-9 |
| 3 | 1 layer, port 8, $n_{SCID}=1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

FIG.40

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID}=0$ | 0 | 2 layers, ports 7-8, $n_{SCID}=0$ |
| 1 | 1 layer, port 7, $n_{SCID}=1$ | 1 | 2 layers, ports 7-8, $n_{SCID}=1$ |
| 2 | 1 layer, port 8, $n_{SCID}=0$ | 2 | 3 layers, ports 7-9 |
| 3 | 1 layer, port 8, $n_{SCID}=1$ | 3 | 4 layers, ports 7-10 |
| 4 | 2 layers, ports 7-8 | 4 | 1 layer, port 7, $n_{SCID}=0$ |
| 5 | 3 layers, ports 7-9 | 5 | 1 layer, port 7, $n_{SCID}=1$ |
| 6 | 4 layers, ports 7-10 | 6 | 1 layer, port 8, $n_{SCID}=0$ |
| 7 | Reserved | 7 | 1 layer, port 8, $n_{SCID}=1$ |

| INFORMATION ELEMENT | NUMBER OF BITs | CONTENT |
|---|---|---|
| CARRIER INDICATOR | 0 or 3 | USED WHEN CROSS-CARRIER SCHEDULING IS CONFIGURED IN CA |
| RESOURCE ALLOCATION HEADER | 1 | HEADER INDICATING WHICH TO USE RESOURCE ALLOCATION TYPE 0 or 1 |
| RESOURCE BLOCK ASSIGNMENT | $\lceil N_{RB}^{DL}/P \rceil$ | INDICATING THE ASSIGNMENT NUMBER OF RB AND ASSIGNMENT POSITION (P IS RBG SIZE, VARIABLE ACCORDING TO SYSTEM BANDWIDTH, THE NUMBER OF BITs IN THE LEFT SIDE IS FOR TYPE 0) |
| TPC COMMAND FOR PUCCH | 2 | TPC BIT APPLIED FOR PUCCH TRANSMISSION |
| DOWNLINK ASSIGNMENT INDEX | 2 | TDD UPLINK-DOWNLINK CONFIGURATION (ONLY FOR TDD) |
| HARQ PROCESS NUMBER | 3 or 4 | HARQ PROCESS (3 BITs FOR FDD, 4 BITs FOR TDD) |
| NEW DATA INDICATOR FOR TB1 | 1 | FLAG INDICATING NEW or RETRANSMISSION (FOR TRANSPORT BLOCK 1) |
| REDUNDANCY VERSION FOR TB1 | 2 | INDICATING TRANSMITTED REDUNDANCY BIT PATTERN (FOR TRANSPORT BLOCK 1) |
| MODULATION AND CODING SCHEME FOR TB1 | 5 | MODULATION SCHEME AND CODING RATE, THAT IS, TBS (FOR TRANSPORT BLOCK 1) |
| NEW DATA INDICATOR FOR TB2 | 1 | FLAG INDICATING NEW or RETRANSMISSION (FOR TRANSPORT BLOCK 2) |
| REDUNDANCY VERSION FOR TB2 | 2 | INDICATING TRANSMITTED REDUNDANCY BIT PATTERN (FOR TRANSPORT BLOCK 2) |
| MODULATION AND CODING SCHEME FOR TB2 | 5 | MODULATION SCHEME AND CODING RATE, THAT IS, TBS (FOR TRANSPORT BLOCK 2) |
| TRANSPORT BLOCK TO CODEWORD SWAP FLAG | 1 | FLAG INDICATING WHETHER TO SWAP MAPPING OF TRANSPORT BLOCK AND CODEWORD |
| PRECODING INFORMATION | 0 or 2 | PRECODING INFORMATION (2 ANTENNA PORTs: 0 BIT, 4 ANTENNA PORTs: 2 BIT) |
| HARQ-ACK RESOURCE OFFSET | 2 | INDICATING WHICH PUCCH TO USE, ONLY WHEN TRANSMITTED BY EPDCCH |
|  |  | REPLACEMENT AVAILABLE REGION (1 BIT) |

WHEN REDUNDANCY VERSION IS 1 AND MCS IS 0,
IT IS DEFINED THAT THE TB IS DISABLED [B], THUS,
IT IS NOT ASSUMED THAT NEW DATA INDICATION BECOMES 1
→ REDUNDANCY VERSION 1, MCS 0, AND NEW DATA INDICATION 1 ARE USED FOR REPLACEMENT FLAG

FIG.41

| INFORMATION ELEMENT | NUMBER OF BITs | CONTENT |
|---|---|---|
| CARRIER INDICATOR | 0 or 3 | USED WHEN CROSS-CARRIER SCHEDULING IS CONFIGURED IN CA |
| RESOURCE ALLOCATION HEADER | 1 | HEADER INDICATING WHICH TO USE RESOURCE ALLOCATION TYPE 0 or 1 |
| RESOURCE BLOCK ASSIGNMENT | $\lceil N_{RB}^{DL}/P \rceil$ | INDICATING THE ASSIGNMENT NUMBER OF RB AND ASSIGNMENT POSITION (P IS RBG SIZE, VARIABLE ACCORDING TO SYSTEM BANDWIDTH, THE NUMBER OF BITs IN THE LEFT SIDE IS FOR TYPE 0) |
| TPC COMMAND FOR PUCCH | 2 | TPC BIT APPLIED FOR PUCCH TRANSMISSION |
| DOWNLINK ASSIGNMENT INDEX | 2 | TDD UPLINK-DOWNLINK CONFIGURATION (ONLY FOR TDD) |
| HARQ PROCESS NUMBER | 3 or 4 | HARQ PROCESS (3 BITs FOR FDD, 4 BITs FOR TDD) |
| NEW DATA INDICATOR FOR TB1 | 1 | FLAG INDICATING NEW or RETRANSMISSION (FOR TRANSPORT BLOCK 1) |
| REDUNDANCY VERSION FOR TB1 | 2 | INDICATING TRANSMITTED REDUNDANCY BIT PATTERN (FOR TRANSPORT BLOCK 1) |
| MODULATION AND CODING SCHEME FOR TB1 | 5 | MODULATION SCHEME AND CODING RATE, THAT IS, TBS (FOR TRANSPORT BLOCK 1) |
| PMI FOR 1ST DOMINANT INTERFERING CELL | 2 | WHEN THE NUMBER OF TRANSMISSION ANTENNAs IS 4, GRANULARITY IS DECREASED SINCE 4 BITs ARE NECESSARY |
| PMI FOR 2ND DOMINANT INTERFERING CELL | 2 | WHEN THE NUMBER OF TRANSMISSION ANTENNAs IS 4, GRANULARITY IS DECREASED SINCE 4 BITs ARE NECESSARY |
| MODULATION AND CODING SCHEME FOR TB2 | 5 | MODULATION SCHEME AND CODING RATE, THAT IS, TBS (FOR TRANSPORT BLOCK 2) |
| PRECODING INFORMATION | 3 or 6 | PRECODING INFORMATION (2 ANTENNA PORTs: 3 BIT, 4 ANTENNA PORTs: 6 BIT) |
| HARQ-ACK RESOURCE OFFSET | 2 | INDICATING WHICH PUCCH TO USE, ONLY WHEN TRANSMITTED BY EPDCCH |

MCS29 (=11101) IS USED AS REPLACEMENT NOTIFICATION FLAG

SINCE INTERFERENCE CELL IS ASSUMED TO USE QPSK, RANK=1, IT IS NOT NECESSARY TO NOTIFY OF MODULATION SCHEME AND RI
→ BOTH OF IRC AND SIC CAN BE PERFORMED IN THIS CASE (TURBO SIC IS NOT AVAILABLE)

| INFORMATION ELEMENT | NUMBER OF BITs | CONTENT |
|---|---|---|
| CARRIER INDICATOR | 0 or 3 | USED WHEN CROSS-CARRIER SCHEDULING IS CONFIGURED IN CA |
| RESOURCE ALLOCATION HEADER | 1 | HEADER INDICATING WHICH TO USE RESOURCE ALLOCATION TYPE 0 or 1 |
| RESOURCE BLOCK ASSIGNMENT | $\lceil N_{RB}^{DL}/P \rceil$ | INDICATING THE ASSIGNMENT NUMBER OF RB AND ASSIGNMENT POSITION (P IS RBG SIZE, VARIABLE ACCORDING TO SYSTEM BANDWIDTH, THE NUMBER OF BITs IN THE LEFT SIDE IS FOR TYPE 0) |
| TPC COMMAND FOR PUCCH | 2 | TPC BIT APPLIED FOR PUCCH TRANSMISSION |
| DOWNLINK ASSIGNMENT INDEX | 2 | TDD UPLINK-DOWNLINK CONFIGURATION (ONLY FOR TDD) |
| HARQ PROCESS NUMBER | 3 or 4 | HARQ PROCESS (3 BITs FOR FDD, 4 BITs FOR TDD) |
| NEW DATA INDICATOR FOR TB1 | 1 | FLAG INDICATING NEW or RETRANSMISSION (FOR TRANSPORT BLOCK 1) |
| REDUNDANCY VERSION FOR TB1 | 2 | INDICATING TRANSMITTED REDUNDANCY BIT PATTERN (FOR TRANSPORT BLOCK 1) |
| MODULATION AND CODING SCHEME FOR TB1 | 5 | MODULATION SCHEME AND CODING RATE, THAT IS, TBS (FOR TRANSPORT BLOCK 1) |
| NEW DATA INDICATOR FOR TB2 | 1 | FLAG INDICATING NEW or RETRANSMISSION (FOR TRANSPORT BLOCK 2) |
| REDUNDANCY VERSION FOR TB2 | 2 | INDICATING TRANSMITTED REDUNDANCY BIT PATTERN (FOR TRANSPORT BLOCK 2) |
| MODULATION AND CODING SCHEME FOR TB2 | 5 | MODULATION SCHEME AND CODING RATE, THAT IS, TBS (FOR TRANSPORT BLOCK 2) |
| RESERVE | 1 | |
| PRECODING INFORMATION | 0 or 2 | PRECODING INFORMATION (2 ANTENNA PORTs: 0 BIT, 4 ANTENNA PORTs: 2 BIT) |
| HARQ-ACK RESOURCE OFFSET | 2 | INDICATING WHICH PUCCH TO USE, ONLY WHEN TRANSMITTED BY EPDCCH |

REPLACEMENT FLAG
(REDUNDANCY VERSION 1, MCS 0,
NEW DATA INDICATOR 1)

REPLACEMENT AVAILABLE REGION (1 BIT)
→ SINCE INTERFERENCE CELL IS ASSUMED TO USE QPSK, RANK-1 TRANSMISSION, IRC AND SIC ARE AVAILABLE ONLY BY NOTIFICATION OF FLAG (TURBO SIC IS NOT AVAILABLE)

FIG.47

PMI FOR
TRANSMISSION
- PMI #1  ⎤ REPORTED PMI
- PMI #2  ⎦ IS #1              ⎤ IT IS POSSIBLE
- PMI #3  ⎤ REPORTED PMI  ⎦ TO SEND BY 1 BIT
- PMI #4  ⎦ IS #3

FIG.48

| Value of 'PDSCH RE Mapping and Quasi-Co-Location Indicator' field | Description |
|---|---|
| 00 | Parameter set 1 configured by higher layers |
| 01 | Parameter set 2 configured by higher layers |
| 10 | Parameter set 3 configured by higher layers |
| 11 | Parameter set 4 configured by higher layers |

| | INFORMATION NECESSARY FOR IRC TYPE 1 | INFORMATION SENT BY RRC |
|---|---|---|
| CRS BASED | • PCID<br>• NUMBER OF CRS ANTENNA PORTs<br>• MBSFN CONFIG.<br>• CRS POWER BOOSTING INFORMATION<br>• SYSTEM BANDWIDTH<br>• $Ncp$<br>• RI, PMI (ONLY WHEN PRECODING TRANSMISSION) | • PCID<br>• NUMBER OF CRS ANTENNA PORTs<br>• MBSFN CONFIG.<br>• CRS POWER BOOSTING INFORMATION |
| CSI-RS BASED | • PCID or VCID<br>• NUMBER OF CSI-RS ANTENNA PORTs<br>• CSI-RS POWER BOOSTING INFORMATION<br>• SYSTEM BANDWIDTH<br>• $Ncp$<br>• RI, PMI (ONLY WHEN PRECODING TRANSMISSION) | • PCID and VCID<br>• NUMBER OF CSI-RS ANTENNA PORTs<br>• CSI-RS POWER BOOSTING INFORMATION<br>LACKING INFORMATION |
| OTHER | • USER ASSIGNMENT INFORMATION | • PDSCH START SYMBOL |

FIG.49

USER APPARATUS, BASE STATION, INTERFERENCE REDUCING METHOD AND INTERFERENCE REDUCING CONTROL INFORMATION NOTIFICATION METHOD

TECHNICAL FIELD

The present invention relates to a base station and a user apparatus in a radio communication system.

BACKGROUND ART

In LTE (Long Term Evolution) Advanced in 3GPP (Third Generation Partnership Project), OFDMA (Orthogonal Frequency Division Multiplexing Access) using MU-MIMO (multi-user multiple-input multiple-output) is proposed. In downlink transmission of MU-MIMO, one base station can communicate with a plurality of user apparatuses, and in addition to that, the base station can also transmit different data streams (layers) to one user apparatus at the same time.

Also, in the LTE-Advanced, in the downlink communication, various techniques are considered for reducing (suppressing, removing, for example), at the user apparatus, interference of an interference radio beam from an interference base station against a desired radio beam from a connecting base station, and interference of signals to other users at the connecting base station.

In the technique for reducing such interferences, for example, as shown in FIG. 1, in a case where a user apparatus 10 resides near a border of a connecting cell (cell of a connecting base station 1, serving cell), so the user apparatus 10 strongly receives an interference radio beam from another base station 2 (interference base station) adjacent to the desired base station 1, the user apparatus 10 can improve reception quality of the desired signal carried on a desired radio beam by performing interference reduction processing. In FIG. 1, a beam generated by the interference base station 2, that is, a part of beams for a downlink channel to other user apparatus (user apparatus 11, for example) becomes an interference signal for the user apparatus 10. FIG. 1 especially shows interference from an interference cell.

RELATED ART DOCUMENT

Non-Patent Document

Non-Patent Document 1: 3GPP, R1-124010, Section 6.10.5.1
Non-Patent Document 2: P. Hoeher et. al., "Two-dimensional pilot-symbol-aided channel estimation by Wiener filtering," Proc. ICASSP'97, 1997
Non-Patent Document 3: Axnas J. et. al., "Successive Interference Cancellation Techniques for LTE Downlink," PIMRC 2011.
Non-Patent Document 4: 3GPP, TS36.212 V11.2.0
Non-Patent Document 5: 3GPP, 36.213 (V11.2.0), 7.1.7.2
Non-Patent Document 6: 3GPP, R1-125353
Non-Patent Document 7: 3GPP, R1-124669

SUMMARY OF THE INVENTION

Problem to be Solved by the Invention

In the following, outlines of techniques for interference reduction such as interference suppression and removing and the like in a conventional technique are described, and a problem to be solved by the present invention is described.

<Interference Rejection Combining Reception>

There is a technique called Interference Rejection Combining as one of techniques for separate a desired signal from a received signal that includes an interference signal and the desired signal to obtain the desired signal. The interference rejection combining (IRC) is a technique for weighting (reception weights) signals that are obtained by each reception antenna in the user apparatus so as to suppress, in the user apparatus, interference of the interference radio beam from the interference base station against the desired radio beam from the connecting base station, and the interference by signals for other users at the connecting base station in the downlink communication. For example, in the case shown in FIG. 1, the user apparatus 10 performs directivity control (weight control) to direct a beam to a desired signal from the connecting base station 1, and direct null to an interference signal from the interference base station 2 so as to perform interference rejection.

As shown in FIG. 2, in the IRC reception technique, there are two types (Type 1, Type 2) of methods for calculating reception weights, which are a type for a case where channel of the interference signal can be estimated, and a type for a case where the estimation of the channel of the interference signal is impossible. By the way, each of the equations shown in FIG. 2 is an equation derived from an MMSE (Minimum Mean. Squared Error) algorithm. Also, the technique for calculating reception weights using these equations is an existing technique in itself.

As shown in FIG. 2, in the equation of Type 1 for the case where channel estimation of the interference signal is possible, the underlined part is a covariance matrix formed by a channel matrix of the interference cell. Also, in the equation of Type 2 for the case where channel estimation of the interference signal is impossible, the underlined part is a covariance matrix (statistical amount) of noise interference components estimated by a received signal from the connecting cell (cell formed by the connecting base station, a serving cell).

In the embodiment of the present invention, as for IRC, Type 1 is the target. Thus, in the following, information necessary for IRC Type 1 is described first.

<Information Necessary for IRC Type 1>

For generating IRC reception weights in IRC Type 1, a channel matrix for the interference signal is necessary in addition to channel information of the desired signal. The channel matrix can be obtained by estimating a channel by using a reference signal from the interference cell. In a case where precoding transmission is performed in the base station side, the channel matrix needs to be a channel matrix of a channel to which precoding has been applied (multiplied by a precoding matrix).

In the LTE-Advanced, as reference signals that can be used for channel estimation, there are CRS (Cell-specific Reference Signal), CSI-RS (CSI Reference Signal), and DM-RS (DeModulation Reference Signal, or UE specific Reference Signal).

Since CRS is transmitted in any TM (Transmission Mode), channel estimation by CRS is possible for any TM. However, since precoding transmission is not performed for CRS, only channel estimation without precoding information (PMI: Precoding Matrix Identifier) is possible. That is, when preceding transmission is performed in the base station side, PMI is separately necessary for obtaining a target channel matrix.

TM (Transmission Mode) is a transmission mode in multiple antenna transmission in LTE. Configurations of reference signals and presence or absence of precoding are different for each TM. For example, TM3 is for closed loop type transmission diversity (no precoding) in which data is demodulated by using CRS. TM4 is for closed loop type transmission diversity (precoding is performed) in which data is demodulated by using CRS. TM9 and TM10 are for space multiplexing (there is precoding) in which data is demodulated by using DM-RS.

CSI-RS (CSI Reference Signal) is a reference signal for channel quality measurement introduced from Rel.10 of LTE (TM9 is introduced in Rel.10). CSI-RS is multiplexed for each antennal for transmission. CRS transmission from the base station supports up to four transmission antennas (4 layer multiplexing) at the maximum. On the other hand, CSI-RS supports eight transmission antennas (eight layer multiplexing) at the maximum. For example, in a case where the base station (eNodeB) performs eight antenna transmission, channel estimation is performed using CSI-RS. Also, in a case where Antenna Virtualization of CRS (decreasing the number of antennas for transmitting CRS in order to reduce density of reference signals) is applied, when channel estimation by CRS cannot be performed for all antennas, channel estimation is performed using CSI-RS. As is the case of CRS, since precoding transmission is not performed for CSI-RS, only channel estimation without PMI is possible. That is, if precoding transmission is performed in the base station side, PMI is necessary for obtaining the target channel matrix.

DM-RS is a demodulation reference signal for PDSCH (Physical Downlink Shared Channel, channel for carrying data signal to UEs), and DM-RS is precoded and transmitted like a signal of the PDSCH. Therefore, by performing channel estimation using DM-RS, a channel with precoding information (PMI) can be directly estimated.

In a case where the channel matrix is obtained by performing channel estimation for the interference signal using CRS or CSI-RS, user assignment information in the interference signal is necessary in addition to the channel matrix in order to generate IRC reception weights in Type 1. The reason is as follows.

For a user apparatus in a connecting cell, when a user is assigned to PDSCH in an interference cell, the signal of the PDSCH becomes an interference signal. Therefore, a user apparatus performing IRC calculates IRC weights so as to direct null only to the interference signal (signal of PDSCH) that is assigned to a user.

That is, as shown in FIG. 3, a signal from the interference cell at a resource the same as a resource assigned to the user apparatus for data reception in the connecting cell becomes an interference signal. Thus, in order to suppress the interference signal, resource assignment information to a user for the interference signal is necessary.

However, since CRS and CSI-RS are transmitted by the whole band irrespective of presence or absence of user assignment, user assignment information cannot be obtained from CRS or CSI-RS. Thus, user assignment information is separately necessary.

On the other hand, since DM-RS is transmitted only by a resource assigned to a user, the resource in itself by which DM-RS is received becomes user assignment information. Thus, user assignment information is not necessary separately.

In the following, necessary information for performing channel estimation using each reference signal is described in more detail while explaining an outline of the channel estimation processing for IRC weight calculation in the user apparatus with reference to a flowchart of FIG. 4. In the explanation, it is assumed that precoding transmission is performed in the base station side.

First, the user apparatus determines a reference signal on which channel estimation is performed (step 101). TM is necessary in this step. However, in a case where TM can be known by a certain method, or where the same TM is used in the whole system, it is not necessary to obtain TM.

In step 102, calculation of a sequence initial value for the transmitted reference signal is performed. When the reference signal is CRS, PCID (Physical Cell ID), slot number, $N_{CP}$, and MBSFN configuration and the like are necessary for calculating the sequence initial value. $N_{CP}$ is a value indicating whether CP (Cyclic Prefix) length is Normal or Extended, and is 0 or 1. When the reference signal is CSI-RS, slot number, PCID or VCID (Virtual Cell ID), and $N_{CP}$ and the like are necessary. VOID is defined in the non-patent document 1. Also, when the reference signal is DM-RS, slot number, PCID or VOID (Virtual Cell ID), and $n_{SCID}$ and PDSCH transmission bandwidth and the like are necessary, wherein $n_{SCID}$ is an identification number of a scramble sequence in MU-MIMO, and is 0 or 1.

In step 103, a scrambling sequence is calculated from the sequence initial value calculated in step 102. By steps 102 and 103, the reference signal sequence that is transmitted is specified.

In step 104, a resource on which the reference signal is mapped is specified. In this step, when the reference signal is CRS, system bandwidth, number of antenna ports, and MBSFN configuration and the like become necessary. When the reference signal is CSI-RS, system bandwidth and number of antenna ports and the like are necessary. When the reference signal is DM-RS, $N_{CP}$ and number of antenna ports for each RB or for each subband are necessary.

Mapping of the reference signal is defined according to the above-mentioned information such as the system bandwidth and the number antenna ports. Thus, the above-mentioned information is necessary. FIG. 5 shows a mapping example of CRS in the case of layer number 1.

Returning to FIG. 4, in step 105, channel estimation for the reference signal is performed. Here, for any of the reference signals, when power boosting is applied, it is necessary to correct it. Thus, power boosting information is necessary. The power boosting information is a power ratio between a reference signal and a data signal, for example.

In step 106, channel estimation for the whole resource is performed based on the estimation result obtained in step 105. In this step, for example, a two-dimensional MMSE channel estimation filter described in the non-patent document 2 is used.

In step 107, multiplication by the precoding matrix (represented as PMI) is performed. Therefore, in this step, in the cases of CRS and CSI-RS, PMI is necessary. In the case of DM-RS, by performing the processes until step 106, channel estimation including precoding information has been performed, thus, step 107, that is, PMI is unnecessary.

FIGS. 6-8 show summaries of necessary information for performing channel estimation as mentioned above. FIG. 6 shows necessary information for performing channel estimation using CRS, FIG. 7 shows necessary information for performing channel estimation using CSI-RS, and FIG. 8 shows necessary information for performing channel estimation using DM-RS.

As shown in FIGS. 6-8, in the pieces of necessary information for performing channel estimation, pieces of information other than PCID and slot number are difficult for the user apparatus to estimate.

<Successive Interference Cancellation>

In addition to IRC, there is a technique of successive interference cancellation (SIC) as a technique for separating a desired signal from a received signal including an interference signal and the desired signal.

The successive interference cancellation is a technique for generating a replica signal by performing hard decision or soft decision for the interference signal from the received signal, and successively subtracting (removing) the replica signal from the received signal so as to extract a desired signal. A functional block diagram is shown in FIG. 9 when the user apparatus performs the successive interference cancellation. As shown in FIG. 9, for each of a plurality of interference signals, the user apparatus performs channel estimation of the interference signal, demodulates the interference signal based on the channel estimation, generates a replica of the interference signal, and successively subtracts the interference signal from the received signal. This configuration is merely an example for performing successive interference cancellation. For example, as shown in FIG. 10, a configuration may be adopted for performing successive interference cancellation using turbo equalization. The configuration shown in FIG. 10 is a configuration described in the non-patent document 3.

The configuration of the successive interference cancellation in itself is a conventional technique. The present invention can be applied to any successive interference canceller, irrespective of the scheme, as long as it includes a function for performing channel estimation of the interference cell and performing demodulation of the interference signal.

<Necessary Information for SIC>

As mentioned above, in order to perform successive interference cancellation, it is necessary to generate a replica signal for every interference signal. For achieving this, first, information for performing channel estimation for each interference signal is necessary. This information is the same as the information necessary for the before-mentioned IRC Type 1.

Next, for demodulation of the interference signal, information shown in FIG. 11 is necessary. That is, PDSCH modulation scheme for each RB or for each subband, configuration information for each of CRS/CSI-RS/DM-RS, MBSFN configuration and PDSCH start symbol are necessary as information for demodulation of the interference signal. In the case of using the turbo equalization, coding rate information for each RB or each subband is also necessary.

In the above-mentioned pieces of information, configuration for each of CRS/CSI-RS/DM-RS and MBSFN configuration are necessary information for calculating a resource on which the reference signal is mapped, and PDSCH start symbol is necessary information for calculating a resource on which PDSCH is mapped.

In the conventional technique, the necessary information for demodulation of the interference signal shown in FIG. 11 is not sent to the user apparatus.

As mentioned above, in the present control signal configuration of the LTE-Advanced, there is a shortage of information in the user apparatus for performing IRC Type 1 and the successive interference cancellation (SIC) by which interference reduction ability is high. Thus, it is difficult for the user apparatus to perform IRC Type 1 and the successive interference cancellation (SIC). Although it is possible to perform IRC type 2 in the present control signal configuration, there is a possibility that the interference reduction ability is inferior to that of Type 1.

That is, in the conventional technique, there is a problem in that it is difficult to provide the user apparatus with high interference reduction ability.

The present invention is contrived in view of the above-mentioned points, and an object of the present invention is to enable the user apparatus to have high interference reduction ability.

Means for Solving the Problem

According to an embodiment of the present invention, there is provided a user apparatus in a radio communication system including a plurality of base stations, including:

a reception unit configured to receive, from a connecting base station, control information to be used for reducing an interference signal sent from an interference base station for the user apparatus; and an interference reducing unit configured to reduce the interference signal by using the control information to obtain a desired signal sent from the connecting base station, wherein the reception unit receives a part of the control information as a part of downlink control information that is transmitted by a downlink physical layer signaling channel from the connecting base station, and receives the other part of the control information by RRC signaling.

Also, according to an embodiment of the present invention, there is provided a base station connecting with a user apparatus in a radio communication system, including:

a reception unit configured to receive, from an interference base station, control information to be used by the user apparatus for reducing an interference signal sent from the interference base station for the user apparatus; and a transmission unit configured to transmit, to the user apparatus, a part of the control information as a part of downlink control information by a downlink physical layer signaling channel, and to transmit, to the user apparatus, the other part of the control information by RRC signaling.

Also, according to an embodiment of the present invention, there is provided an interference reducing method executed by a user apparatus in a radio communication system including a plurality of base stations, including:

a reception step of receiving, from a connecting base station, control information to be used for reducing an interference signal sent from an interference base station for the user apparatus; and an interference reducing step of reducing the interference signal by using the control information to obtain a desired signal sent from the connecting base station, wherein, in the reception step, the user apparatus receives a part of the control information as a part of downlink control information that is transmitted by a downlink physical layer signaling channel from the connecting base station, and receives the other part of the control information by RRC signaling.

Also, according to an embodiment of the present invention, there is provided an interference reducing control information notification method executed by a base station connecting with a user apparatus in a radio communication system, including:

a reception step of receiving, from an interference base station, control information to be used by the user apparatus for reducing an interference signal sent from the interference base station for the user apparatus;

a step of transmitting, to the user apparatus, a part of the control information as a part of downlink control information by a downlink physical layer signaling channel, and a step of transmitting, to the user apparatus, the other part of the control information by RRC signaling.

Effect of the Present Invention

According to the present invention, since the user apparatus is notified of control information to be used for reducing an interference signal, the user apparatus can perform interference reduction processing of high interference reduction ability by using the control information, and it becomes possible that the user apparatus is provided with high interference reduction ability.

BRIEF DESCRIPTION OF THE DRAWINGS

FIG. 1 is a diagram for explaining reduction of interference from an interference cell;

FIG. 2 is a diagram for explaining interference rejection combining (IRC) reception;

FIG. 3 is a diagram for explaining an interference signal;

FIG. 6 is a diagram showing necessary information for performing channel estimation by using CRS;

FIG. 7 is a diagram showing necessary information for performing channel estimation by using CSI-RS;

FIG. 8 is a diagram showing necessary information for performing channel estimation by using DM-RS;

FIG. 11 is a diagram showing information necessary for demodulation of an interference signal in information necessary for SIC;

FIG. 14 is a diagram showing an example of DCI format;

FIG. 15 is a diagram showing information that is transmitted by DCI and information that is transmitted by RRC in interference reduction necessary information for IRC reception processing;

FIG. 16 is a diagram showing information that is transmitted by DCI and information that is transmitted by RRC in interference reduction necessary information for IRC reception processing;

FIG. 17 is a diagram showing information that is essential for notification, and information that is not essential (arbitrary) for notification, for channel estimation of interference signals in interference reduction processing;

FIG. 19 is a diagram showing an example of a region that is replaced with interference reduction necessary information in DCI format 2 (Closed-loop spatial multiplexing, TM4);

FIG. 20 is a diagram showing an example of a region that is replaced with interference reduction necessary information in DCI format 2A (Open-loop spatial multiplexing, TM3);

FIG. 21 is a diagram showing an example of a region that is replaced with interference reduction necessary information in DCI format DCI format 2B (Spatial multiplexing, TM8);

FIG. 22 is a diagram showing an example of a region that is replaced with interference reduction necessary information in DCI format 2C (Spatial multiplexing, TM9);

FIG. 23 is a diagram showing an example of a region that is replaced with interference reduction necessary information in DCI format 2D (Spatial multiplexing, TM10);

FIG. 24 is a diagram showing an example of replacement of TB2 region (free region 9 bits) in DCI format 2 to interference reduction necessary information;

FIG. 25 is a diagram showing an example of replacement of TB2 region (free region 9 bits) in DCI format 2A to interference reduction necessary information;

FIG. 26 is a diagram showing an example of replacement of TB2 region (free region 8 bits) in DCI format 2C to interference reduction necessary information;

FIG. 27 is a diagram showing an example of replacement of TB2 region (free region 8 bits) in DCI format 2D to interference reduction necessary information;

FIG. 28 is a diagram showing information for CoMP in DCI format 2D;

FIG. 29 is a diagram showing an example of replacement of CoMP region (free region 2 bits) in DCI format 2D to interference reduction necessary information;

FIG. 30 is a diagram showing an example in which a replacement notification flag is added in DCI format 2;

FIG. 33 is a diagram showing an example in which a bit pattern reserved in DCI format 2 is used as a replacement notification flag;

FIG. 34 is a diagram showing Precoding information in DCI format 2;

FIG. 35 is a diagram showing a table (in the case of 2 antenna ports) of information indicated by Precoding information;

FIG. 36 is a diagram showing DCI format 2 for explaining a method for determining the number of TB;

FIG. 37 is a diagram showing a correspondence table indicating correspondence between information for 1TB and information for 2TB in a table of Precoding information;

FIG. 38 is a diagram showing "Antenna port, scrambling identity, number of layer" in DCI format 2C/2D;

FIG. 39 is a diagram showing a normal table of information indicated by "Antenna port, scrambling identity, number of layer";

FIG. 40 is a table rewritten from the normal table shown In FIG. 39;

FIG. 41 is a diagram showing an example for utilizing, as a replacement notification flag, a combination that is not defined in combinations of bits of DCI in DCI format 2A;

FIG. 43 is a diagram showing an example of replacement in DCI format 2;

FIG. 44 is a diagram showing an example of replacement in DCI format 2A;

FIG. 47 is a diagram showing an example of reduction of granularity of PMI;

FIG. 48 is a diagram showing information sent by physical layer signaling in Quasi Co-location;

FIG. 49 is a diagram showing information for each TP that is transmitted by RRC signaling from a connecting base station in Quasi Co-location and the like, and information necessary for IRC reception by comparing them;

EMBODIMENTS FOR CARRYING OUT THE INVENTION

In the following, embodiments of the present invention are described with reference to figures. The embodiments described below are merely examples, and the embodiments to which the present invention is applied are not limited to the embodiments below.

In the following, an embodiment of the present invention is described. In the following, there is a case where IRC Type 1 is simply described as IRC. Also, IRC (Interference rejection) and SIC (interference cancelling) are collectively called "interference reduction". Also, IRC and SIC are merely examples of the interference reduction technique, and the present invention can be also applied to interference reduction techniques (example: MLD: Maximum Likelihood Detector) other than IRC and SIC.

Outline of the Embodiment

As mentioned above, in the present control signal configuration of the LTE-Advanced, there is a shortage of information in the user apparatus for performing IRC Type 1 and successive interference cancellation by which interference reduction ability is high. Thus, it is difficult for the user apparatus to perform IRC Type 1 and successive interference cancellation. Although it is possible to perform IRC type 2 in the present control signal configuration, there is a possibility that the interference reduction ability is inferior to that of Type 1. That is, in the conventional technique, it is difficult to perform channel estimation for the interference signal with high accuracy.

For enabling interference reduction operation such as IRC and SIC, in the present embodiment, in pieces of information that are used by the user apparatus for interference reduction for an interference signal, pieces of information that change dynamically are reported by using DCI of PDCCH that is a downlink physical layer signaling channel, and other pieces of information are reported semistatically by using RRC (Radio Resource Control) signaling. The information that dynamically changes is, for example, information that may change for each subframe.

In the present embodiment, the main purpose is to reduce (reject or cancel) a data signal (PDSCH) of another cell for improving reception quality of a control signal and a data signal in the connecting cell of the user apparatus.

Figure 4:
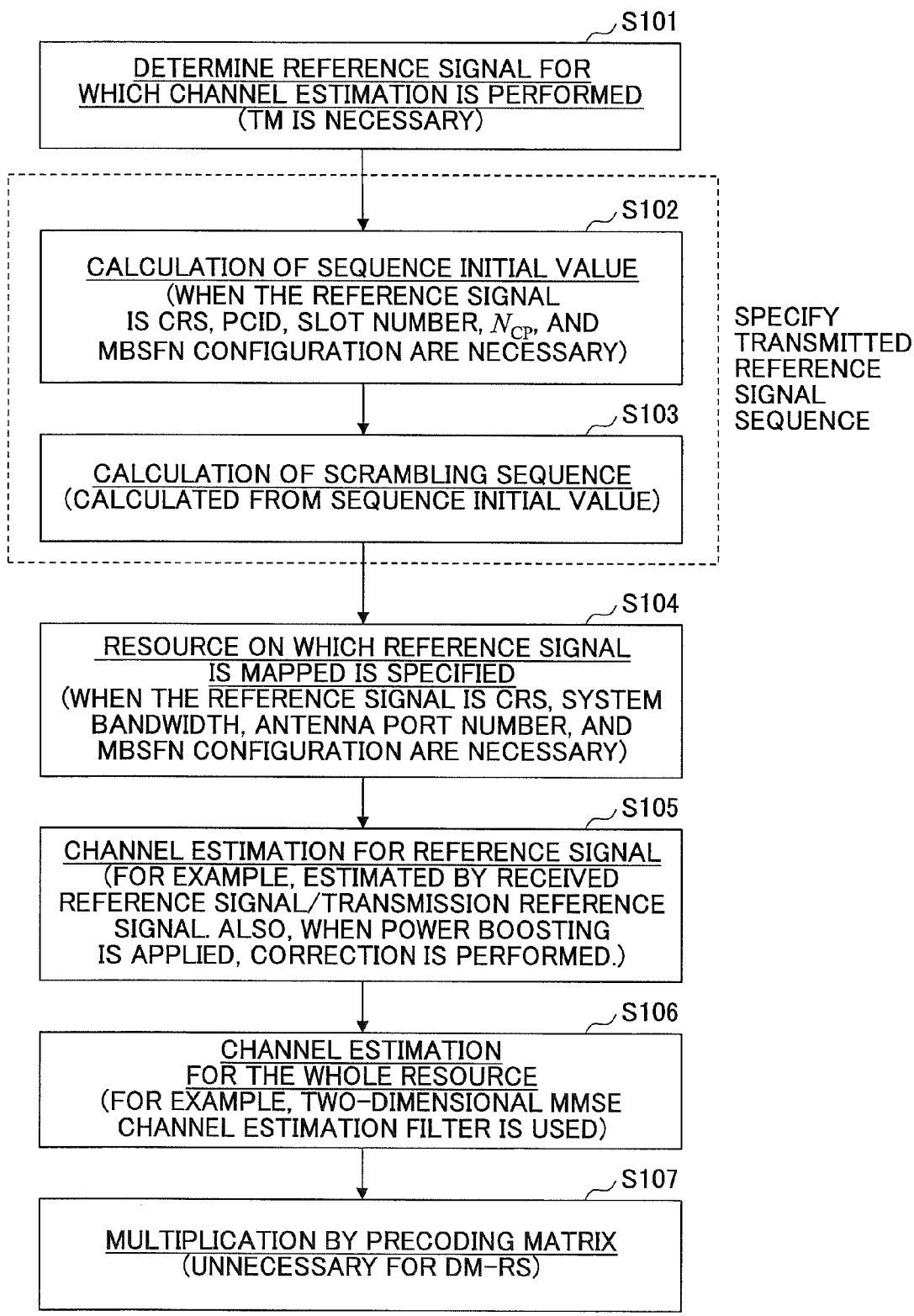
FIG. 4 is a flowchart for explaining an outline of channel estimation processing for IRC weight calculation.
Figure 5:
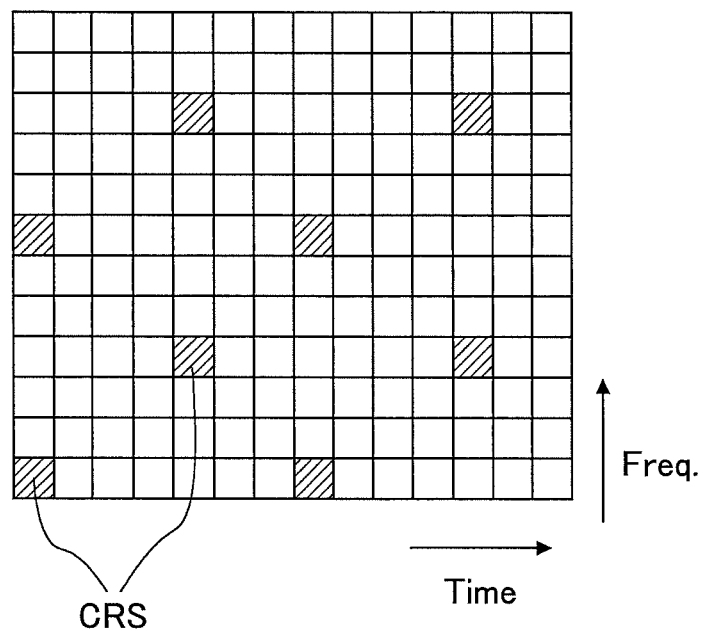
FIG. 5 is a diagram showing a mapping example of CRS.
Figure 9:
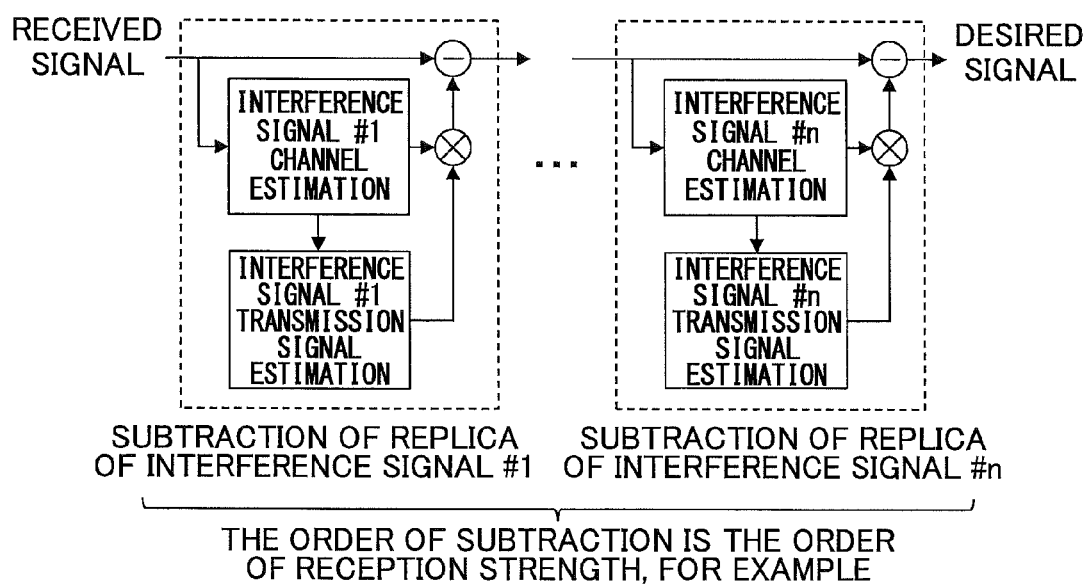
FIG. 9 is a block diagram showing a functional configuration example of a user apparatus that performs SIC.
Figure 10:
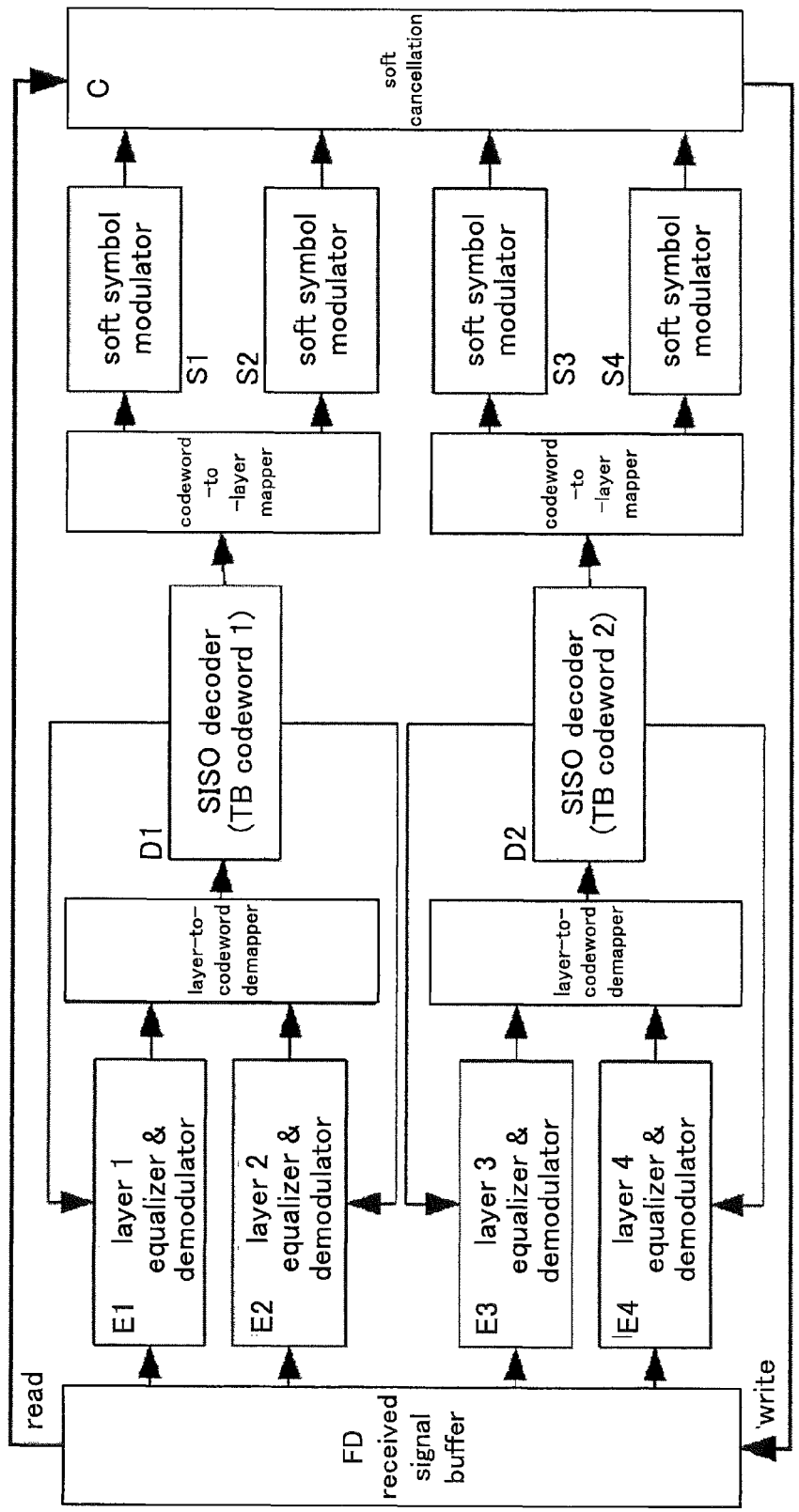
FIG. 10 is a block diagram showing a functional configuration example of SIC using turbo equalization.
Figure 12:
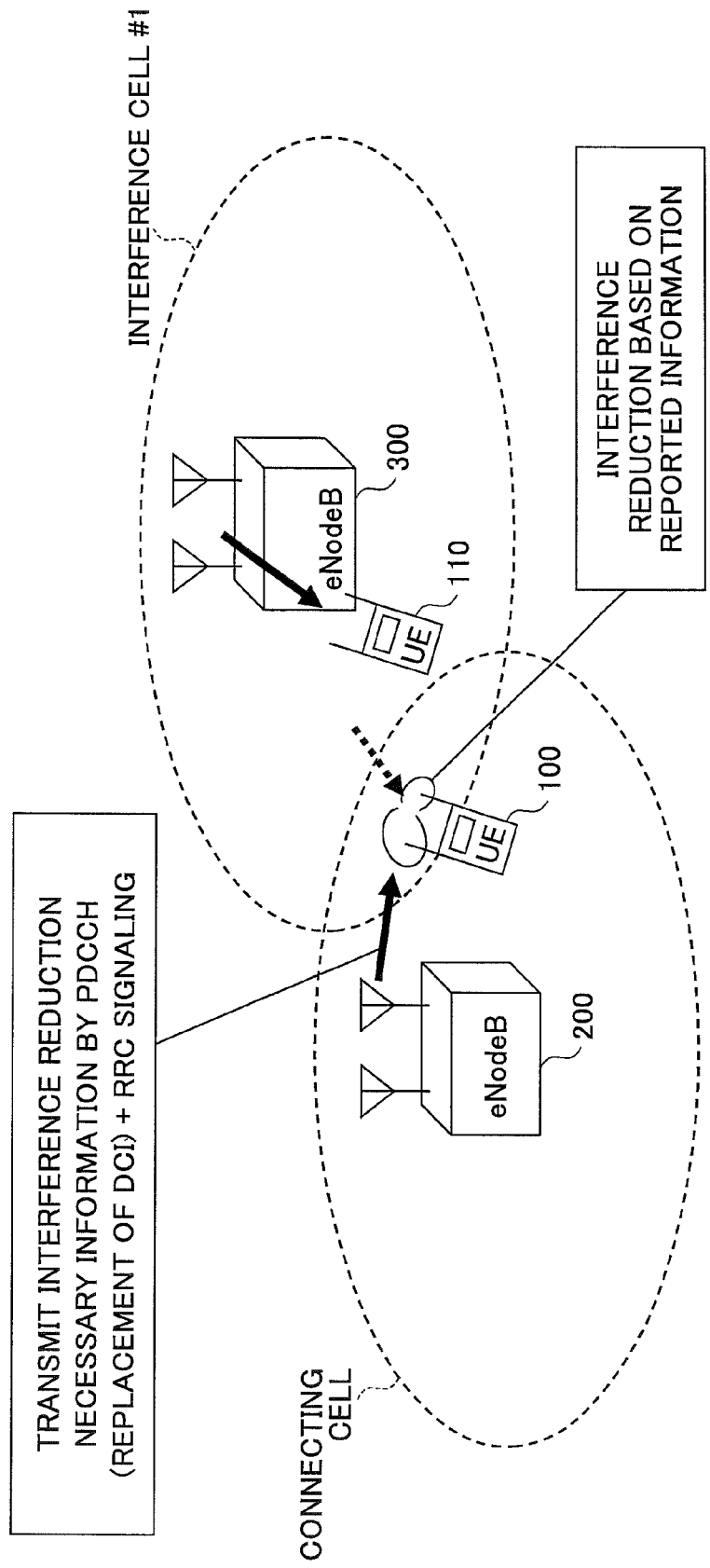
FIG. 12 is a schematic block diagram of a radio communication system of an embodiment of the present invention.

FIG. 12 shows a schematic block diagram of a radio communication system of the present embodiment. The system of the present embodiment is a radio communication system of the LTE-Advanced scheme, for example, in which a base station 200 (eNodeB) (connecting base station) forms a connecting cell, and a user apparatus 100 (UE) in the cell performs communication with the connecting base station 200 by a desired signal. The radio communication system of the present embodiment includes at least functions defined in the LTE-Advanced. But, the present invention is not limited to the scheme of the LTE-Advanced, and the present invention can be applied also to radio communication systems of the future generation of LTE-Advanced, and to schemes other than LTE.

Normally, the radio communication system is provided with many base stations. However, FIG. 12 only shows the connecting base station 200 and the base station 300 adjacent to the connecting base station 200. This adjacent base station 300 also forms a cell to perform signal transmission and reception with a user apparatus for which the base station 300 is a connecting base station. A data signal transmitted from the adjacent base station 300 to the user apparatus 110 for which the base station 300 is a connecting base station becomes an interference signal for the user apparatus 100. Therefore, in the present embodiment, the adjacent base station 300 is called an interference base station. Also, a cell of the interference base station 300 is called an interference cell. Although, in general, there are a plurality of interference base stations for a connecting base station, FIG. 12 shows only one interference base station. For example, as shown in FIG. 13, a plurality of interference cells may exist.

Figure 13:
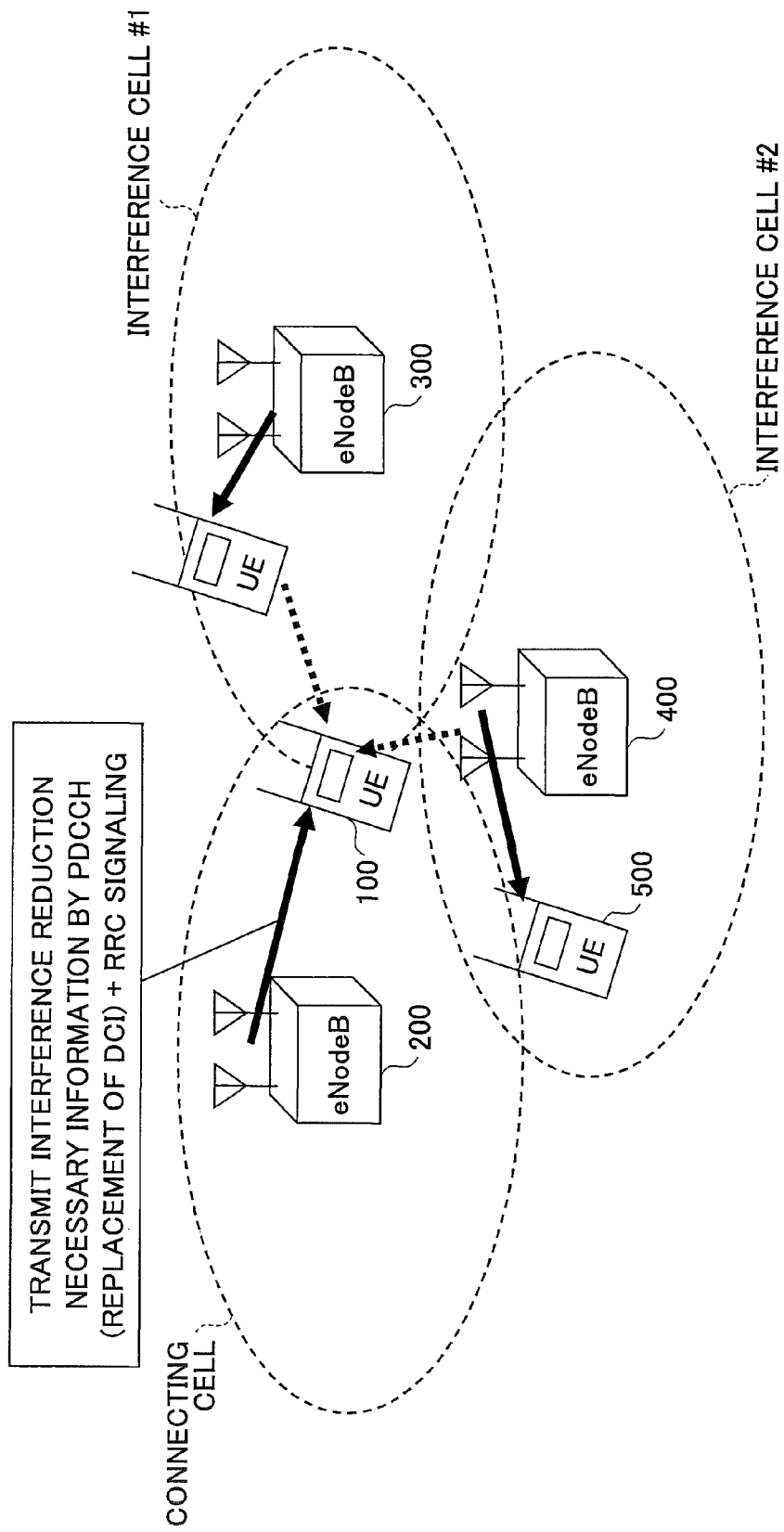
FIG. 13 is a diagram showing a plurality of interference cells.

In the first embodiment, as shown in FIGS. 12 and 13, the connecting base station 200 sends, to the user apparatus 100, a part of information (to be referred to as interference reduction necessary information) necessary for performing executing interference reduction processing by using a physical layer signaling channel for transmitting a physical layer control signal, and as to lacking information, it is transmitted by RRC signaling. The channel for transmitting the physical layer control signal is PDCCH (physical downlink control channel) in the present embodiment, and a control signal transmitted by the channel is downlink control information (DCI). When the user apparatus 100 is not notified of the interference reduction necessary information from the connecting base station 200, the user apparatus 100 may apply reception processing that does not require interference reduction necessary information, that is, for example, IRC Type 2.

Here, PDCCH and DCI are described. PDCCH is a channel for transmission, to a user apparatus (UE), control information (DCI) such as determination of scheduling of uplink/downlink and power control command and the like. Then, as pieces of information included in DCI, there are information on a physical downlink shared channel (PDSCH), information on physical uplink shared channel (PUSCH), power control information and the like. In these pieces of information, as information on PDSCH, there are, for example, resource block assignment information, modulation and coding rate information, precoding information, HARQ information, information on spatial multiplexing (when performing spatial multiplexing) and the like.

For DCI, several formats are prepared depending on transmission mode (TM: Transmission Mode) and the usage. For example, FIG. 14 shows examples of DCI formats described in non-patent document 4 (3GPP, TS36.212 V11.2.0). Especially, in the present embodiment, as described later, when using DCI format 2 series in DCI formats shown in FIG. 14, a part of interference reduction necessary information that is information of an interference cell necessary for interference reduction processing is reported to the user apparatus 100 by performing replacement/read-substitution of DCI.

The interference reduction necessary information is, in the case of IRC, information described with reference to FIGS. 6-8, and the like, that is, information necessary for channel estimation of the interference signal and user assignment information of the interference signal. Also, for SIC, in addition to the before-mentioned information required for IRC, as information for demodulating an interference signal, as shown in FIG. 11, PDSCH modulation scheme information for each RB or for each subband, configuration for each of CRS/CSI-RS/DM-RS for specifying the resource of PDSCH, MBSFN configuration, and PDSCH start symbol become necessary. Also, for turbo equalization, coding rate information/RB or subband become necessary.

In the present embodiment, especially, information to be dynamically notified by using PDCCH is interference reduction necessary information that changes dynamically, and other information is notified by RRC signaling.

FIG. 15 is a diagram showing an example of information to be notified by DCI and information to be notified by RRC in interference reduction necessary information for IRC reception processing. Underlined information indicates information notified by DCI. Information which is not underlined is notified by RRC signaling.

FIG. 16 is a diagram showing an example of information to be notified by DCI and information to be notified by RRC in interference reduction necessary information for SIC reception processing. Underlined information indicates information notified by DCI. Information which is not underlined is notified by RRC signaling. As to information necessary for IRC, it is as shown in FIG. 15.

By the way, in channel estimation of an interference signal in interference reduction processing, all pieces of information shown in FIGS. 6-8, and FIG. 15 and the like are not essential. Also, as described later, information elimination can be performed.

FIG. 17 shows examples of information for which notification is essential for channel estimation of an interference signal in interference reduction processing, and information for which notification is not essential (arbitrary). FIG. 17 shows information by separating it into a part common to each reference signal and a part specific for each reference signal.

As shown in FIG. 17, in any reference signal, PCID or VCID and user assignment information are essential. In channel estimation using CRS, number of CRS antenna ports, MBSFN configuration, system bandwidth, CRS power boosting information are essential. In channel estimation using CSI-RS, number of CSI-RS antenna ports, system bandwidth, CSI-RS power boosting information are essential. In channel estimation using DM-RS, number of DM-RS antenna ports, DM-RS power boosting information, PDSCH transmission bandwidth are essential.

In information shown in FIG. 17, pieces of information other than those described above can be arbitrarily used. Even though these pieces of information are not included, interference reduction processing can be executed. However, for improving characteristics, it is desirable to include even information of "arbitrary". In the following, the present embodiment is described in more detail.

(Replacement/Read-Substitution of DCI)

As described before, in the present embodiment, the connecting base station 100 replaces a part of pieces of downlink control information described in DCI with interference reduction necessary information, and notifies the user apparatus 100 of the DCI in which replacement is performed by PDCCH. Then, the user apparatus 100 extracts the replaced pieces of information from information in the DCI as interference reduction necessary information, and uses it for executing interference reduction processing. That is, the user apparatus 100 reads downlink control information at the replacing target position in the DCI as interference reduction necessary information, and uses it. Concrete examples are described below.

Example 1-1: Example of Using Bit Region of TB That is Not Used For Replacement/Read-Substitution In the DCI format 2 series, indicated by a surrounding frame in FIG. 14, that are used when performing spatial multiplexing, regions for control information of 2 TBs (Transport Blocks) are always reserved. That is, for example, even in a case where the connecting cell transmits information of 1TB, regions of 2 TBs always exist.

Therefore, the connecting base station 200 replaces a region of one TB with interference reduction necessary information (control information of interference cell), and the user apparatus 100 reads the information of the region as the interference reduction necessary information. Accordingly, it becomes possible to perform dynamic notification of interference reduction necessary information while suppressing increase of overhead.

Figure 18:
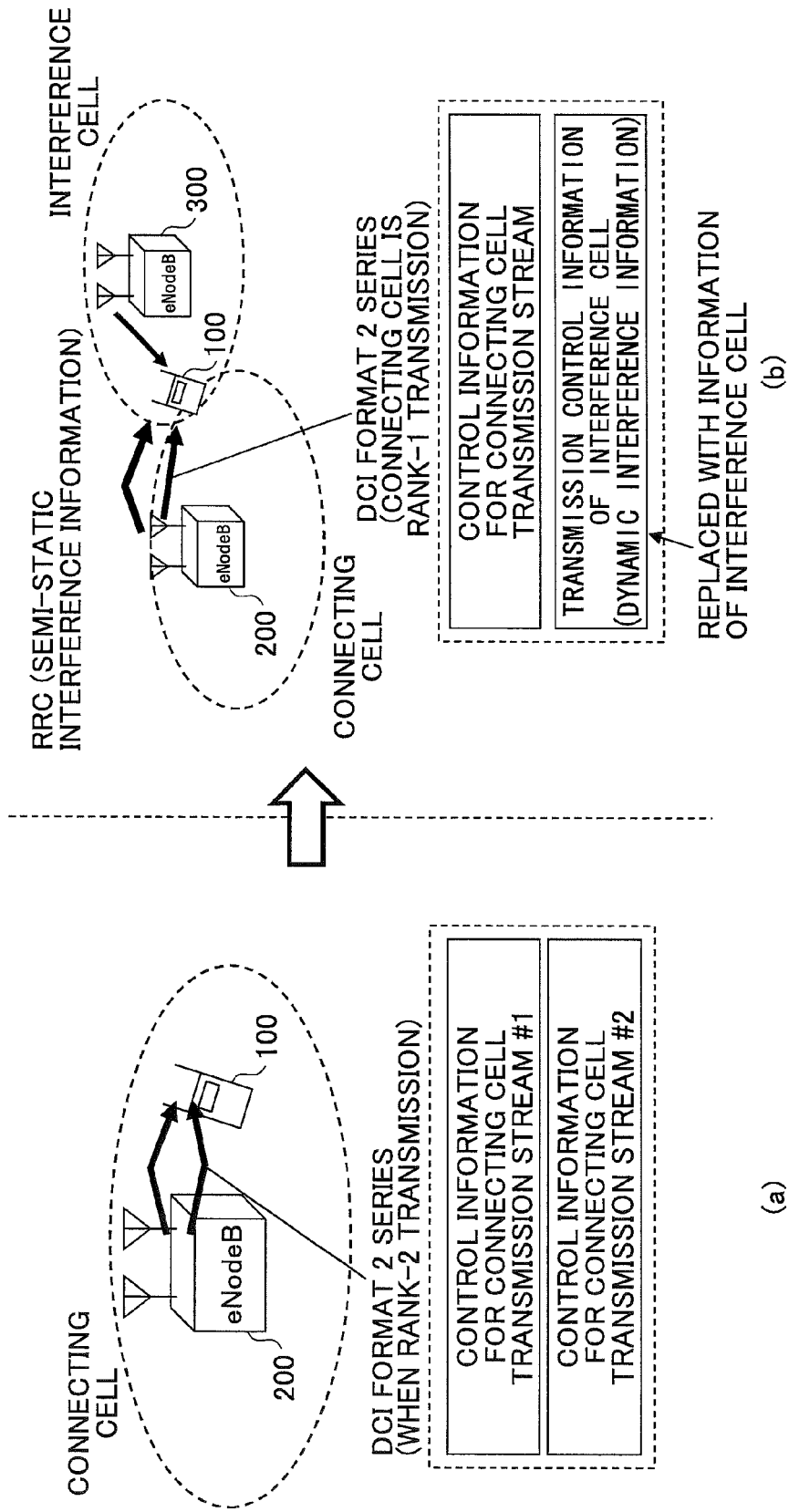
FIG. 18 is a diagram for explaining an example 1 of DCI information replacement in the present embodiment.

That is, as shown in FIG. 18($a$), the connecting base station 200 transmits information of 2 TBs to the user apparatus 100. For example, in a case where rank 2 transmission in which spatial multiplexing is performed by using each TB for one stream, pieces of control information of streams of 2 TBs are respectively described in the regions of 2 TBs in the DCI format 2 series, and the user apparatus 100 performs demodulation and decoding for each piece of stream data by using these pieces of control information. On the other hand, as shown in FIG. 18($b$), for example, in a case where the connecting base station 200 transmits a stream of one TB to the user apparatus 100, and, for example, performs rank 1 transmission in which information of the TB is transmitted by one TB, one region of regions of 2TBs in the DCI format 2 series is used as control information for connecting cell transmission stream, but, another region is not used as control information for connecting cell transmission stream. Thus, the region is used for notification of transmission control information of an interference cell, that is, for notification of interference reduction necessary information. Other information is notified by RRC signaling.

Generally, interference reduction processing such as IRC and SIC is effective when the user apparatus 100 is positioned at a cell edge where interference from an interference cell is large. In such a case, it is assumed that the number of transmission layer (RANK) is controlled to be 1 by rank adaptation. Thus, since it is assumed that the number of TB to be transmitted becomes 1, it is reasonable to perform replacement of a region of TB that is not used, as mentioned above, by assuming that information of one TB is transmitted by rank 1.

In a case where the connecting base station 200 does not use the DCI format 2 series, for example, information of DCI format to be used may be replaced, or, interference reduction necessary information to be dynamically notified may be added to DCI.

[Concrete Example of Replacement/Read-Substitute]

FIGS. 19-23 show examples of regions to be replaced with interference reduction necessary information in the DCI format 2 series. FIG. 19 is an example in DCI format 2 (Closed-loop spatial multiplexing, TM4), in which, when the number of transmission TB in the connecting cell is 1, 9 bits can be replaced with interference reduction necessary information at the maximum. FIG. 20 is an example in DCI format 2A (Open-loop spatial multiplexing, TM3). Also, in this case, when the number of transmission TB in the connecting cell is 1, 9 bits can be replaced with interference reduction necessary information at the maximum.

FIG. 21 is an example in DCI format 2B (Spatial multiplexing, TM8), in which, when the number of transmission TB in the connecting cell is 1, 8 bits can be replaced with interference reduction necessary information at the maximum. FIG. 22 is an example in DCI format 2C (Spatial multiplexing, TM9), in which, when the number of transmission TB in the connecting cell is 1, 8 bits can be replaced with interference reduction necessary information at the maximum. FIG. 23 is an example in DCI format 2D (Spatial multiplexing, TM10), in which, when the number of transmission TB in the connecting cell is 1, 8 bits can be replaced with interference reduction necessary information at the maximum.

The whole information region in which replacement is available may be replaced with interference reduction necessary information, or only a part of the information region may be replaced with interference reduction necessary information.

FIGS. 24-27 show concrete examples of replacement (read-substitution). The examples shown in FIGS. 24-27 are merely examples, and replacement may be performed by other methods.

FIG. 24 is a diagram showing an example of replacement of TB2 region (free region 9 bits) in DCI format 2 with interference reduction necessary information. In this example, the TB2 region stores information of RI and PMI on three interference cells of an interference cell that exerts the most dominant interference, an interference cell that exerts the second dominant interference, and an interference cell that exerts interference next. The user apparatus 100 can perform IRC reception, for example, based on channel estimation using CRS or CRI-RS by using these pieces of information and information notified by the RRC signaling. Of course, SIC reception can be performed by using these pieces of information.

In the example shown in FIG. 24, when the number of antennas of the interference base station is 2, 3 bits are enough for RI and PMI. Although the number of bits lacks when the number of antennas is 4, the number of bits can be decreased so that the information can be accommodated in 3 bits by decreasing granularity of PMI as described later. Also, as described later, it is possible that the user apparatus 100 estimates PMI.

FIG. 25 is a diagram showing an example of replacement of TB2 region (free region 9 bits) in DCI format 2A with interference reduction necessary information. In this example, the TB2 region stores RI and information of modulation scheme of PDSCH on an interference cell that exerts the most dominant interference, and an interference cell that exerts the second dominant interference. However, due to restriction of the number of bits, the information on the interference cell that exerts the second largest interference can be stored only when the rank of the interference cell that exerts the most dominant interference is 1.

This example assumes a case where the user apparatus 100 performs SIC by using information of modulation scheme of PDSCH.

FIG. 26 is a diagram showing an example of replacement of TB2 region (free region 8 bits) in DCI format 2C with interference reduction necessary information. In this example, $n^{scid}$, RI and the number of DM-RS antenna ports are jointly encoded to 3 bits for each of an interference cell that exerts the most dominant interference, and an interference cell that exerts the second dominant interference, and the 3 bits are stored in the TB2 region. In this example, for example, the user apparatus 100 performs IRC reception based on DM-RS based channel estimation.

FIG. 27 is a diagram showing an example of replacement of TB2 region (free region 8 bits) in DCI format 2D with interference reduction necessary information. In this example, $n^{scid}$, RI and the number of DM-RS antenna ports are jointly encoded to 3 bits for an interference cell that exerts the most dominant interference, and the 3 bits are stored. Also, modulation scheme and coding rate for the interference cell are stored as 5 bits. The user apparatus 100 performs turbo SIC processing based on these pieces information and information reported by RRC signaling.

Example 1-2: Example for Using Region For CoMP

In Transmission Mode 10, inter-cell coordination transmission and reception (CoMP, a technique for transmitting a downlink signal from a plurality of transmission points (TP: Transmission Point)) is supported, and DCI format 2D for CoMP is defined. This is shown in FIG. 28.

Here, it is not essential that the user apparatus 100 performs CoMP. Thus, when it is assumed "not to perform CoMP", it is possible to replace 2 bits of PQI (PDCSH RE Mapping and Quasi-Co-Location Indicator) that is defined for CoMP in DCI format 2D with interference reduction necessary information. In this example, although CoMP cannot be performed, it is possible to secure characteristics by enabling interference reduction in the user apparatus 100 (receiver) side.

FIG. 29 is a diagram showing an example of replacement of a CoMP region (free 2 bits) in DCI format 2D with interference reduction necessary information. In this example, information of modulation scheme of the most dominant interference cell is stored in the CoMP region.

The example 1-2 can be combined with the before-mentioned example 1-1. In such a case, as shown in FIG. 29, since 8 bits can be used in the TB2 region, it is possible to use 10 bits in total as a bit region for interference reduction necessary information.

(Method for Notifying of Replacement of DCI)

As described above, in a case where a part of information of DCI is replaced with interference reduction necessary information, basically, unless the connecting base station 200 notifies the user apparatus 100 that replacement of information of DCI has been performed, the user apparatus 100 cannot determine whether information of the region is control information for communication in the connecting cell or interference reduction necessary information. Thus, in the present embodiment, as shown in the following example, the connecting base station 200 notifies the user apparatus 100 of information (replacement notification flag) indicating that replacement is performed. The user apparatus 100 that receives the notification determines that a bit in a predetermined region in the information of DCI received by PDCCH is interference reduction necessary information, and uses the information for interference reduction processing.

Example 2-1: Adding a Flag Indicating Replacement

In the example 2-1, the connecting base station 200 adds, to DCI, a flag of 1 bit indicating that a part of information of DCI has been replaced with interference reduction necessary information.

FIG. 30 shows an example of adding a replacement notification flag in DCI format 2. As shown in FIG. 30, 1 bit of the replacement notification flag is added in the last part of DCI. The same addition is applied to other formats.

Example 2-2: Advance Notification of a Subframe in Which DCI is Replaced/Read In the example 2-2, the connecting base station 200 notifies, in advance, the user apparatus 100 of a subframe in which replacement is performed in DCI by using RRC signaling.

Figure 31:
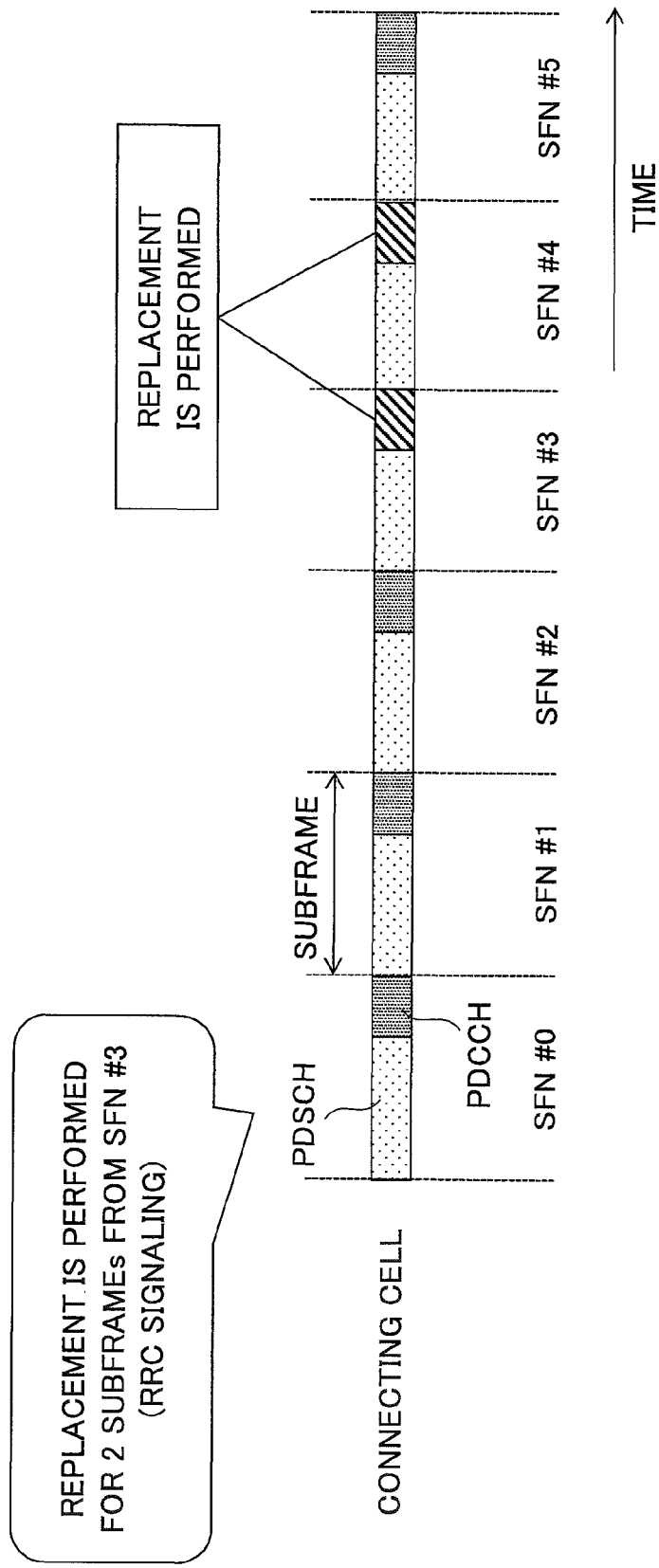
FIG. 31 is a diagram showing an example in which a subframe number where DCI replacement is performed is notified by RRC signaling in advance.

FIG. 31 shows a concrete example. As shown in FIG. 31, the connecting base station 200 in the connecting cell notifies of a subframe number where replacement of DCI is performed in advance by using RRC signaling. In the case of the example shown in FIG. 31, information to be reported by RRC signaling may be subframe numbers 3 and 4, or may be information indicating 2 subframes from a subframe of subframe number 3.

Figure 32:
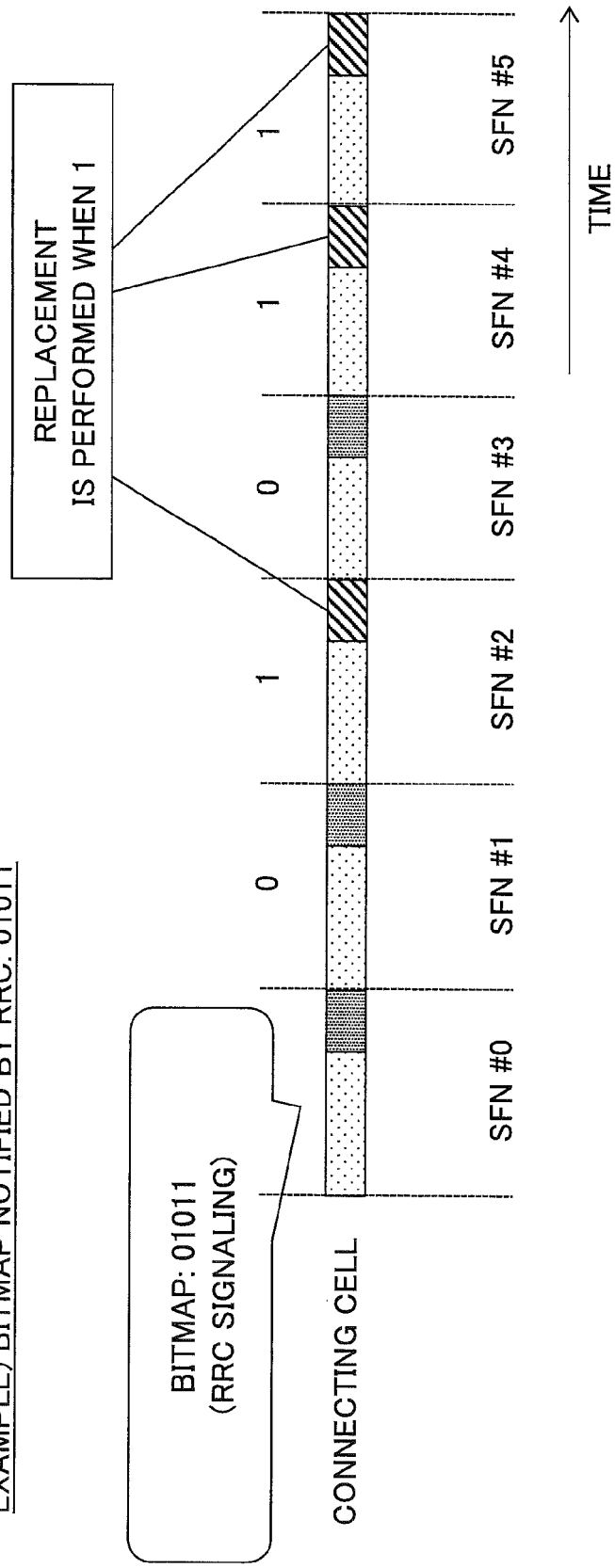
FIG. 32 is a diagram showing an example in which a bitmap for specifying a subframe where DCI replacement is performed is notified by RRC signaling in advance.

FIG. 32 shows another concrete example. In the example shown in FIG. 32, the connecting base station 200 notifies the user apparatus 100, in advance, by RRC signaling, of a bitmap for specifying a subframe where replacement of DCI is performed. In the example shown in FIG. 32, a bitmap of 01011 is transmitted. The user apparatus 100 that receives the bitmap determines that information replacement in DCI is performed in the subframe corresponding to bit 1, and performs read-substitution, and performs interference reduction processing by using the substituted information.

Example 2-3-1: Example 1 Using Reserved Bit Pattern

In the example 2-3-1, a bit pattern reserved in DCI is used for notification of replacement. The reserved bit pattern is a bit pattern, that is not actually used, and that is kept (that is, reserved) for future use, for example.

FIG. 33 shows a concrete example in DCI format 2. In the example of FIG. 33, MCS of 5 bits in TB2 is used for replacement notification. That is, since 29-31 in 0-31 of MCS are reserved, for example, 29(=11101) can be used as a replacement notification flag. In this case, the number of bits that can be used for replacement of interference reduction necessary information becomes 9−5=4 bits.

Example 2-3-2: Example 2 For Using Reserved Bit Pattern

The example 2-3-2 is an example for notifying that replacement of information is performed in a TB2 region of DCI by transmitting reserved bits of 3-7 in precoding information in DCI. The example 2-3-2 is targeted for DCI formats 2, 2A and 2B in which precoding information is defined. In the following, the example 2-3-2 is described in more detail.

FIG. 34 shows an example of precoding information. FIG. 34 is an example of DCI format 2, in which the part surrounded by a thick line in FIG. 34 indicates the precoding information. The precoding information is a bit sequence indicating precoding information used for signal transmission, in which the length of the bit sequence varies according to the number of transmission antenna ports. As shown in FIG. 34, the length is 3 bits for 2 antenna ports, and the length is 6 bits for 4 antenna ports.

Also, designated information varies according to the number of TBs (the number of code words, more specifically) that are transmitted. This is as shown in FIG. 35 (in a case of 2 antenna ports). As shown in FIG. 35, 3-7 are reserved bits in the table when the number of TBs is 2. Thus, 3-7 are not normally used when the number of TBs is 2. Therefore, in the example 2-3-2, the replacement of information in the TB2 region of DCI is notified by transmitting reserved bits of 3-7 of precoding information in DCI.

Here, a method in which the user apparatus 100 determines the number of TBs is described with reference to FIG. 36 (in example of DCI format 2) (non-patent document 5 (3GPP, 36.213 (V11.2.0), 7.1.7.2)). As indicated in FIG. 36 by surrounding using a thick dotted line, it is defined that, when redundancy version is 1 and MCS is 0, the user apparatus 100 determines that the TB is disabled (enabled in other cases), and when either one of TBs is disabled (when the number of TB is 1), the user apparatus 100 refers to a table for 1 codeword, and when both of TBs are enabled (the number of TBs is 2), the user apparatus 100 refers to a table for 2 codewords.

In the present embodiment, when performing transmission of information of 1TB, one region which is not used as control information for connecting cell transmission stream is used for notification of interference reduction necessary information (FIG. 18 and the like). Thus, it is necessary that information is embedded such that the user apparatus 100 does not recognize that the redundancy version is 1 and MCS is 0 in any TB region. Therefore, even though the number of TB of the actual communication is 1, the user apparatus 100 determines that the number of TBs is 2 and refers to the table for 2TB. Therefore, the user apparatus 100 that performs reception of 1TB cannot grasp precoding for 1TB as it is.

Thus, in this example, a correspondence table as shown in FIG. 37, for example, is provided. This correspondence table can be prepared as a table in which the message part of "The number of TB=2" is rewritten in the table shown in FIG. 35, for example, or may be prepared as correspondence information separately from the table of FIG. 35. Also, this correspondence table is provided in both of the base station 200 and the user apparatus 100. Then, in the example of FIG. 37, the user apparatus that is notified of precoding information "3" from the base station 200 interprets that "0" is notified as precoding information for 1TB. Also, a user apparatus that is notified of precoding information "4" from the base station 200 interprets that "1" is notified as precoding information for 1TB. As for "5", "6", and "7", similarly, the user apparatus 100 interprets that "2", "3", and "4" are notified. Also, in this case, the user apparatus 100 that receives any one of "3"-"7" as precoding information determines that there is interference reduction necessary information in the second TB region to perform interference reduction processing by utilizing it. In this example, since notification is restricted up to "4", restriction is made such that "5" and "6" are not used for precoding in the first TB.

Example 2-4: Replacement/Read-Substitution of Table of Information Element of DCI for Interference Reduction In the example 2-4, being targeted for all (2, 2A, 2B, 2C, 2D) of the DCI format 2 series, the table of information elements "Antenna port, scrambling identity, number of layer" of DCI are replaced/read-substituted for interference reduction. FIG. 38 shows "Antenna port, scrambling identity, number of layer" in DCI format 2C/2D. Also, FIG. 39 shows a normal table corresponding to the information elements. Similarly to the above-mentioned table of precoding information, the table includes a table to be referred to for 1TB (1codeword) and a table to be referred to for 2TB (2codewords). In this example, although there is no reserved bit, replacement of information in the TB2 region of DCI is notified by transmitting 4-7 which are rarely used.

The method for determining the number of TBs by the user apparatus 100 is as described before. Therefore, as describe before, in the present embodiment, when performing transmission of 1TB, one region, in 2 TB regions of DCI, which is not used as control information for connecting cell transmission stream is used for notification of interference reduction necessary information (FIG. 18 and the like). Thus, it does not occur that the redundancy version is 1 and MCS is 0. Therefore, even though the number of TB of the actual communication is 1, the user apparatus 100 determines that the number of TBs is 2 and refers to the table for 2TB. Therefore, the user apparatus 100 that performs reception of 1TB cannot grasp "Antenna port, scrambling identity, number of layer" for 1TB as it is.

Thus, in this example, as shown in FIG. 40, for example, a table obtained by rewriting the table of FIG. 39 is prepared. The table of FIG. 40 is provided in both of the base station 200 and the user apparatus 100. Then, the user apparatus 100 notifies the base station 200, as UE capability and the like, that the user apparatus 100 has capability of interference reduction processing (SIC, IRC and the like), the base station 200 performs information notification to a user apparatus 100 that has the capability by applying the table shown in FIG. 40, and performs information notification to a user apparatus 100 that does not have the capability by applying a normal table (FIG. 39). By the way, content of replacement (read-substitute) of the table shown in FIG. 40 may be fixed or may be semistatically changeable. The semi-static change can be performed by RRC signaling.

Then, in the example of the table shown in FIG. 40, the user apparatus 100 that is notified of "4" interprets that "0" for 1TB is notified of, and the user apparatus 100 that is notified of "5" interprets that "1" for 1TB is notified of. As for "6" and "7", similarly, the user apparatus 100 interprets that "2" and "3" are notified. Also, in this case, the user apparatus 100 that receives any one of "4"-"7" as "Antenna port, scrambling identity, number of layer" determines that TB2 region has been replaced with interference reduction necessary information to perform interference reduction processing by utilizing it. In this example, for a user apparatus 100 having capability of interference reduction processing, transmission of the first TB is restricted such that the transmission becomes 1 layer transmission, and even 2TB transmission is restricted to 4 layer transmission at the maximum. As described before, the interference reduction processing such as IRC and SIC and the like is effective when interference from an interference cell is large, and in such a case, it is assumed that the number of transmission layer is restricted to 1, for example. Therefore, when assuming the interference reduction processing such as IRC and SIC and the like, it is reasonable to restrict the number of transmission layer of the first TB to 1.

Example 2-5: Utilizing Not-Defined Combination in Combinations of Bits of DCI

In this example, it is notified that replacement has been performed by utilizing a combination that is not defined from among combinations of bits of DCI.

FIG. 41 shows a concrete example in DCI format 2A. As described before, the non-patent document 5 (3GPP, 36.213 (V11.2.0), 7.1.7.2) defines that, when the redundancy version is 1 and MCS is 0, the TB is disabled. That is, when the redundancy version is 1 and MCS is 0, it is not assumed that new data indicator becomes 1.

Then, in the example of FIG. 41, "redundancy version 1, MCS 0, and new data indicator 1" are utilized as a replacement notification flag. In this case, the number of bits that can be used for replacement with interference reduction necessary information becomes 9−8=1 bit.

(Method for Reducing Notification Information Amount)

In the present embodiment, it is possible to reduce notification information amount by restricting cases where the connecting base station 200 notifies the user apparatus 100 of interference reduction necessary information into specific cases.

For example, in a case where there is a user apparatus 100 that performs interference cancelling by SIC at a cell edge, when an interference cell uses high modulation scheme (16 QAM or 64 QAM) or uses rank 2 transmission, there is a possibility in that accurate demodulation of an interference signal cannot be performed so that performance improvement effect by SIC cannot be obtained.

That is, since a SIC receiver of the user apparatus 100 cancels interference by subtracting an interference replica from a received signal, whether the SIC receiver can demodulate the interference signal accurately or not exerts a large effect on the performance. So, if an interference signal of high modulation scheme or an interference signal of rank 2 arrives at the user apparatus 100 existing at a cell edge, the user apparatus 100 cannot accurately demodulate an interference signal so that there is a possibility in that the characteristics do not improve or may be deteriorated.

In such a case, it can be considered that, even if the connecting base station 200 notifies the user apparatus 100 of interference reduction necessary information (interference cell information) for operation of SIC, there is no effect. Thus, in the present embodiment, the connecting base station 200 notifies the user apparatus 100 of interference reduction necessary information only when the connecting base station 200 expects interference reduction effect by SIC in the user apparatus 100 (example: when the interference signal is rank 1, QPSK). That is, the connecting base station 200 notifies the user apparatus 100 of interference reduction necessary information when the user apparatus 100 can demodulate the interference signal accurately to some extent.

In this case, as mentioned above, since it is assumed that the interference signal uses QPSK and rank 1 transmission, it is not necessary to dynamically notify the user apparatus 100 of these pieces of information. Thus, the amount of information to be notified of can be reduced, This precondition (example: QPSK, rank 1) may be fixed, or may be notified beforehand by RRC.

In this example, since the precondition is predetermined, the modulation scheme and the rank information are not dynamically notified. The user apparatus 100 performs SIC reception processing under the precondition only when the user apparatus 100 is notified of interference reduction necessary information (can be identified by the before-mentioned flag). When the user apparatus 100 is not notified of the interference reduction necessary information, the user apparatus 100 performs reception processing that does not require interference reduction necessary information, that is, performs reception processing of IRC Type2, for example.

Figure 42:
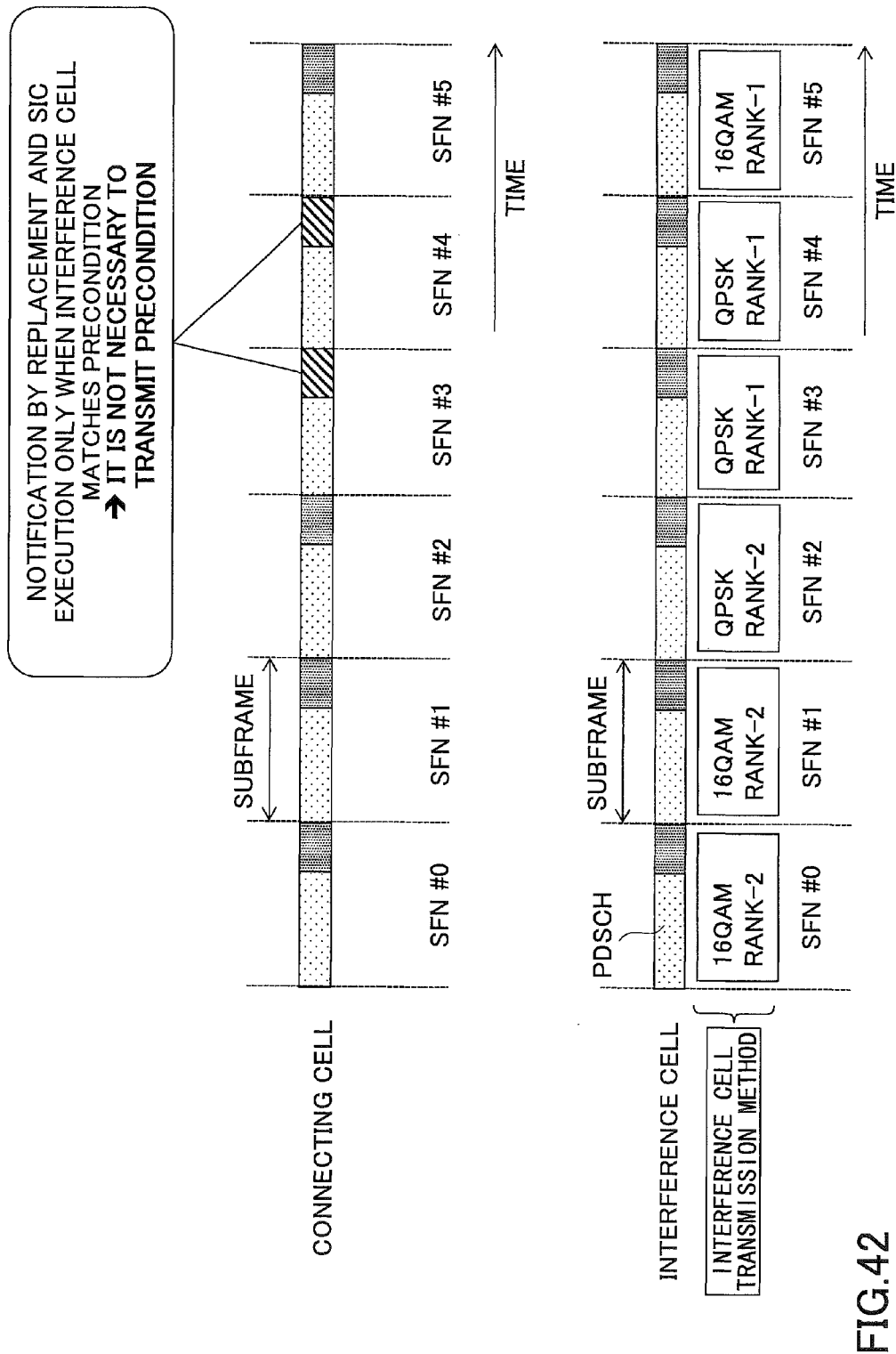
FIG. 42 is a diagram showing an example of operation in which cases for notifying of interference reduction necessary information are restricted to particular cases.

FIG. 42 shows operation outline in this example. Here, the precondition is that QPSK and rank 1 are used for the interference signal. When the precondition is satisfied, the connecting base station 200 notifies the user apparatus 100 of interference reduction necessary information, and the user apparatus 100 determines that the interference signal meets the precondition (QPSK, rank 1) by receiving the interference reduction necessary information, and performs SIC reception processing based on the received interference reduction necessary information, and the fact that the interference signal is "QPSK, rank 1".

In the example of FIG. 42, the connecting base station 200 determines that the precondition is satisfied in subframe numbers "3" and "4", and transmits interference reduction necessary information to the user apparatus in the subframe numbers "3" and "4", so that the user apparatus 100 performs SIC reception.

FIG. 43 shows a concrete example of replacement in DCI format 2. In this example, reserved MCS is used as a replacement flag. 5 bits are used for it, and PMI information is transmitted by 4 bits which can be replaced. In this example, the precondition is determined to be a case where the interference cell uses QPSK and rank 1 transmission, it is not necessary to transmit these pieces of information. Also, in this example, the user apparatus 100 can perform SIC and can perform IRC reception.

FIG. 44 shows a concrete example of replacement in DCI format 2A. In this example, redundancy version 1, MCS 0, and new data indicator 1 are used for a replacement flag, and 8 bits are used for the flag. Since the precondition is that the interference cell uses QPSK and rank 1 transmission, it is possible to perform either of IRC and SIC (turbo SIC is not available) only by notification of the flag.

(Example of PMI Information Reduction)

As another example for reducing the amount of information to be notified of, an example of method for reducing PMI information amount is described below.

Example 3-1: PMI is Estimated in User Apparatus 100

In the example 3-1, the user apparatus 100 estimates PMI by utilizing ZP (Zero Power) CSI-RS in the connecting cell.

Figure 45:
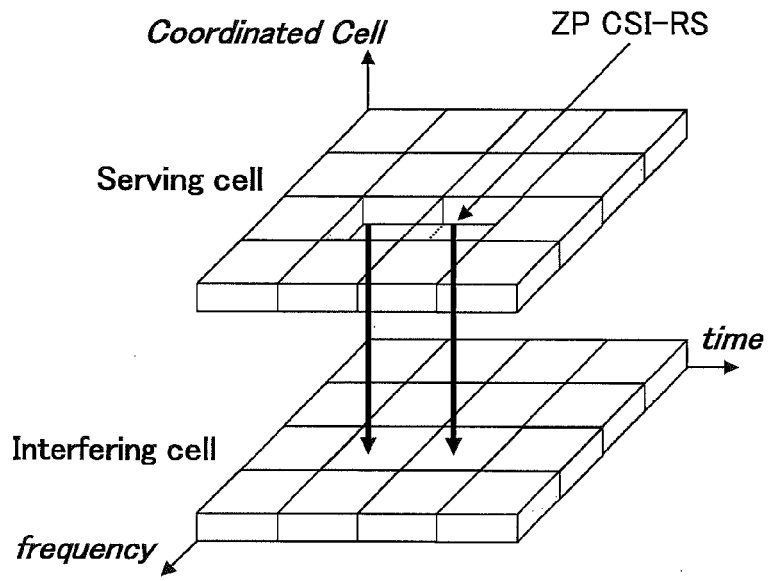
FIG. 45 is a diagram for explaining ZP CSI-RS.

As shown in FIG. 45, ZP CSI-RS is a signal in which a signal of the connecting cell is muted (power is 0) for interference power measurement. The location of the ZP resource that overlaps with PDSCH of the interference signal is reported to the user apparatus 100 by upper layer signaling (RRC signaling, in more detail), so that the user apparatus 100 can perform interference power measurement at the ZP CSI-RS of the resource. Since the ZP CSI-RS is equivalent to the CSI-RS configuration, the periodicity is 5-80 msec. Also, the periodicity is reported to the user apparatus 100 by upper layer signaling (example: system information).

Figure 46:
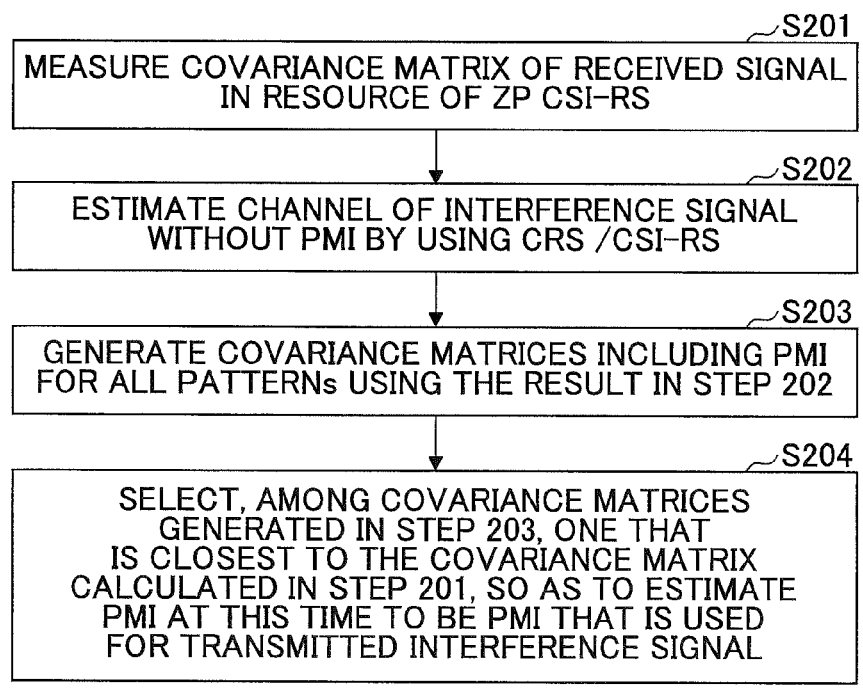
FIG. 46 is a flowchart of processes for PMI estimation executed by the user apparatus.

In the example 1-3, processing for PMI estimation executed by the user apparatus 100 is described with reference to the flowchart of FIG. 46.

In step 201, the user apparatus 100 obtains a covariance matrix of a received signal that is received at the resource of ZP CSI-RS. Accordingly, the user apparatus 100 can obtain the covariance matrix including precoding information of the interference signal.

In step 202, the user apparatus 100 estimates a channel of the interference signal at the resource without precoding information by using CRS or CSI-RS.

In step 203, the user apparatus 100 generates (calculates) covariance matrices of the interference signal for all patters of PMI using the channel information estimated in step 202 and precoding matrices corresponding to all patterns of PMI. That is, when there are 4 types of PMI, four covariance matrices are generated.

In step 204, the user apparatus 100 selects, from among all of the covariance matrices generated in step 203, one that is closest to the covariance matrix calculated in step 201, so as to estimate the precoding matrix (PMI) that is used for the closest covariance matrix to be a precoding matrix corresponding to the interference signal that is transmitted.

Example 3-2: Reduction of Granularity of PMI

As the outline is already described, as to PMI in the interference reduction necessary information, the connecting base station 200 may decrease the granularity of PMI and send the PMI to the user apparatus 100.

For example, as to a case where two antenna transmission is performed in downlink, 4 types of PMIs are defined in rank 1. Thus, 2 bits are necessary for transmitting the PMI as it is. But, as shown in FIG. 47, as to PMIs corresponding to precoding matrices to be used for actual signal transmission, two types of close PMIs can be aggregated into one so that the whole number of types becomes two. Accordingly, the number of bits of PMI to be transmitted to the user apparatus 100 can be decreased from two to one. Although this case is an example when the transmission antenna number is two, the decrease of granularity may be applied to any number of transmission antennas. For example, when the number of transmission antennas is four, the number of types of PMI becomes 16, which requires 4 bits. In this case, the number of types can be decreased to 4 (2bits) by decreasing granularity. In this case, compared to a case where decrease of granularity is not performed, characteristics may be deteriorated to some extent, but, the amount of information to be sent can be decreased.

(On RRC Signaling)

As described before, in the present embodiment, the connecting base station 200 replaces a part of information of DCI in PDCCH with a part of interference reduction necessary information (dynamically changing information), and transmits the information to the user apparatus 100, and the connecting base station 200 notifies the user apparatus 100 of the remaining interference reduction necessary information by RRC signaling. Although the method for transmitting information by RRC signaling is not limited to a particular method, as described below, when the connecting base station 200 performs notification of Quasi Co-location information, the connecting base station 200 can use information transmitted to the user apparatus 100 by RRC signaling as interference reduction necessary information.

A technique on Quasi Co-location is proposed in relation to CoMP (technique for transmitting downlink signals from a plurality of transmission points (TP: Transmission Point))) in LTE-Advanced (Rel.11). It is defined that, when predetermined long term propagation characteristics are the same among different APs (Antenna Ports), these different APs are in Quasi Co-location. Physical locations of these APs are not necessarily close to each other.

In the CoMP of LTE-Advanced (Rel.11), it is possible to switch between TPs instantaneously for transmitting PDSCH (and DM-RS) in order to improve reception quality in the user apparatus 100. In this case, it is assumed that time and frequency offsets of a signal arriving at the user apparatus 100 is different for each TP by which transmission is performed. Thus, the connecting base station 200 transmits information for the user apparatus 100 to properly correct these time and frequency offsets. More particularly, the connecting base station 200 transmits information indicating which TP transmits the reference signal (CRS, CSI-RS) that is in Quasi Co-location with DM-RS received by the user apparatus 100. The user apparatus 100 corrects the time and frequency offsets of the PDSCH (and DM-RS) by using the reference signal that is in Quasi Co-location with the received DM-RS.

In this example, it is assumed that the Quasi Co-location information is sent, and it is assumed that predetermined pieces of information for neighboring 4TPs (Transmission Point) at the maximum are transmitted to the user apparatus 100 by upper layer signaling (RRC signaling, more specifically) (non-patent documents 6 and 7).

As the predetermined pieces of information, there are following pieces of information, for example.

- Number of CRS antenna ports for PDSCH RE mapping (the number of CRS antenna ports for PDSCH resource element mapping)
- CRS frequency shift for PDSCH RE mapping (CRS frequency shift for PDSCH resource element mapping)
- MBSFN subframe configuration for PDSCH RE mapping (MBSFN subframe configuration for PDSCH resource element mapping)
- Zero-power CSI-RS resource configuration(s) for PDSCH RE mapping (Zero-power CSI-RS resource configuration(s) for PDSCH resource element mapping)
- PDSCH starting position for PDSCH RE mapping (PDSCH starting position for PDSCH resource element mapping)
- CSI-RS resource configuration identity for PDSCH RE mapping (CSI-RS resource configuration identity for PDSCH resource element mapping)

In the CSI-RS resource configuration identity for PDSCH RE mapping, VCID, Power boosting information and antenna ports are included.

The information sent by the physical layer signaling (PDCCH, more specifically) is a configuration (#1~#4) of TPs from which the PDSCH is received (refer to FIG. 48).

When 2 bits of the parameter is added to the DCI format 2C, it becomes the DCI format 2D.

In a case where Quasi Co-location is performed, information sent to the user apparatus 100 by RRC signaling includes, for each TP, PCID, the number of CRS antenna ports, MBSFN configuration, CRS power boosting information, VCID, the number of CSI-RS antenna ports, CSI-RS power boosting information, and PDSCH start symbol. These pieces of information are a part of necessary information for executing interference reduction processing such as IRC.

Therefore, the user apparatus 100 can perform channel estimation necessary for interference reduction processing by utilizing the information sent by RRC signaling in Quasi Co-location. Also, in this example, neighboring TPs of the focused connecting base station are regarded as interference base stations.

Other than the Quasi Co-location, if a technique is defined in LTE-Advanced in which necessary information for executing interference reduction processing is sent by RRC signaling, channel estimation necessary for interference reduction processing may be performed by using the information. Also, irrespective of information reported by the RRC signaling defined in the present LTE-Advanced, for executing interference reduction processing, the connecting base station may obtain interference reduction necessary information of the interference base station so as to transmit the information by including this information into RRC signaling.

As an example, FIG. 49 is a diagram showing information for each TP that is transmitted by RRC signaling from the connecting base station in Quasi Co-location and the like, and information necessary for IRC by comparing them. As shown in FIG. 49, the information sent by the RRC signaling is not enough, and there is lacking information. As to the lacking information, the information may be reported by DCI as described so far and RRC signaling. Also, there is information that can be omitted as shown in FIG. 17.

(Apparatus Configuration, Process Flow)

In the following, apparatus configurations and process flows of the base station and the user apparatus that perform process operation described so far are described.

<For the Case where IRC Reception is Performed>

Figure 50:
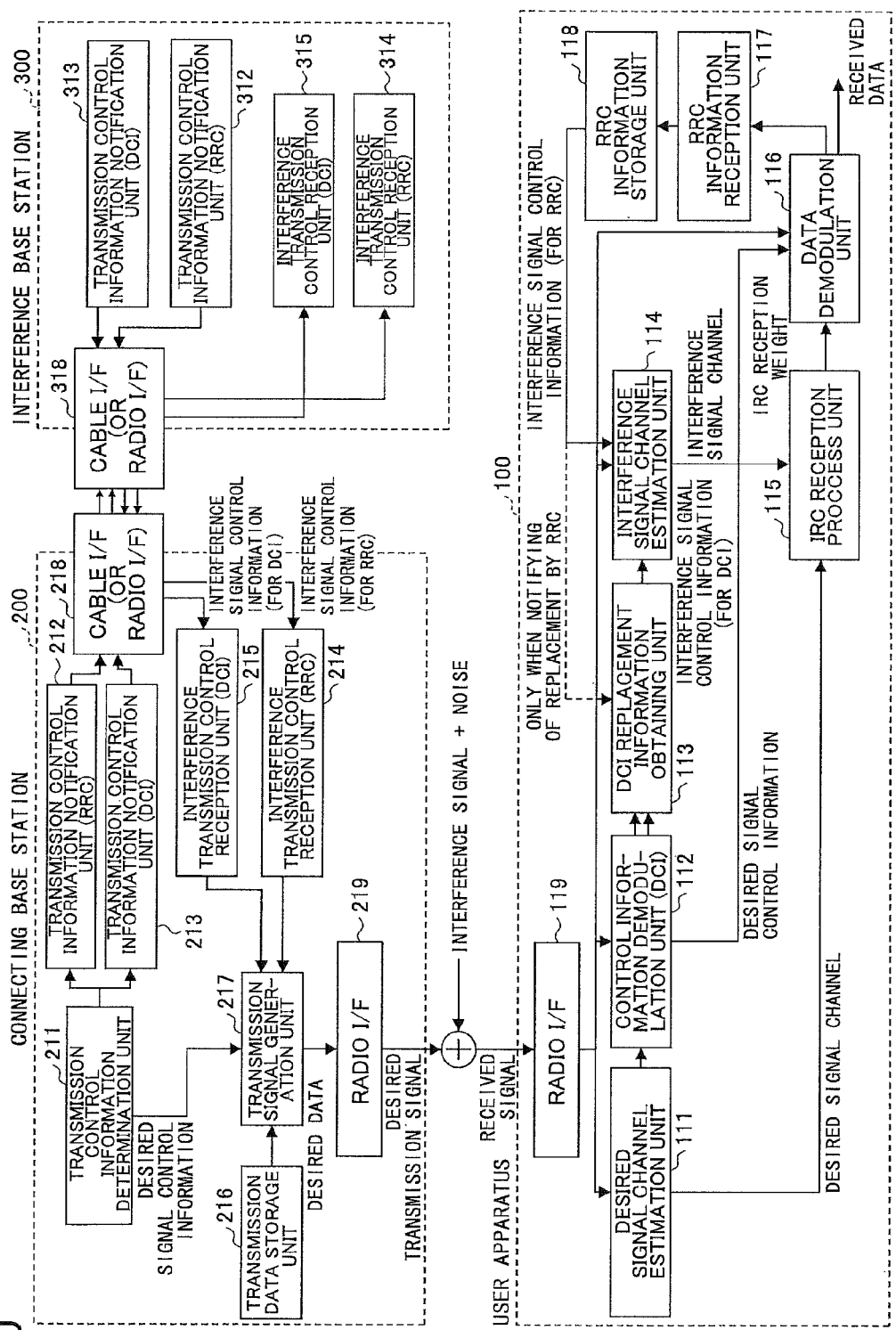
FIG. 50 is a system block diagram in an embodiment of the present invention (in the case of IRC reception)

FIG. 50 shows a functional block diagram showing a functional configuration of a communication system of the present embodiment. FIG. 50 shows, as components of the communication system, a connecting base station, an interference base station, and a user apparatus.

FIG. 50 is a block diagram in a case where the user apparatus 100 performs IRC reception. But, even when the user apparatus 100 in the configuration of FIG. 50 is replaced with one that performs SIC reception, the system can operate similarly.

As shown in FIG. 50, the connecting base station 200 includes a transmission control information determination unit 211, a transmission control information notification unit (RRC) 212, a transmission control information notification unit (DCI) 213, an interference transmission control information reception unit (RRC) 214, an interference transmission control information reception unit (DCI) 215, a transmission data storage unit 216, a transmission signal generation unit 217, a cable I/F 218 (or radio I/F 218), and a radio I/F 219. Each base station has the same configuration, thus, the interference base station 300 has the same configuration as that of the connecting base station 200. However, for convenience sake, only a transmission control information notification unit (DCI) 312, a transmission control information notification unit (RRC) 313, an interference transmission control information reception unit (DCI) 315, an interference transmission control information reception unit (RRC) 314, and a cable I/F 318 (or radio I/F 318) are shown for the interference base station 300.

The transmission control information determination unit 211 determines transmission control information of a desired signal. The transmission control information notification unit (RRC) 212 sends, to another base station, information to be sent by RRC in transmission control information of a desired signal necessary for IRC Type1 reception processing.

The transmission control information notification unit (DCI) 213 sends, to another base station, information (example: dynamically changing information) to be sent by DCI in transmission control information of a desired signal necessary for IRC Type1 reception processing.

The interference transmission control information reception unit (RRC) 214 receives transmission control information to be sent by RRC from the interference base station 300. The interference transmission control information reception unit (DCI) 215 receives transmission control information to be sent by DCI from the interference base station 300.

The transmission data storage unit 216 is a memory for storing transmission data. The transmission signal generation unit 217 generates, based on the desired transmission control, a desired transmission signal including the transmission control information of the desired signal, the transmission control information of the interference signal, and desired transmission data. For example, the transmission signal generation unit 217 performs a process for replacing normal information of DCI with the transmission control information of the interference signal, a process of including a replacement notification flag, and the like. The cable I/F 218 (or radio I/F 218) is a functional unit for performing transmission and reception of information by a cable (or by radio) between the connecting base station 200 and another base station. The radio I/F 219 is a functional unit for performing transmission and reception of signals by radio between the connecting base station 200 and the user apparatus 100.

Next, the user apparatus 100 is described. As shown in FIG. 50, the user apparatus 100 includes a desired signal channel estimation unit 111, a control information demodulation unit (DCI) 112, a DCI replaced information obtaining unit 113, an interference signal channel estimation unit 114, an IRC reception process unit 115, a data demodulation unit 116, an RRC information reception unit 117, an RRC information storage unit 118, and a radio I/F 119.

In a case where PMI estimation and the like is performed, the interference signal channel estimation unit 114 may include an interference transmission control information estimation function, or an interference transmission control information estimation unit may be provided.

The desired signal channel estimation unit 111 estimates a channel for the desired signal from the received signal. The control signal demodulation unit (DCI) 112 demodulates transmission control information of the desired signal from the reception signal based on the channel estimation value for the desired signal estimated by the desired signal channel estimation unit 111. The demodulated control information includes transmission control information (DCI) of the interference signal.

The DCI replaced information obtaining unit 113 reads and obtains, from DCI demodulated by the control signal demodulation unit (DCI) 112, replaced information of interference cell as interference reduction necessary information.

The interference signal channel estimation unit 114 estimates a channel for an interference signal based on transmission control information of the interference signal sent by DCI and RRC. The IRC reception process unit 115 generates an IRC reception weight from the channel of the desired signal and the channel of the interference signal. The data demodulation unit 116 demodulates transmission data based on the generated IRC reception weight and the transmission control information.

The RRC information reception unit 117 receives transmission control information of the interference signal sent by RRC. The RRC information storage unit 118 stores the transmission control information of the interference signal sent by RRC. The transmission control information stored in the RRC information storage unit 118 is read by the interference signal channel estimation unit 114 and is used for interference signal channel estimation.

Figure 51:
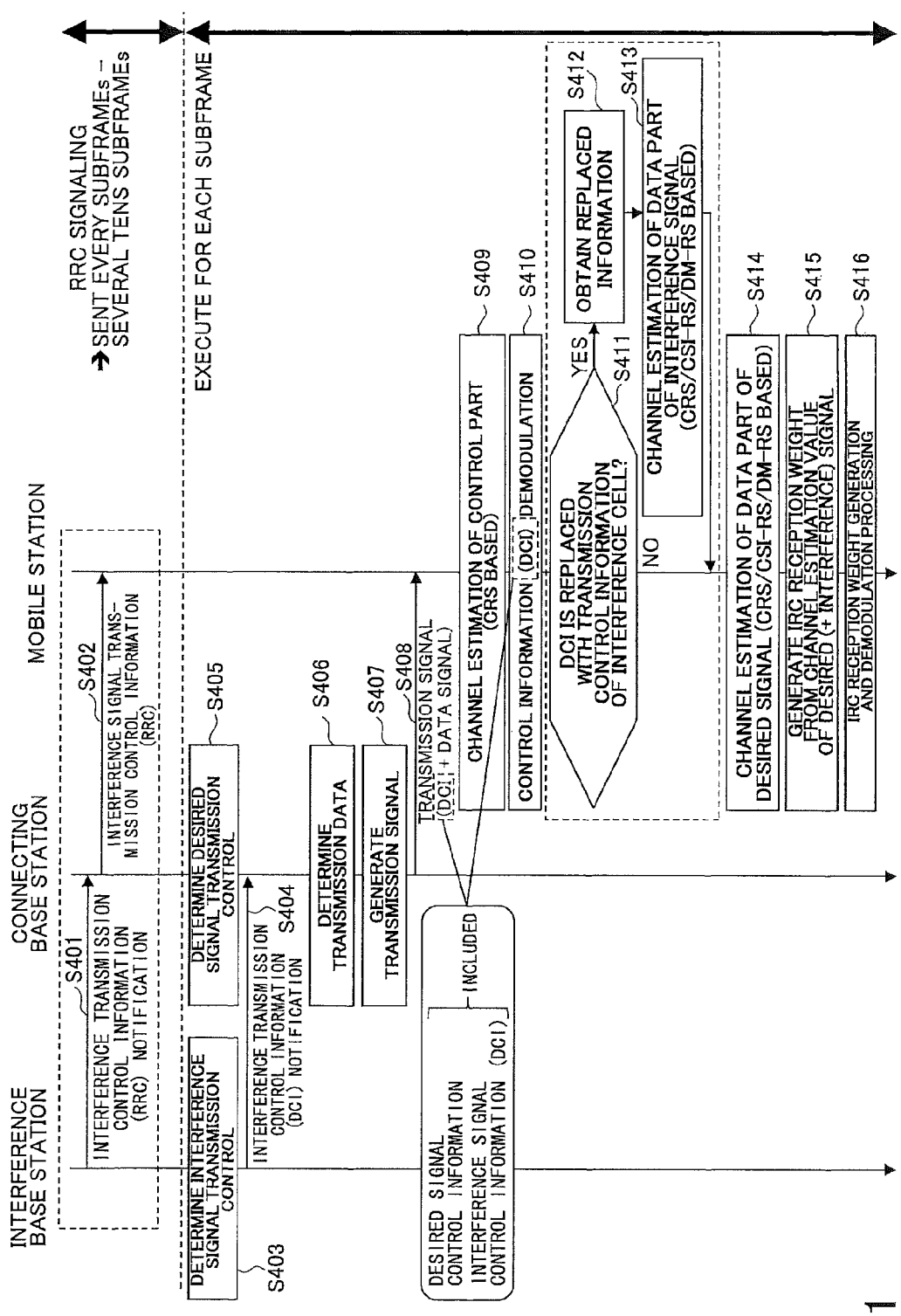
FIG. 51 is a sequence diagram for explaining operation of the system.

Next, an operation example of the communication system having the configuration shown in FIG. 50 is described with reference to the sequence diagram shown in FIG. 51.

In an RRC signaling phase, the transmission control information notification unit (RRC) 313 of the interference base station 300 sends transmission control information of a desired signal (interference signal for the user apparatus 100) to be sent by RRC to the connecting base station 200, and the interference transmission control information reception unit (RRC) 214 of the connecting base station 200 receives the transmission control information (step 401). The connecting base station 200 sends the received transmission control information of the interference signal to the user apparatus 100 by RRC signaling (step 402). Following processes are performed for each subframe.

The transmission control information determination unit of the interference base station 300 determines transmission control information (DCI) of a desired signal at the interference base station 300 (interference signal for the user apparatus 100) (step 403). The transmission control information notification unit (DCI) 313 of the interference base station 300 transmits the transmission control information to the connecting base station 200 (step 404).

On the other hand, in the connecting base station 200, the transmission control information determination unit 211 determines transmission control information of the desired signal at the connecting base station 200 (step 405). The interference transmission control information reception unit (DCI) 215 receives the transmission control information transmitted from the interference base station 300 as transmission control information of an interference signal to be transmitted by DCI.

The transmission signal generation unit 217 of the connecting base station 200 determines transmission data and obtains it from the transmission data storage unit 216 (step 406) to generate a transmission signal with transmission control information (step 407) and to transmit the transmission signal to the user apparatus 100 (step 408). This transmission signal includes DCI that includes the transmission control information of the interference signal.

In the user apparatus 100 that receives the transmission signal, the control information demodulation unit 112 performs channel estimation on a resource of the control information part by using CRS from the connecting base station 200 (step 409) so as to demodulate control information (DCI) from the received signal (step 410).

The DCI replaced information obtaining unit 113 checks whether a part of DCI is replaced with transmission control information of an interference cell by using the method described in examples 2-1-2-5 and the like (step 411), and when it is replaced, the DCI replaced information obtaining unit 113 reads the information as the replaced information, and obtained it (step 412).

Next, the interference signal channel estimation unit 114 performs channel estimation of a data part of the interference signal by using the transmission control information of the interference signal (step 413). Also, the desired signal channel estimation unit 111 performs channel estimation of a data part of the desired signal by using the transmission control information of the desired signal (step 414).

Next, the IRC reception processing unit 115 generates an IRC reception weight by using the channel estimation value of the desired signal obtained in step 413 and the channel estimation value of the interference signal obtained in step 414 (step 415). Then, the data demodulation unit 116 demodulates transmitted data from the received signal using the IRC reception weight obtained in step 415 to obtain received data (step 416).

<For the Case where SIC Reception is Performed>

Figure 52:
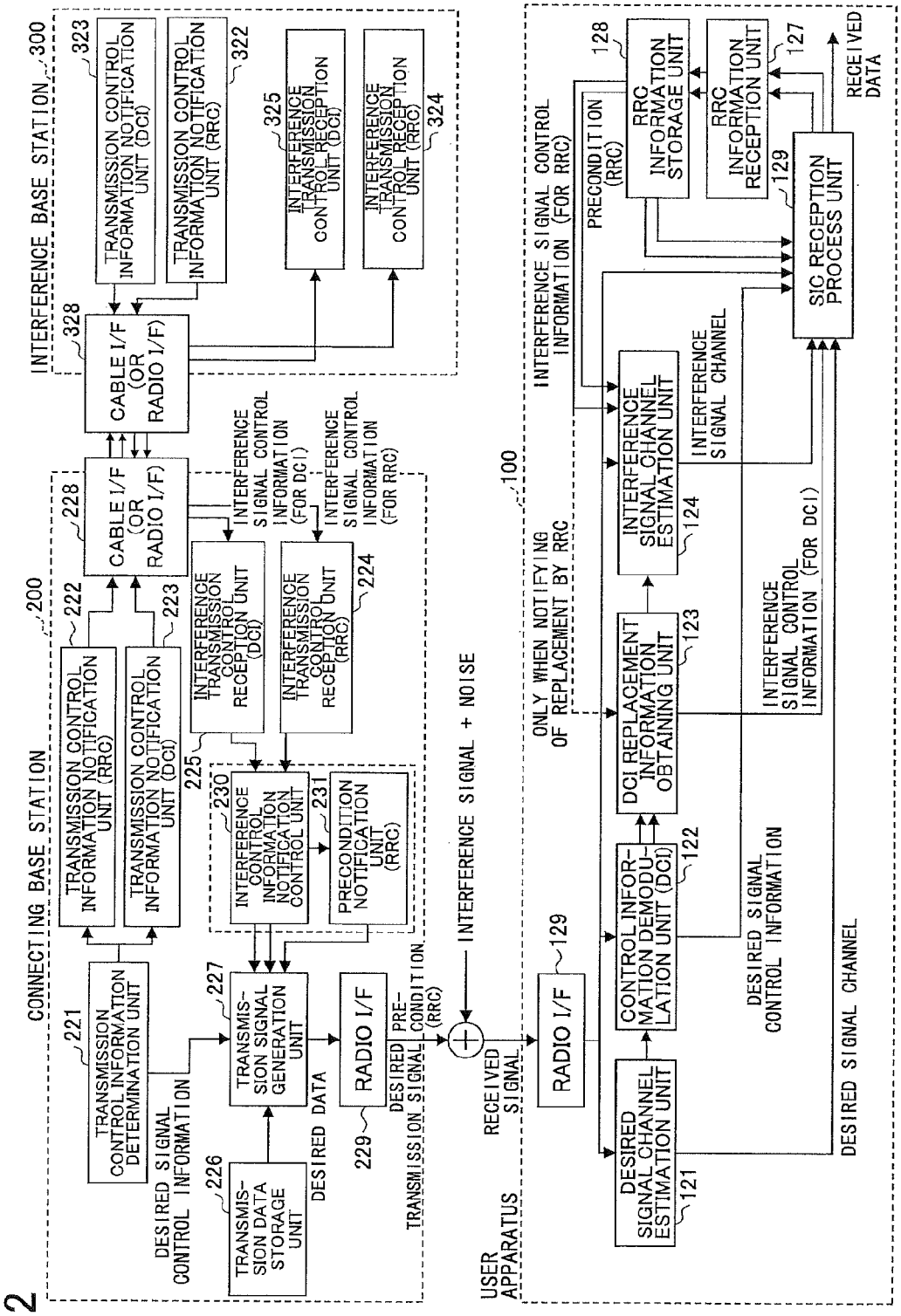
FIG. 52 is a system block diagram in an embodiment of the present invention (in the case of SIC reception)

FIG. 52 is a block diagram in a case where the user apparatus 100 performs SIC reception. This example especially corresponds to the method in which the interference reduction necessary information is transmitted only when a precondition is satisfied. Although this example shows a case in which the user apparatus 100 performs SIC reception, even when the user apparatus 100 performs IRC reception, the configuration of the base station side of this example can be applied.

As shown in FIG. 52, the connecting base station 200 includes a transmission control information determination unit 221, a transmission control information notification unit (RRC) 222, a transmission control information notification unit (DCI) 223, an interference transmission control information reception unit (RRC) 224, an interference transmission control information reception unit (DCI) 225, a transmission data storage unit 226, a transmission signal generation unit 227, a cable I/F 228 (or radio I/F 228), a radio I/F 229, an interference control information notification control unit 230, and a precondition notification unit (RRC) 231. Each base station has the same configuration, thus, the interference base station 300 has the same configuration as that of the connecting base station 200. However, for convenience sake, only a transmission control information notification unit (DCI) 323, a transmission control information notification unit (RRC) 322, an interference transmission control information reception unit (DCI) 325, an interference transmission control information reception unit (RRC) 324, and a cable I/F 328 (or radio I/F 328) are shown for the interference base station 300.

The transmission control information determination unit 221 determines transmission control information of a desired signal. The transmission control information notification unit (RRC) 222 sends, to another base station, information to be sent by RRC in transmission control information of a desired signal necessary for IRC Type1 reception processing.

The transmission control information notification unit (DCI) 223 sends, to another base station, information to be sent by DCI in transmission control information of a desired signal necessary for IRC Type1 reception processing.

The interference transmission control information reception unit (RRC) 224 receives transmission control information to be sent by RRC from the interference base station 300. The interference transmission control information reception unit (DCI) 225 receives transmission control information to be sent by DCI from the interference base station 300.

The interference control information notification control unit 230 determines whether to notify the user apparatus of control information of the interference base station by determining whether the interference signal satisfies a predetermined condition (example: QPSK, rank 1) based on information received from the interference base station. The precondition notification unit (RRC) 231 transmits precondition of control information of the interference base station. By the way, if the system is configured such that the precondition is not transmitted, the notification of it is not necessary.

The transmission data storage unit 226 is a memory for storing transmission data. The transmission signal generation unit 227 generates, based on the desired transmission control, a desired transmission signal including the transmission control information of the desired signal, the transmission control information of the interference signal, and desired transmission data. For example, the transmission signal generation unit 227 performs a process for replacing normal information of DCI with the transmission control information of the interference signal, a process of including a flag, and the like. The cable I/F 228 (or radio I/F 228) is a functional unit for performing transmission and reception of information by a cable (or by radio) between the connecting base station 200 and another base station. The radio I/F 229 is a functional unit for performing transmission and reception of signals by radio between the connecting base station 200 and the user apparatus 100.

Next, the user apparatus 100 is described. As shown in FIG. 52, the user apparatus 100 includes a desired signal channel estimation unit 121, a control information demodulation unit (DCI) 122, a DCI replaced information obtaining unit 123, an interference signal channel estimation unit 124, a SIC reception process unit 125, an RRC information reception unit 127, an RRC information storage unit 128, and a radio I/F 129.

In a case where PMI estimation and the like is performed, the interference signal channel estimation unit 124 may include an interference transmission control information estimation function, or an interference transmission control information estimation unit may be provided.

The desired signal channel estimation unit 121 estimates a channel for the desired signal from the received signal. The control signal demodulation unit (DCI) 122 demodulates transmission control information of the desired signal from the received signal based on the channel estimation value for the desired signal estimated by the desired signal channel estimation unit 121. The demodulated control information includes transmission control information (DCI) of the interference signal.

The DCI replaced information obtaining unit 123 reads and obtains, from DCI demodulated by the control signal demodulation unit (DCI) 122, replaced information of interference cell as interference reduction necessary information. The DCI replaced information obtaining unit 123 outputs replaced information only when the replaced information exists.

The interference signal channel estimation unit 124 estimates a channel for an interference signal based on transmission control information of the interference signal sent by DCI and RRC. The SIC reception process unit 125 performs SIC reception processing based on information of desired and interference signals transmitted by RRC and DCI to decode the transmission data.

The RRC information reception unit 127 receives transmission control information of the interference signal sent by RRC. The RRC information storage unit 128 stores the transmission control information of the interference signal sent by RRC.

Figure 53:
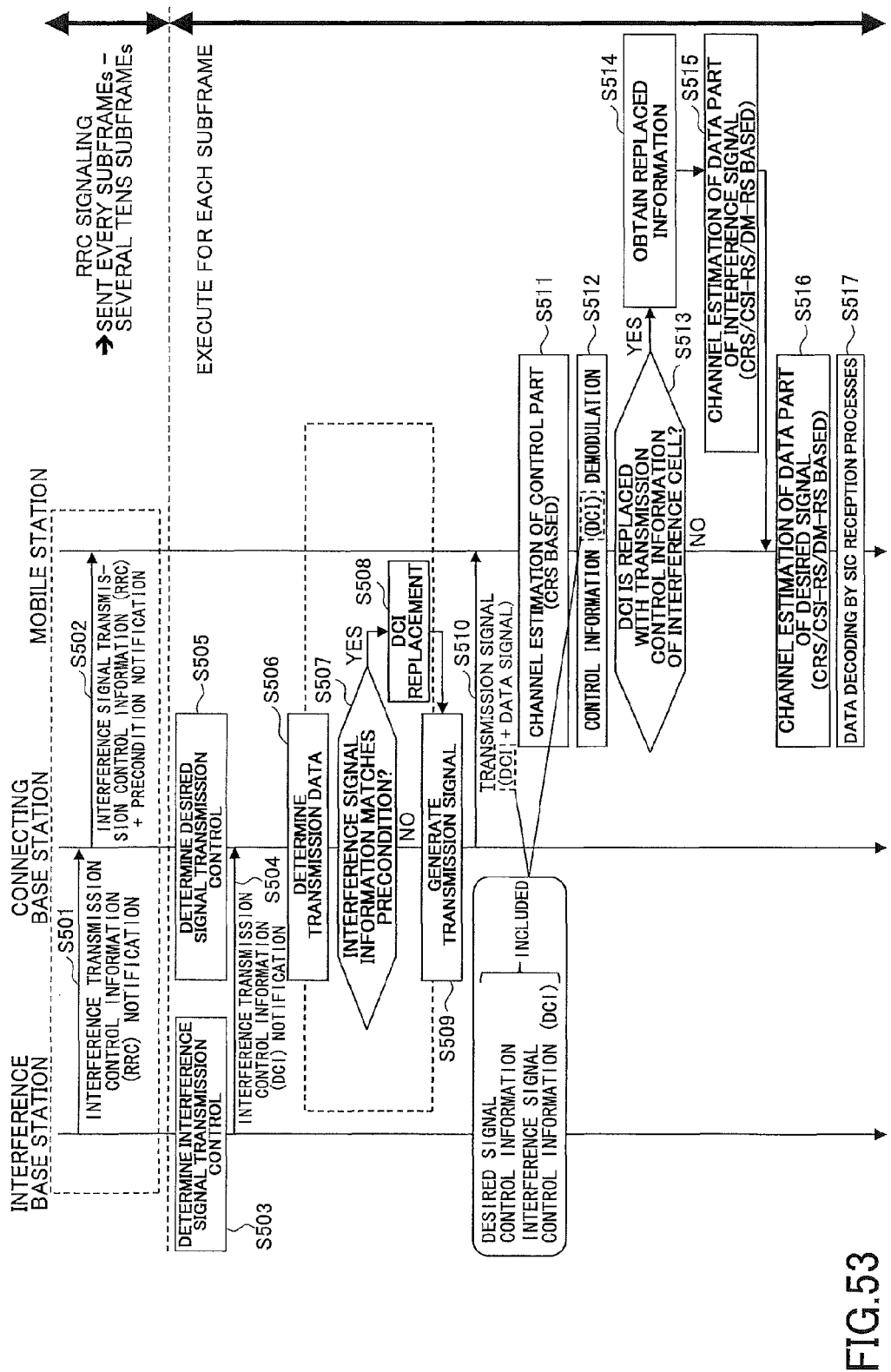
FIG. 53 is a sequence diagram for explaining operation of the system.

Next, an operation example of the communication system having the configuration shown in FIG. 52 is described with reference to the sequence diagram shown in FIG. 53.

In an RRC signaling phase, the transmission control information notification unit (RRC) 323 of the interference base station 300 sends transmission control information of a desired signal (interference signal for the user apparatus 100) to be sent by RRC to the connecting base station 200, and the interference transmission control information reception unit (RRC) 224 of the connecting base station 200 receives the transmission control information (step 501). The connecting base station 200 sends the received transmission control information of the interference signal to the user apparatus 100 by RRC signaling (step 502). Notification of the precondition may be performed in this step. Following processes are performed for each subframe.

The transmission control information determination unit of the interference base station 300 determines transmission control information (DCI) of a desired signal at the interference base station 300 (interference signal for the user apparatus 100) (step 503). The transmission control information notification unit (DCI) 323 of the interference base station 300 transmits the transmission control information to the connecting base station 200 (step 504).

On the other hand, in the connecting base station 200, the transmission control information determination unit 221 determines transmission control information of the desired signal at the connecting base station 200 (step 505). The interference transmission control information reception unit (DCI) 225 receives the transmission control information transmitted from the interference base station 300 as transmission control information of an interference signal to be transmitted by DCI.

The transmission signal generation unit 227 of the connecting base station 200 determines transmission data and obtains it from the transmission data storage unit 226 (step 506). The interference control information notification control unit 230 checks whether interference signal information matches with the precondition to determine whether to transmit control information of the interference base station (step 507). If they match, the interference control information notification control unit 230 stores interference control information in a predetermined region of DCI (perform replacement) (step 508). Then, the transmission signal generation unit 227 of the connecting base station 200 generates a transmission signal with a data signal and transmission control information (DCI) (step 509) and transmits the transmission signal to the user apparatus 100 (step 510). This transmission signal includes DCI that includes the transmission control information of the interference signal. If they do not match in step 507, the process goes to step 509 without replacement of DCI.

In the user apparatus 100 that receives the transmission signal, the control information demodulation unit 122 performs channel estimation on a resource of the control information part by using CRS from the connecting base station (step 511) so as to demodulate control information (DCI) from the received signal (step 512).

The DCI replaced information obtaining unit 123 checks whether a part of DCI is replaced with transmission control information of an interference cell by using the method described in examples 2-1-2-5 and the like (step 513), and when it is replaced, the DCI replaced information obtaining unit 123 obtains replaced information (step 514).

Next, the interference signal channel estimation unit 124 performs channel estimation of a data part of the interference signal by using the transmission control information of the interference signal (step 515). Also, the desired signal channel estimation unit 121 performs channel estimation of a data part of the desired signal by using the transmission control information of the desired signal (step 516). Next, the SIC reception process unit 125 performs data decoding by SIC reception processing (step 517).

Summary of Embodiments

As described above, according to the present embodiment, there is provided a user apparatus in a radio communication system including a plurality of base stations, including: a reception unit configured to receive, from a connecting base station, control information to be used for reducing an interference signal sent from an interference base station for the user apparatus; and an interference reducing unit configured to reduce the interference signal by using the control information to obtain a desired signal sent from the connecting base station, wherein the reception unit receives a part of the control information as a part of downlink control information that is transmitted by a downlink physical layer signaling channel from the connecting base station, and receives the other part of the control information by RRC signaling.

By configuring the user apparatus as mentioned above, the user apparatus can obtain control information used for reducing an interference signal, and it becomes possible to perform interference reduction processing having high interference reduction ability.

The downlink control information includes predetermined information based on a predetermined format, and a part of information in the predetermined information is replaced with a part of the control information in the downlink control information received from the connecting base station, and wherein the interference reducing unit uses the replaced information as the part of the control information.

The downlink control information is, for example, DCI transmitted by PDCCH, and the part of information in the predetermined information is information for a transport block that is not used in a predetermined DCI format, or information defined for inter-cell coordination transmission and reception.

As mentioned above, by using replacement, the user apparatus can obtain interference reduction necessary information (example: RI, PMI and the like) that changes dynamically, and use it while avoiding increase of overhead.

Also, when the reception unit receives, as a part of the downlink control information, information indicating that the part of information in the predetermined information is replaced with a part of the control information, the interference reducing unit uses the replaced information as the part of the control information.

Accordingly, a configuration is adopted for receiving, as a part of the downlink control information, information indicating that the part of information in the predetermined information is replaced with a part of the control information, it becomes possible to properly use the replaced information as a part of the control information.

In addition, according to the present embodiment, there is provided a base station connecting with a user apparatus in a radio communication system, including: a reception unit configured to receive, from an interference base station, control information to be used by the user apparatus for reducing an interference signal sent from the interference base station for the user apparatus; and a transmission unit configured to transmit, to the user apparatus, a part of the control information as a part of downlink control information by a downlink physical layer signaling channel, and to transmit, to the user apparatus, the other part of the control information by RRC signaling.

By configuring the base station as mentioned above, the user apparatus can obtain control information used for reducing an interference signal, and it becomes possible to perform interference reduction processing having high interference reduction ability.

The downlink control information includes predetermined information based on a predetermined format, and the transmission unit replaces a part of information in the predetermined information in the downlink control information with a part of the control information, and transmits the downlink control information where replacement is performed to the user apparatus.

The downlink control information is, for example, DCI transmitted by PDCCH, and the part of information in the predetermined information is information for a transport block that is not used in a predetermined DCI format, or information defined for inter-cell coordination transmission and reception.

As mentioned above, by using replacement, the base station can transmit interference reduction necessary information (example: RI, PMI and the like) that changes dynamically to the user apparatus while avoiding increase of overhead.

For example, when the interference signal satisfies a condition that is predetermined as a condition by which the user apparatus can reduce the interference signal, the transmission unit transmits the control information to the user apparatus. By configuring the transmission unit like this, it becomes possible to reduce information amount to be transmitted.

In the above, the present invention has been explained while referring to the specific embodiments. However, these are merely exemplary. Those skilled in the art will conceive of various modified examples, corrected examples, alternative examples, substituted examples, and the like. While specific numerical value examples are used to facilitate understanding of the present invention, such numerical values are merely examples, and any appropriate value may be used unless specified otherwise. Classification into each item in the description is not essential in the present invention, and features described in two or more items may be combined and used as necessary. Subject matter described in an item may be applied to subject matter described in another item (provided that they do not contradict).

It is not always true that the boundaries of the functional units or the processing units in the functional block diagram correspond to boundaries of physical components. The operations by the plural functional units may be physically performed by a single component. Alternatively, the operations by the single functional unit may be physically performed by plural components.

For convenience of explanation, the user apparatus UE and the radio base station eNodeB have been explained by using functional block diagrams. However, the apparatuses may be implemented in hardware, software, or a combination thereof. The software that operates according to the present invention (software executed by a processor provided in the user apparatus, software executed by a processor provided in the base station) may be stored in any proper storage medium such as a RAM (Random Access Memory), a flash memory, a ROM (Read Only Memory), an EPROM, an EEPROM, a register, a hard disk (HDD), a removable disk, a CD-ROM, a database, a server and the like.

The present invention is not limited to the above-mentioned embodiment and is intended to include various variations, modifications, alterations, substitutions and so on without departing from the spirit of the present invention.

The present international application claims priority based on Japanese patent application No. 2013-161873, filed in the JPO on Aug. 2, 2013, and Japanese patent application No. 2014-022834, filed in the JPO on Feb. 7, 2014, and the entire contents of the Japanese patent application No. 2013-161873 and the Japanese patent application No. 2014-022834 are incorporated herein by reference.

DESCRIPTION OF REFERENCE SIGNS 100 user apparatus
111 desired signal channel estimation unit
112 control information demodulation unit (DCI)
113 DCI replaced information obtaining unit
114 interference signal channel estimation unit
115 IRC reception process unit
116 data demodulation unit
117 RRC information reception unit
118 RRC information storage unit
119 radio I/F
121 desired signal channel estimation unit
122 control information demodulation unit (DCI)
123 DCI replaced information obtaining unit
124 interference signal channel estimation unit
125 SIC reception process unit
127 RRC information reception unit
128 RRC information storage unit
129 radio I/F
200 connecting base station
211 transmission control information determination unit
212 transmission control information notification unit (RRC)
213 transmission control information notification unit (DCI)
214 interference transmission control information reception unit (RRC)
215 interference transmission control information reception unit (DCI)
216 transmission data storage unit
217 transmission signal generation unit
218 cable I/F (or radio I/F)
219 radio I/F
221 transmission control information determination unit
222 transmission control information notification unit (RRC)
223 transmission control information notification unit (DCI)
224 interference transmission control information reception unit (RRC)
225 interference transmission control information reception unit (DCI)
226 transmission data storage unit
227 transmission signal generation unit
228 cable I/F (or radio I/F)
229 radio I/F
230 interference control information notification control unit
231 precondition notification unit (RRC)

The invention claimed is:

1. A user apparatus in a radio communication system including a plurality of base stations, comprising:
a reception unit configured to receive, from a connecting base station, control information to be used for reducing an interference signal sent from an interference base station for the user apparatus; and
an interference reducing unit configured to reduce the interference signal by using the control information to obtain a desired signal sent from the connecting base station,
wherein the reception unit receives a part of the control information as a part of downlink control information that is transmitted by a downlink physical layer signaling channel from the connecting base station, and receives the other part of the control information by upper layer signaling,
wherein the downlink control information includes predetermined information based on a predetermined format, and a part of information in the predetermined information is replaced with a part of the control information in the downlink control information received from the connecting base station, and wherein the interference reducing unit uses the replaced information as the part of the control information.

2. The user apparatus as claimed in claim 1, wherein the part of information in the predetermined information is information for a transport block that is not used in the predetermined format, or information defined for inter-cell coordination transmission and reception.

3. The user apparatus as claimed in claim 2, wherein, when the reception unit receives, as a part of the downlink control information, information indicating that the part of information in the predetermined information is replaced with a part of the control information, the interference reducing unit uses the replaced information as the part of the control information.

4. The user apparatus as claimed in claim 1, wherein, when the reception unit receives, as a part of the downlink control information, information indicating that the part of information in the predetermined information is replaced with a part of the control information, the interference reducing unit uses the replaced information as the part of the control information.

5. A base station connecting with a user apparatus in a radio communication system, comprising:
a reception unit configured to receive, from an interference base station, control information to be used by the user apparatus for reducing an interference signal sent from the interference base station for the user apparatus; and
a transmission unit configured to transmit, to the user apparatus, a part of the control information as a part of downlink control information by a downlink physical layer signaling channel, and to transmit, to the user apparatus, the other part of the control information by upper layer signaling,
wherein the downlink control information includes predetermined information based on a predetermined format, and the transmission unit replaces a part of information in the predetermined information in the downlink control information with a part of the control information, and transmits the downlink control information where replacement is performed to the user apparatus.

6. The base station as claimed in claim 5, wherein the part of information in the predetermined information is information for a transport block that is not used in the predetermined format, or information defined for inter-cell coordination transmission and reception.

7. The base station as claimed in claim 6, wherein, when the interference signal satisfies a condition that is predetermined as a condition by which the user apparatus can reduce the interference signal, the transmission unit transmits the control information to the user apparatus.

8. The base station as claimed in claim 5, wherein, when the interference signal satisfies a condition that is predetermined as a condition by which the user apparatus can reduce the interference signal, the transmission unit transmits the control information to the user apparatus.

9. An interference reducing method executed by a user apparatus in a radio communication system including a plurality of base stations, comprising:
a reception step of receiving, from a connecting base station, control information to be used for reducing an interference signal sent from an interference base station for the user apparatus; and
an interference reducing step of reducing the interference signal by using the control information to obtain a desired signal sent from the connecting base station,
wherein, in the reception step, the user apparatus receives a part of the control information as a part of downlink control information that is transmitted by a downlink physical layer signaling channel from the connecting base station, and receives the other part of the control information by upper layer signaling,
wherein the downlink control information includes predetermined information based on a predetermined format, and a part of information in the predetermined information is replaced with a part of the control information in the downlink control information received from the connecting base station, and
wherein, in the interference reducing step, the replaced information is used as the part of the control information.

10. An interference reducing control information notification method executed by a base station connecting with a user apparatus in a radio communication system, comprising:
a reception step of receiving, from an interference base station, control information to be used by the user apparatus for reducing an interference signal sent from the interference base station for the user apparatus;
a step of transmitting, to the user apparatus, a part of the control information as a part of downlink control information by a downlink physical layer signaling channel, and
a step of transmitting, to the user apparatus, the other part of the control information by upper layer signaling,
wherein the downlink control information includes predetermined information based on a predetermined format, and
wherein a part of information in the predetermined information in the downlink control information is replaced with a part of the control information, and the downlink control information where replacement is performed is transmitted to the user apparatus.

* * * * *